(12) United States Patent  (10) Patent No.: US 7,158,521 B2
Morita et al.  (45) Date of Patent: Jan. 2, 2007

(54) SYNCHRONIZATION SYSTEM AND SYNCHRONIZATION METHOD OF MULTISYSTEM CONTROL APPARATUS

(75) Inventors: Yuichiro Morita, Hitachi (JP); Kotaro Shimamura, Hitachinaka (JP); Yoshitaka Takahashi, Hitachi (JP); Takashi Hotta, Hitachi (JP); Kazuhiro Imaie, Hitachi (JP); Shigeta Ueda, Hitachi (JP); Akira Bando, Hitachi (JP); Mitsuyasu Kido, Hitachinaka (JP); Takeshi Takehara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 862 days.

(21) Appl. No.: 10/098,509

(22) Filed: Mar. 18, 2002

(65) Prior Publication Data

US 2002/0114356 A1  Aug. 22, 2002

Related U.S. Application Data

(62) Division of application No. 09/205,343, filed on Dec. 4, 1998, now Pat. No. 6,389,041.

(30) Foreign Application Priority Data

Dec. 5, 1997 (JP) ................................ 9-335952
Dec. 5, 1997 (JP) ................................ 9-335953
Dec. 5, 1997 (JP) ................................ 9-335955

(51) Int. Cl.
  *H04L 12/22* (2006.01)
  *H04L 12/56* (2006.01)
(52) U.S. Cl. .................... 370/394; 370/389; 370/474
(58) Field of Classification Search ............... 370/389, 370/392, 394, 465, 474, 503; 714/746, 748, 714/749, 750
  See application file for complete search history.

(56) References Cited

U.S. PATENT DOCUMENTS 4,093,823 A * 6/1978 Chu .......................... 370/535

(Continued)

FOREIGN PATENT DOCUMENTS

JP  56-47120  4/1981

(Continued)

*Primary Examiner*—Ajit Patel
(74) *Attorney, Agent, or Firm*—Mattingly, Stanger, Malur & Brundidge, P.C.

(57) ABSTRACT

In a synchronization system adopted in a synchronous-multisystem control apparatus comprising a plurality of systems operating synchronously with each other at a fixed control period, the synchronous-multisystem control apparatus can be operated in a single-system mode in the event of failures occurring simultaneously in some of the systems.

The synchronous-multisystem control apparatus employs a plurality of control circuits each provided for one of the systems. Any particular one of the control circuits comprises:
  a period-signal generating circuit for generating a period signal indicating a start point of a control period;
  a synchronization-reference selecting circuit for outputting a synchronization-reference signal by referring to period signals generated by the systems; and
  a control-period correcting circuit for correcting a control period of the particular system by forming a judgment on a synchronization shift of the period signal generated by the particular system from the synchronization-reference signal and keeping the control period as it is in case the synchronization-reference signal is not generated.

7 Claims, 53 Drawing Sheets

U.S. PATENT DOCUMENTS

| | | |
|---|---|---|
| 4,142,069 A | 2/1979 | Stover |
| 4,270,203 A | 5/1981 | Collins et al. |
| 4,569,042 A | 2/1986 | Larson |
| 4,665,534 A | 5/1987 | Yoshida |
| 4,807,259 A | 2/1989 | Yamanaka et al. |
| 4,894,846 A | 1/1990 | Fine |
| 5,249,184 A * | 9/1993 | Woest et al. ............ 370/402 |

FOREIGN PATENT DOCUMENTS

| | | |
|---|---|---|
| JP | 62-57051 | 3/1987 |
| JP | 4-307633 | 10/1992 |
| JP | 5-160815 | 6/1993 |
| JP | 6-348524 | 12/1994 |

* cited by examiner

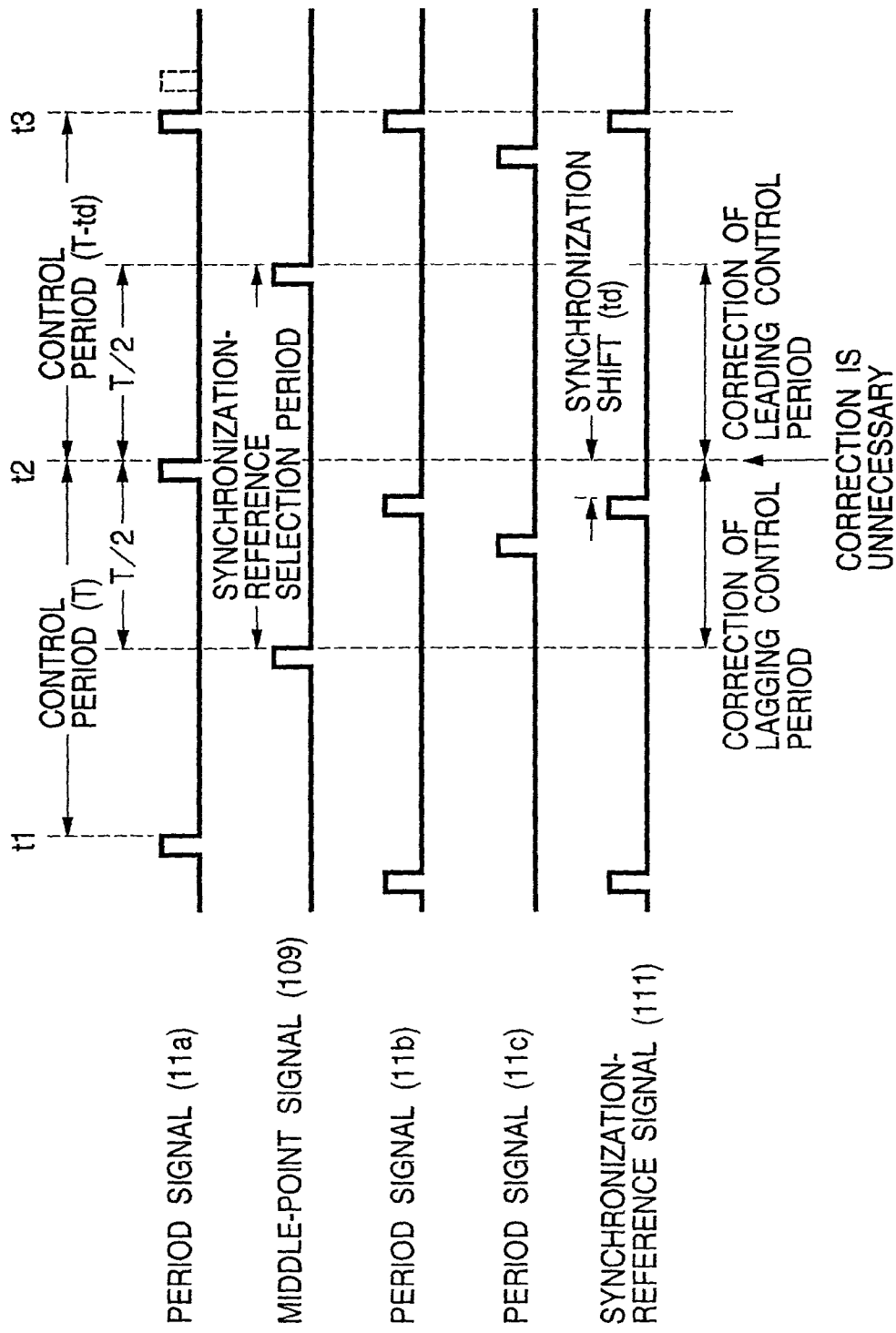

| SET | INC | HLD | DO |
|-----|-----|-----|------|
| 0 | 0 | 0 | DI |
| 0 | 0 | 1 | DI |
| 0 | 1 | 0 | DI |
| 0 | 1 | 1 | DI |
| 1 | 0 | 0 | 1 |
| 1 | 0 | 1 | DI |
| 1 | 1 | 0 | DI+1 |
| 1 | 1 | 1 | DI |

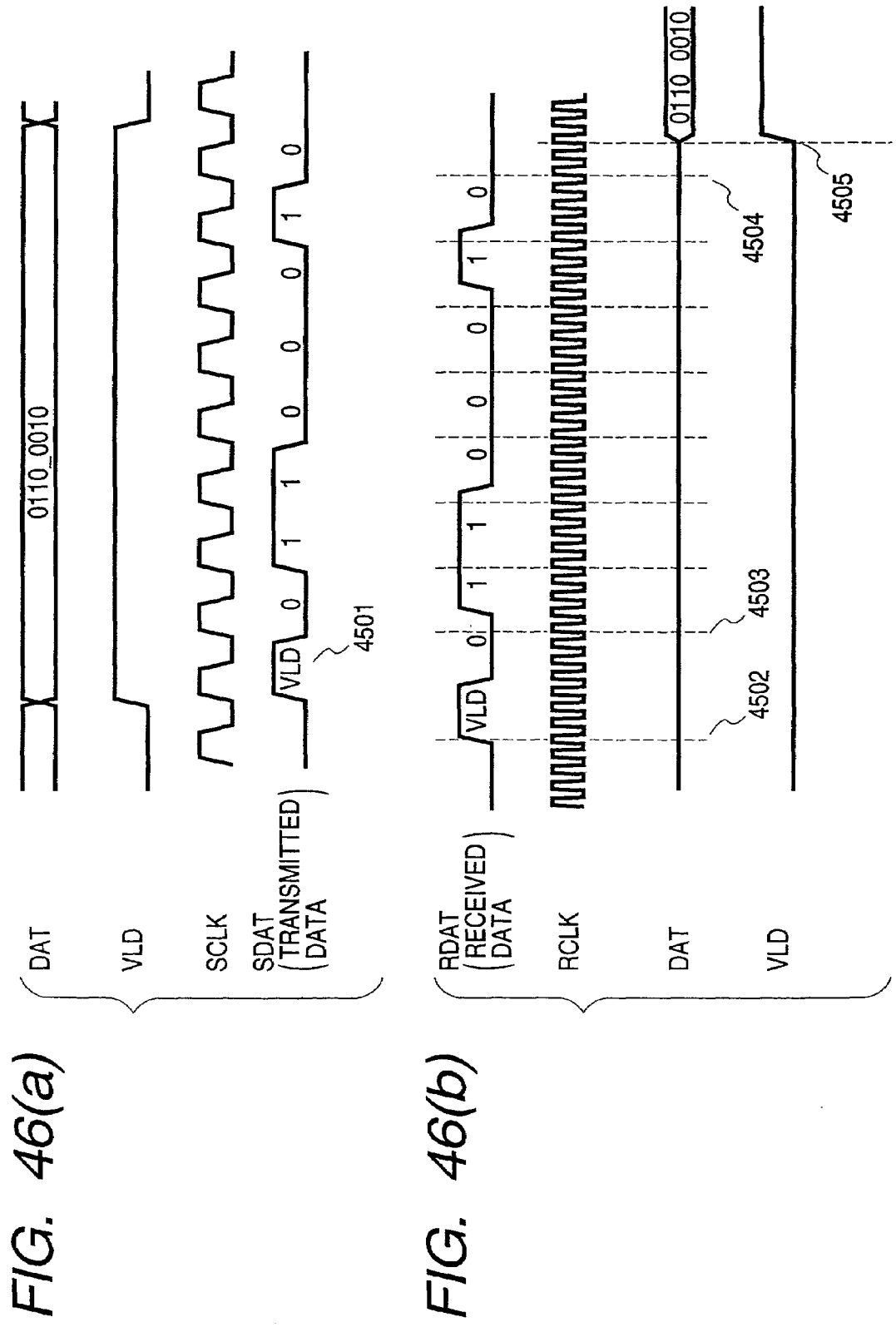

FIG. 50(a)

| | TYPE | | 4901 | | 4902 |
|---|---|---|---|---|---|
| $0010 | 0000_0000 | | 0000_0000 | | 0001_0000 |
| $0011 | 0000_0110 | | 0000_0110 | | 0000_0110 |
| $0012 | 0110_1001 | | 0110_1001 | | 0110_1001 |
| $0013 | 0100_1000 | | 0100_1000 | | 0100_1000 |
| $0014 | 0010_0010 | | 0010_0010 | | 0010_0010 |
| $0015 | 1001_0100 | | 1001_0100 | | 1001_0100 |
| | | FCS1 | 1101_0100 | FCS1 | 1001_0110 |
| | | FCS2 | 0011_1000 | FCS2 | 0110_0100 |

$0010 : TYPE
$0011 : TRANSMITTED BYTE COUNT : 6 (PACKET SIZE)
$0012~$0015 : USER DATA

PACKET DATA ON THE RAM　　CONSECUTIVE TRANSMISSION FIRST PACKET　　CONSECUTIVE TRANSMISSION SECOND PACKET

FIG. 50(b)

| | TYPE | | 4903 | | 4904 |
|---|---|---|---|---|---|
| $0110 | 1100_0000 | | 1100_0000 | | 1101_0000 |
| $0111 | 0000_0010 | | 0000_0110 | | 0000_0110 |
| | | FCS1 | 0001_0101 | FCS1 | 0011_1010 |
| | | FCS2 | 1011_0100 | FCS2 | 1101_0101 |

$0010 : TYPE
$0011 : TRANSMITTED BYTE COUNT : 2 (PACKET SIZE)
(NO USER-DATA AREA)

PACKET DATA ON THE RAM　　CONSECUTIVE TRANSMISSION FIRST PACKET　　CONSECUTIVE TRANSMISSION SECOND PACKET

FIG. 51(a)

RECEPTION-OPERATION JUDGING CIRCUIT 4702
  REQUEST FOR A MEMORY WRITE:
    NO SUCCESSFUL HISTORY PACKET OF THE SAME TYPE IS RECEIVED IN THE PAST DURING RECEPTION OF DATA PACKETS.
  REQUEST TO SET THE SUCCESSFUL-RECEPTION FLAG 4404:
    NO ERROR RECORD EXISTS IN THE RECEIVED-PACKET-INFORMATION REGISTER 4704 AND (THE RECEPTION COUNT IN THE RECEPTION-COUNT COUNTER 4701=0 OR A RECORD OF AN ERROR EXISTS IN THE HISTORY-PACKET-INFORMATION REGISTER 4705 OR THE IDENTITY JUDGING CIRCUIT 4703 JUDGES A PACKET CURRENTLY BEING RECEIVED TO BE A PACKET OF A DIFFERENT TYPE).
  ERROR-LOG REQUEST:
    INFORMATION INDICATING DETECTION OF AN ERROR EXISTS IN THE HISTORY-PACKET-INFORMATION REGISTER 4705 AND A PACKET CURRENTLY BEING RECEIVED IS THE LAST ONE.
  INTERRUPT SIGNAL TO THE SIGNAL LINE 4415:
    THE TYPE OF A PACKET STORED IN THE HISTORY-PACKET-INFORMATION REGISTER 4705 IS INDICATED BY A CODE OF '11' AND NO RECORD OF AN ERROR EXISTS IN THE HISTORY-PACKET-INFORMATION REGISTER 4705 AND A PACKET CURRENTLY BEING RECEIVED IS THE LAST ONE.

FIG. 51(b)

IDENTITY JUDGING CIRCUIT 4703:
  NO ERROR EXISTS IN A PACKET CURRENTLY BEING RECEIVED AND THE RECEPTION COUNT IN THE RECEPTION-COUNT COUNTER 4701 IS NOT 0 AND (NO ERROR HISTORY EXISTS IN THE HISTORY-PACKET-INFORMATION REGISTER 4705 AND (THE PACKET TYPE RECORDED IN THE RECEIVED-PACKET-INFORMATION REGISTER 4704)=(THE PACKET TYPE RECORDED IN THE HISTORY-PACKET-INFORMATION REGISTER 4705) AND THE RECEPTION COUNT IN THE RECEPTION-COUNT COUNTER 4701<=THE SEQUENCE NUMBER n OF THE REPEATED TRANSMISSION OF THE PACKET CURRENTLY BEING RECEIVED) OR (AN ERROR HISTORY EXISTS IN THE HISTORY-PACKET-INFORMATION REGISTER 4705 AND THE RECEPTION COUNT IN THE RECEPTION-COUNT COUNTER 4701<=THE SEQUENCE NUMBER n OF THE REPEATED TRANSMISSION OF THE PACKET CURRENTLY BEING RECEIVED)

FIG. 51(c)

RECEIVED-PACKET-INFORMATION REGISTER 4704 HAVING A WIDTH OF 6 BITS:
 PACKET TYPE: 2 BITS
 THE SEQUENCE NUMBER n OF THE REPEATED TRANSMISSION: 2 BITS
 ERROR INFORMATION-2 BITS:
  ERROR TYPE: 1 BIT INDICATING A CRC ERROR OR A RECEIVED-DATA OVERRUN ERROR
  ERROR DETECTION: 1 BIT INDICATING WHETHER AN ERROR IS DETECTED OR NOT

FIG. 51(d)

HISTORY-PACKET-INFORMATION REGISTER 4705 HAVING A WIDTH OF 4 BITS:
 PACKET TYPE: 2 BITS
 ERROR INFORMATION-2 BITS:
  ERROR TYPE: 1 BIT INDICATING A CRC ERROR OR A RECEIVED-DATA OVERRUN ERROR
  ERROR DETECTION: 1 BIT INDICATING WHETHER AN ERROR IS DETECTED OR NOT

FIG. 51(e)

LAST-PACKET JUDGING CIRCUIT 4706:
 (NO ERROR IS DETECTED IN A PACKET CURRENTLY BEING RECEIVED AND THE CONTENTS OF THE REPEATED-TRANSMISSION-COUNT SETTING REGISTER 4302)<=THE SEQUENCE NUMBER n OF THE REPEATED TRANSMISSION OF THE PACKET CURRENTLY BEING RECEIVED) AND (AN ERROR IS DETECTED IN A PACKET CURRENTLY BEING RECEIVED AND THE CONTENTS OF THE REPEATED-TRANSMISSION-COUNT SETTING REGISTER 4302<=THE CONTENTS OF THE RECEPTION-COUNTER 4701) OR (A SUCCESSFUL-RECEPTION HISTORY EXISTS IN THE HISTORY-PACKET-INFORMATION REGISTER 4705 AND THE PACKET TYPE STORED IN THE RECEIVED-PACKET-INFORMATION REGISTER 4704 IS DIFFERENT FROM THE PACKET TYPE STORED IN THE HISTORY-PACKET-INFORMATION REGISTER 4705) OR A TIME-OUT EVENT OCCURS DURING A PACKET WAITING STATE OF THE FINITE STATE MACHINE 4408.

$FFFF* (1 μs/10ms)=ABOUT 6.5←ERROR OF 3 BITS

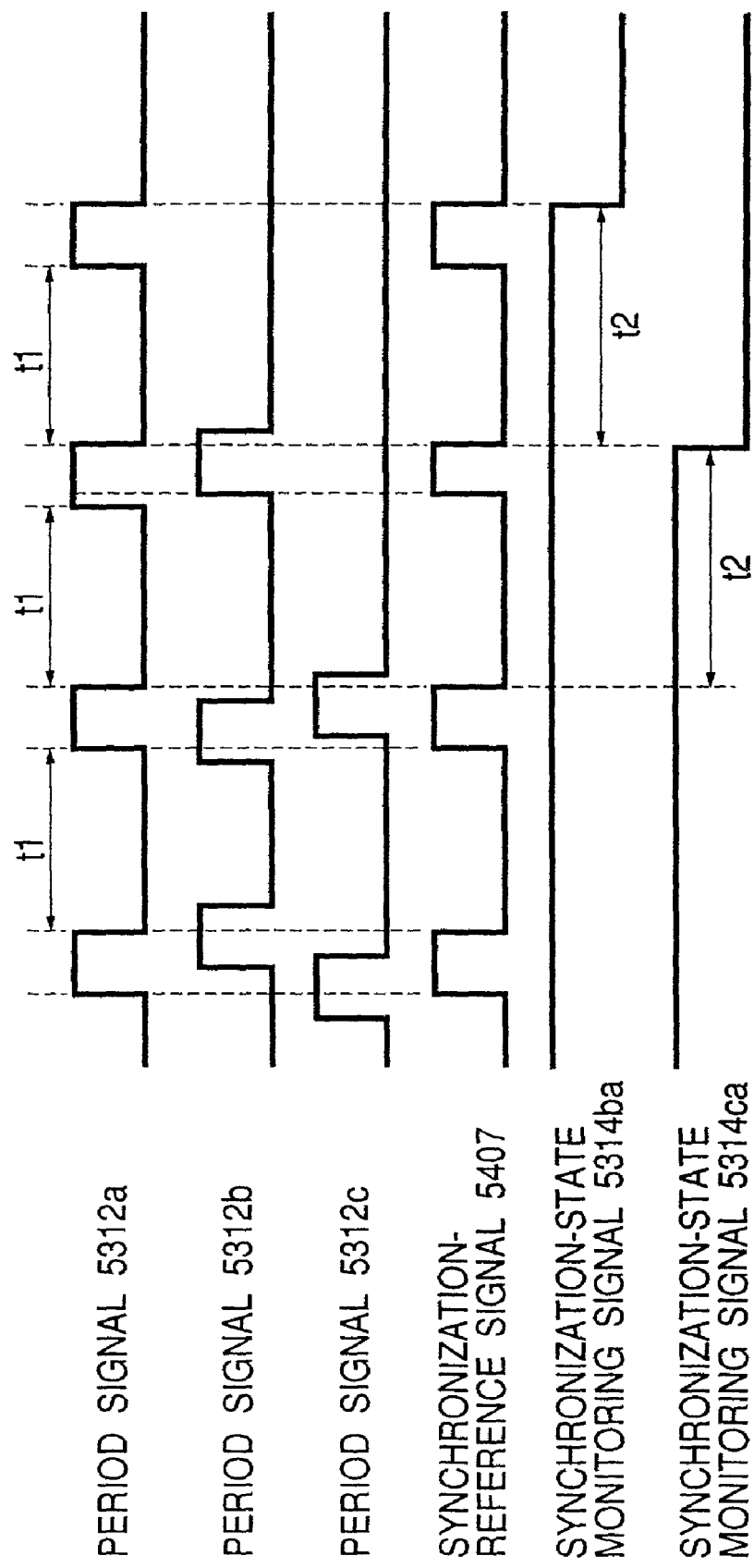

FIG. 58(a)
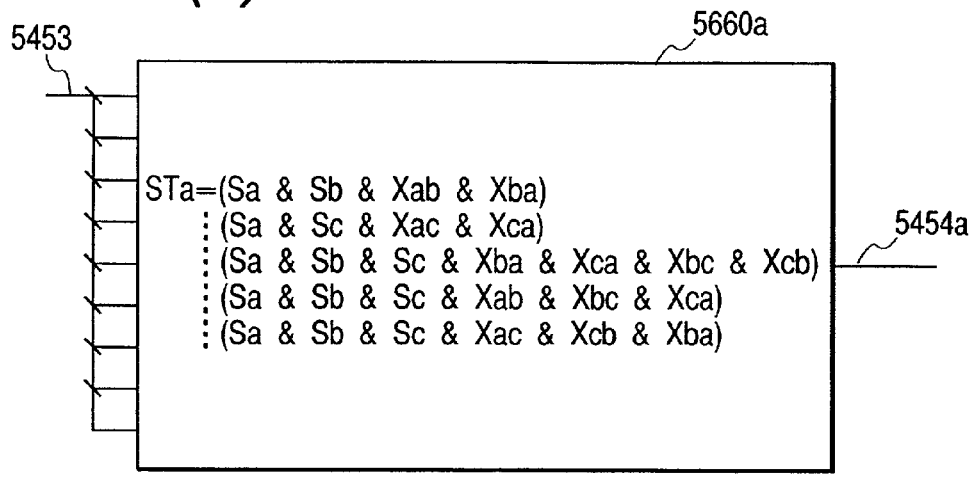
FIG. 58(b)
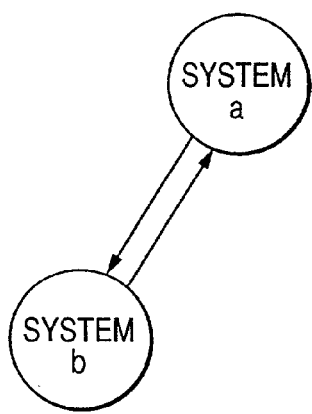
FIG. 58(c)
FIG. 58(d)
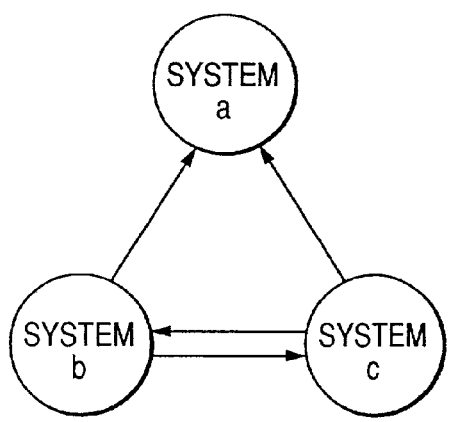
FIG. 58(e)
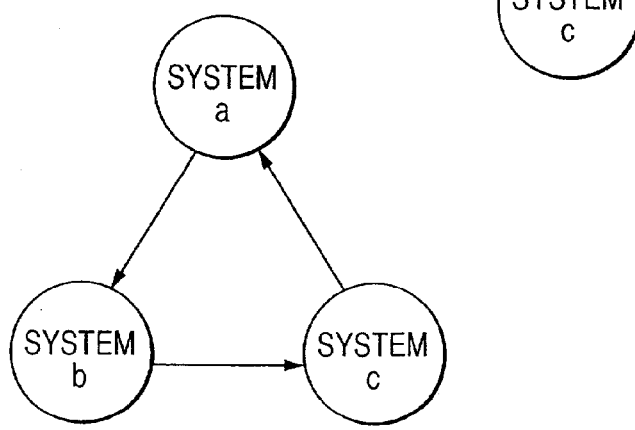
FIG. 58(f)
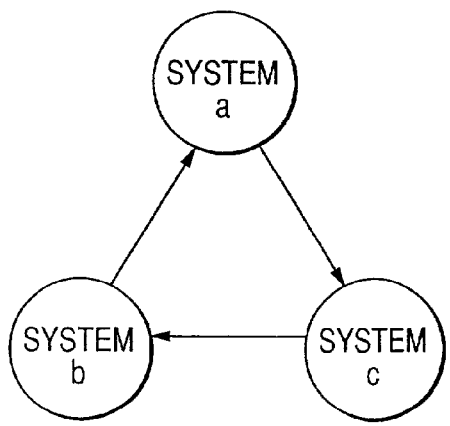

FIG. 64(a)

SELECTOR 5820

| 5663a | 5663b | 5663c | 5823a | 5823b |
|-------|-------|-------|-------|-------|
| 0 | 0 | 0 | 0 | 0 |
| 0 | 0 | 1 | 0 | 0 |
| 0 | 1 | 0 | 0 | 0 |
| 0 | 1 | 1 | 11b | 11c |
| 1 | 0 | 0 | 0 | 0 |
| 1 | 0 | 1 | 11a | 11c |
| 1 | 1 | 0 | 11a | 11b |
| 1 | 1 | 1 | 0 | 0 |

FIG. 64(b)

MISMATCHING DETECTION CIRCUIT 5821

| 5823a | 5823b | 5824 |
|-------|-------|------|
| 0 | 0 | 0 |
| 0 | 1 | 1 |
| 1 | 0 | 1 |
| 1 | 1 | 0 |

SYNCHRONIZATION SYSTEM AND SYNCHRONIZATION METHOD OF MULTISYSTEM CONTROL APPARATUS

This is a divisional application of U.S. Ser. No. 09/205,343 filed Dec. 4, 1993 now U.S. Pat. 6,389,041, now allowed.

BACKGROUND OF THE INVENTION

The present invention relates to a synchronization system and a synchronization method for synchronizing a synchronous-multisystem control apparatus comprising a plurality of systems operating synchronously with each other for each fixed control period. More particularly, the present invention relates to a synchronization system and a synchronization method for synchronizing a synchronous-multisystem control apparatus which comprises a plurality of systems operating synchronously with each other and is capable of at least operating with only one system.

In addition, the present invention relates to a communication control apparatus, or more particularly, relates to a communication control apparatus having an error-recovery function using a repeated-transmission technique.

Furthermore, the present invention relates to a synchronous-multisystem control apparatus comprising a plurality of control circuits and a degradation-control method or, in particular, relates to a synchronous-multisystem control apparatus and a degradation-control method capable of raising the availability factor of a system controlled by the synchronous-multisystem control apparatus and the degradation-control method.

A power converting apparatus comprises a power converter for converting power and a controller for controlling the power converter. The power converter comprises a plurality of switching devices. The power converter turns the switching devices on and off in accordance with gate pulse signals generated by the controller in order to convert power from direct-current power into alternating-current power or vice versa, or to shape the waveform of power. Thus, when an error is generated in the controller, power output by the power converter becomes abnormal.

Causes of generation of an error in the controller include a harsh environment of the site of power converting apparatus in which noise is most likely generated by an external source and introduced into the controller from the external source, radiated light such as alpha light introduced into the controller and deteriorating components of the controller.

Such a power converting apparatus is typically applied to systems such as a power generating system, an industrial production system, a railroad system and a public utility system. As generally known, such systems play roles of importance to society. It is thus necessary to prevent an abnormality from being generated in the power converting apparatus because an abnormality generated in the power converting apparatus will have a big impact on society. For this reason, there is demanded a controller which is capable of normally continuing control of the power converter even if an error is generated in the controller. In order to implement such a controller, a method to operate the controller as a multisystem controller is generally adopted.

In a multisystem control apparatus comprising a plurality of controllers provided for the same plurality of systems, it is necessary to synchronize the systems with each other. Methods for synchronizing a plurality of systems with each other include a technique to synchronize clock signals of the systems and a technique to synchronize beginnings of pieces of processing for the systems.

The technique to synchronize clock signals of systems comprises the step of generating the clock signals having phases shifted from each other by a predetermined number of angular degrees by relatively delaying a source oscillation signal from another, and for any specific system, the steps of:

forming a judgment as to whether the rising or falling edge of a clock signal of each other system leads ahead of or lags behind the rising or falling edge of the clock signal of the specific system;

selecting and outputting a clock signal lagging behind the clock signal of the specific system by a predetermined phase if a result of the judgment indicates that the clock signal of the specific system is leading ahead of a majority of clock signals of the other systems; and selecting and outputting a clock signal leading ahead of the clock signal of the specific system by a predetermined phase if a result of the judgment indicates that the clock signal of the specific system is lagging behind a majority of clock signals of the other systems.

Technologies for implementing the technique to synchronize clock signals of systems are disclosed in Japanese Patent Laid-open No. Sho 56-47120.

In the case of the technique to synchronize beginnings of pieces of processing for systems, on the other hand, a central processing apparatus of each of the systems is connected to a majority-decision making circuit and a timer. The technique comprises the steps of:

setting a value in the timer with predetermined timing;

outputting time-up information upon the lapse of a predetermined period of time;

supplying pieces of time-up information generated by all the systems to the majority-decision making circuit; and supplying an output determined by a decision based on a majority and made by the majority-decision making circuit, if any, to the central processing apparatus connected to the majority-decision making circuit as an interrupt.

Technologies for implementing the technique to synchronize beginnings of pieces of processing for systems are disclosed in Japanese Patent Laid-open No. Sho 62-57051.

Control executed by the power converting apparatus, which adopts the technique to synchronize beginnings of pieces of processing for systems and is employed in a power generating system, comprises an iterative sequence of steps of:

sampling the voltage and/or current generated by the power generating system;

determining on/off timings of switching devices employed in the power converting apparatus; and outputting gate pulse signals.

The sequence is repeated at a period of typically several tens of microseconds to several milliseconds. Thus, the beginnings of pieces of processing, that is, the start points of control periods, can be recognized. As a result, the systems can be loosely coupled.

In a synchronous-multisystem controller employed in a power converting apparatus adopting the technique to synchronize clock signals of the systems, on the other hand, there is a requirement to prevent a control period from being shifted even if the length of time it takes to transmit of a clock signal differs from system to system. It is thus necessary to tightly couple the systems.

In a synchronous-multisystem controller employed in a power converting apparatus, by the way, there is also a requirement to normally continue control of a power converter to sustain the operation of the synchronous-multisystem controller even if an error is generated in a controller of a system. It is thus necessary to prevent a failure occurring in a system from affecting the other systems, that is, to loosely couple the systems.

For the above reason, the technique to synchronize clock signals of systems is not appropriate for a synchronous-multisystem controller employed in a power converting apparatus. It is rather the technique to synchronize beginnings of pieces of processing for systems that can be said to be appropriate for a synchronous-multisystem controller employed in a power converting apparatus.

In the technique to synchronize beginnings of pieces of processing for systems, however, processing is started by an interrupt generated by a decision based on a majority of pieces of time-up information. In consequence, if a decision based on such a majority can not be made for some reasons such as the fact that only a controller of one system is operating, an interrupt can not be generated. In such a case, control to turn on and off switching devices employed in the power converter is suspended inevitably. As a result, there is raised a problem of a flowing overcurrent damaging the switching devices.

A controller which is capable of normally continuing control of the power converter even if an error is generated in the controller is also required for controlling equipment other than a power converting apparatus. Other controllers required for such control include a controller employed in an emergency power breaking system and a controller for industrial applications. To put it concretely, examples of such controllers are a control apparatus employed in an emergency power breaking system used for urgently breaking the supplying of energy such as fuel (including oil and gas) and electric power, a controller for controlling manufacturing equipment provided with sensors and actuators and a controller for controlling a production line of typically a metal refinery. We can assume cases in which a production machine is out of order or a product resulting from manufacturing work using the machine is damaged due to suspension of processing carried out by a controller in the course of control of the machine. In the case of a production line of a metal refinery, a lot of work and a lot of time are required to resume production in the event of a failure. For the reasons described above, a synchronous-multisystem control apparatus is adopted in such a controller and it is necessary for such a controller to be capable of sustaining the continuity of the control with a high degree of reliability.

It is thus a first object of the present invention to provide a capability of operating a synchronous-multisystem control apparatus based on at least one system even if a plurality of systems of the apparatus are halted.

A conventional communication control apparatus having an error-recovery function for recovering an error by repeated transmissions of the same data is disclosed in Japanese Patent Laid-open No. Hei 5-160815. In this communication control apparatus, a sequence of pieces of information is divided into information blocks. Each information block is put in a packet or a frame which also includes the number of transmissions to be carried out consecutively, that is, the number of times the packet is to be transmitted repeatedly, the sequence number of transmission and a block number representing the sequence number of the information block among information blocks composing the sequence of pieces of information. By transmitting a packet a number of times indicated by the number of transmissions, the receiver is capable of recovering a transmission error. Since the same information block is transmitted repeatedly a number of times by using frames, it is necessary for the receiver to form a judgment as to whether or not to discard a normally received current frame by comparing the block number and the contents of information block of the current frame with those of a frame normally received in a previous transmission. If they match each other, the normally received current frame is discarded.

In the conventional communication apparatus described above, however, a memory with a large storage capacity is required for storing the block number and the contents of information block of a frame normally received in a previous transmission. As a result, there is raised a problem of an increased amount of memory hardware.

In addition, since a lot of information is stored in a memory, an incident alpha ray may cause a problem of an increased probability that the stored data is lost.

There is also raised a problem of a most likely increased overhead of the processing to compare the block number and the contents of information block of a current frame with those of a frame normally received in a previous transmission.

Furthermore, in order to compare a packet just received with a packet stored in the memory, it is necessary to provide a memory-read circuit to read out data from the memory. As a result, there is raised another problem of an increased amount of circuitry.

It is therefore a second object of the present invention to reduce the amount of hardware and to decrease the overhead of reception processing besides to provide a capability of receiving information with a high degree of reliability.

As described above, the power converting apparatus for converting and controlling power is typically applied to systems such as a power generating system, an industrial production system, a railroad system and a public utility system which are important to society. In the application of the power converting apparatus to such a system, the power converting apparatus is installed in a harsh environment in which noise is most likely generated by an external source and introduced into the controller employed in the power converting apparatus from the external source. It is thus necessary to detect an error caused by noise generated in the controller and to halt execution of the control. If the control is interrupted frequently, however, society will be much affected. It is therefore necessary to avoid interruptions of the system as much as possible.

In general, as a method of increasing the reliability of a controller, the controller is designed into a multisystem configuration comprising a plurality of systems. By selecting outputs of only normally operating systems, the reliability of the controller can be increased. As a technique of identifying a system getting out of order in a multisystem controller due to an abnormality, any particular system is driven to exchange data with other systems of the controller. The particular system then compares pieces of data received from others with its own piece of data by using logic according to a decision based on a majority of the pieces of data in order to produce a piece of diagnosis data. If its own piece of data does not match the piece of diagnosis data produced by decision based on a majority, the particular system judges its own piece of data to be incorrect. This technique is disclosed in documents such as Japanese Patent Laid-open No. Hei 4-307633. A system judged to be out of order is detached from the diagnosing system according to a decision based on a majority before a two-system failure occurs to provide a multisystem controller assuring safety by adopting a technique disclosed in Japanese Patent Laid-open No. Hei 6-348524.

With the techniques described above, however, a problem is raised when matching of outputs is assured by establishing synchronization among systems. That is to say, with the techniques described above, a state of synchronization among controllers for different systems is not known with a high degree of reliability. Thus, when a system of a three-system control apparatus is halted and detached from the apparatus due to a failure for example, a two-system control apparatus comprising the remaining systems can be sustained. If an abnormality of synchronization between the remaining two systems further occurs, however, the outputs of the two systems do not match each other any more due to a synchronization shift. In this case, the failing system can not be identified, making it necessary to halt both the systems. Such a problem is encountered for example in a self-excited power converting apparatus employing a controller with an extremely short control cycle. In such a controller, since a synchronization shift most likely occurs, there is raised a problem of a decreased availability factor of the systems caused by a multisystem failure.

A controller that is capable of normally continuing the control of a power converting apparatus even in the event of an error generated in the controller may be needed in control of equipment other than the power converting apparatus in some cases. Examples of controllers required for such control include a controller employed in an emergency power breaking system and a controller for industrial applications.

To put it concretely, examples of such controllers are a control apparatus employed in an emergency power breaking system used for urgently breaking the supplying of energy such as fuel (including oil and gas) and electric power, a controller for controlling manufacturing equipment provided with sensors and actuators and a controller for controlling a production line of typically a metal refinery. We can assume cases in which a production machine is out of order or a product resulting from manufacturing work using the machine is damaged due to suspension of processing carried out by a controller in the course of control of the machine. In the case of a production line of a metal refinery, a lot of work and a lot of time are required to resume production in the event of a failure. For the reasons described above, a synchronous-multisystem control apparatus is adopted in such a controller and it is necessary for such a controller to be capable of sustaining the continuity of the control with a high degree of reliability.

It is thus a third object or the present invention to provide a degradation control method capable of increasing the availability factor in the event of a multisystem failure occurring in a multisystem control apparatus.

SUMMARY OF THE INVENTION

In order to achieve the first object, according to a first aspect of the present invention, there is provided a synchronization system for synchronizing period signals generated by a plurality of systems composing a synchronous-multisystem apparatus wherein any particular one of said systems comprises:

a synchronization-reference selecting circuit for selecting a period signal generated by one of said systems by referring to a period signal generated by said particular system and period signals generated by said systems other than said particular system and outputting a signal of a period corresponding to said selected period signal as a synchronization-reference signal; and a control-period correcting circuit for correcting a period of a period signal generated by said particular system on the basis of a synchronization shift between said period signal generated by said particular system and said synchronization-reference signal;

wherein:

if said synchronization-reference signal is output by said synchronization-reference selecting circuit, said control-period correcting circuit forms a judgment on said synchronization shift between said period signal generated by said particular system and said synchronization-reference signal and corrects said period of said period signal generated by said particular system on the basis of a result of said judgment; and if said synchronization-reference signal is not output by said synchronization-reference selecting circuit, on the other hand, said control-period correcting circuit does not correct said period of said period signal generated by said particular system.

Also in order to achieve the first object, according to a second aspect of the present invention, there is further provided a synchronization system for synchronizing period signals generated by a plurality of systems composing a synchronous-multisystem apparatus wherein any particular one of said systems comprises:

a synchronization-reference selecting means for selecting a period signal generated by one of said systems by referring to a period signal generated by said particular system and period signals generated by said systems other than said particular system and outputting a signal of a period corresponding to said selected period signal as a synchronization-reference signal; and a control-period correcting means for correcting a period of a period signal generated by said particular system on the basis of a synchronization shift between said period signal generated by said particular system and said synchronization-reference signal;

wherein:

if said synchronization-reference signal is output by said synchronization-reference selecting means, said control-period correcting means forms a judgment on said synchronization shift between said period signal generated by said particular system and said synchronization-reference signal and corrects said period of said period signal generated by said particular system on the basis of a result of said judgment; and if said synchronization-reference signal is not output by said synchronization-reference selecting means, on the other hand, said control-period correcting means does not correct said period of said period signal generated by said particular system.

Also in order to achieve the first object, according to a third aspect of the present invention, there is further provided a synchronous-multisystem control apparatus comprising a plurality of systems each for generating a period signal wherein:

any particular one of said systems starts processing at a point of time a period signal is generated by said particular system; and a peripheral unit synchronizes period signals generated by said systems with each other by adopting a synchronization system according to the second aspect of the present invention.

Also in order to achieve the first object, according to a fourth aspect of the present invention, there is further provided a synchronization method for synchronizing period signals generated by a plurality of systems composing a synchronous-multisystem apparatus wherein any particular one of said systems executes the steps of:

selecting a period signal generated by one of said systems by referring to period signals generated by said systems and outputting a signal of a period corresponding to said selected period signal as a synchronization-reference signal provided that a majority of period signals are generated by said systems during a synchronization-reference selection period determined in advance;

correcting a period of a period signal generated by said particular system on the basis of a synchronization shift between said period signal generated by said particular system and said synchronization-reference signal wherein:

if said synchronization-reference signal is not output, a period of a period signal generated by said particular system is used as a period of said period signal; and if said synchronization-reference signal is output, a period of a period signal generated by said particular system is shortened provided that said synchronization-reference signal is output, leading ahead of said period signal generated by said particular system, or said period of said period signal generated by said particular system is lengthened provided that said synchronization-reference signal is output, lagging behind said period signal generated by said particular system.

Further, in order to achieve the second object, according to a fifth aspect of the present invention, there is provided a communication control apparatus for exchanging information in a packet format, said apparatus comprising:

a transmission control unit having a repeated-transmission function for consecutively transmitting a plurality of packets each including the same user information, a sequence number of transmission in which said packet is transmitted and a frame check sequence for examination of an error; and a reception control unit having a frame-check-sequence examining means for detecting an error, a packet-identity judging means and a reception-history control means provided with a reception-count counter for counting the number of times said packets have been received so far, that is, substantially for detecting said sequence number of transmission, wherein said reception control unit carries out reception processing only if at least one of said packets transmitted consecutively is received successfully and information on an error is recorded if all said packets transmitted consecutively are received unsuccessfully.

Furthermore, in order to achieve the third object, according to a sixth aspect of the present invention, there is provided a degradation control method for degrading a plurality of synchronized control circuits each provided for a system, said method comprising the steps of:

acquiring information on operating states of said control circuits and information on states of synchronization among said control circuits; and selecting outputs of two of said control circuits for two corresponding systems which have normal operating states and a normal state of mutual synchronization between said two systems, or selecting outputs of at least three of said control circuits for at least three corresponding systems which have normal operating states and normal states of rotational synchronization among at least said three systems.

Also in order to achieve the third object, according to a seventh aspect of the present invention, there is further provided a synchronous-multisystem control apparatus comprising a plurality of control circuits operating synchronously with each other at a fixed control period to carry out the same processing and an output selector for monitoring operating states of said control circuits and selecting an output of one of said control circuits wherein:

said output selector has a synchronous-multisystem-state storing memory for storing information on operating states of said control circuits and information on states of synchronization among said control circuits and a configuration controller for generating a signal for selecting an output of one of said control circuits; and said configuration controller generates a signal for selecting an output of one of said control circuits by referring to information stored in said synchronous-multisystem-state storing memory.

BRIEF DESCRIPTION OF THE DRAWINGS

FIG. 5 is timing charts used for explaining the basic operation of the synchronization circuit shown in FIG. 4;

FIGS. 46(a) and 46(b) are timing charts showing the operations of a parallel/serial-conversion circuit and a serial/parallel-conversion circuit employed in the serial interface circuit shown in FIG. 43;

FIGS. 50(a) and 50(b) are diagrams showing typical formats of a data packet and an interrupt packet;

FIGS. 51(a) through 51(e) are descriptions explaining operating conditions used by a reception-operation judging circuit, an identity judging circuit and a last-packet judging circuit as well as functions of a received-packet-information register and a history-packet-information register employed in the history control circuit shown in FIG. 48;

FIGS. 55(a) and 55(b) are a block diagram showing a typical configuration of a synchronization circuit employed in the control circuit shown in FIG. 54 and timing charts representing the operation of the synchronization circuit, respectively;

FIGS. 58(a) through 58(f) are explanatory diagrams showing a synchronization judging circuit employed in the configuration control circuit shown in FIG. 57; to be more specific, FIG. 58(a) is a diagram showing an equation of operating logic adopted in the synchronization judging circuit and FIGS. 58(b) to 58(f) are explanatory diagrams showing criteria each for determining a synchronized state;

FIGS. 64(a) and 64(b) are explanatory diagrams showing used for describing the operations of a selector and a mismatching detection circuit employed in the two-system-configuration control circuit shown in FIG. 63; to be more specific, FIGS. 64(a) and 64(b) show truth tables of the selector and the mismatching detection circuit respectively.

DESCRIPTION OF THE PREFERRED EMBODIMENTS

The present invention will become more apparent from a careful study of the following detailed description of some preferred embodiments with reference to the accompanying diagrams.

The description begins with an explanation of a power converting apparatus controlled by a synchronous-multisystem control apparatus which comprises a plurality of systems and allows an operation by at least one of the systems even if some of the systems are halted.

Embodiments of the present invention are explained by referring to diagrams as follows.

First of all, a first embodiment is explained by referring to FIGS. 1 to 25.

Figure 1:
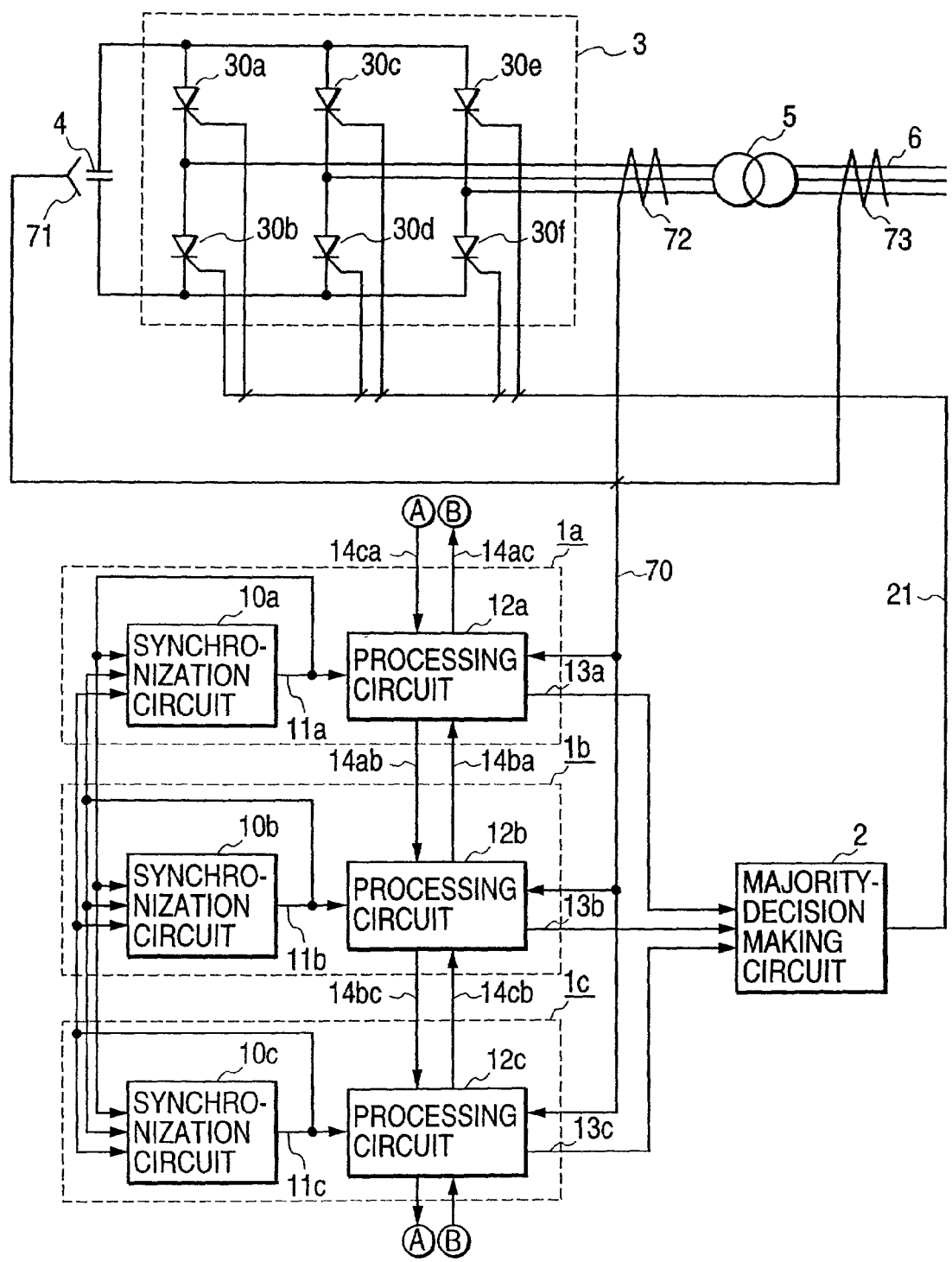
FIG. 1 is a block diagram showing a typical configuration of a power converting apparatus implemented by a first embodiment of the present invention.

To begin with, a power converting apparatus having a synchronous-multisystem control apparatus provided by the present invention is described by referring to FIG. 1.

As shown in FIG. 1, the power converting apparatus comprises a direct-current power supply 4 for supplying direct-current power, a power converter 3 for converting the direct-current power into alternating-current power, a transformer 5 for raising the voltage of the alternating-current power, a 3-phase 3-line power generating system 6 for transmitting alternating-current power output by the transformer 5, a sensor 71 for detecting voltage and current values of the direct-current power supplied by the direct-current power supply 4, a sensor 72 for detecting voltage and current values of the alternating-current power output by the power converter 3, a sensor 73 for detecting voltage and current values of the alternating-current power supplied to the 3-phase 3-line power generating system 6, controllers 1a, 1b and 1c for controlling the power converter 3 and a majority-decision making circuit 2 for making a decision based on a majority of gate pulses generated by the controllers 1a, 1b and 1c.

The controllers 1a, 1b and 1c work synchronously to execute the same operation. That is to say, the controllers 1a, 1b and 1c operate, being synchronized with each other for each control period determined in advance. The controllers 1a, 1b and 1c turn on and off switching devices 30a to 30f to execute synchronous control. The controller 1a comprises a synchronization circuit 10a and a processing circuit 12a for generating gate pulses 13a. Similarly, the controller 1b comprises a synchronization circuit 10b and a processing circuit 12b for generating gate pulses 13b whereas the controller 1c comprises a synchronization circuit 10c and a processing circuit 12c for generating gate pulses 13c.

The synchronization circuit 10a is used for generating a period signal 11a synchronized with period signals 11b and 11c whereas the synchronization circuit 10b is used for generating a period signal 11b synchronized with the period signals 11a and 11c. Likewise, synchronization circuit 10c is used for generating the period signal 11c synchronized with the period signals 11a and 11b. The period signals 11a, 11b and 11c indicate start points of the control periods for the controllers 1a, 1b and 1c respectively.

The processing circuits 12a, 12b and 12c receives power generating system information 70 when triggered by the period signals 11a, 11b and 11c respectively. The power generating system information 70 includes voltage and current values of the direct-current power supplied by the direct-current power supply 4 detected by the sensor 71, voltage and current values of the alternating-current power output by the power converter 3 detected by the sensor 72 and voltage and current values of the alternating-current power supplied to the 3-phase 3-line power generating system 6 detected by the sensor 73. The processing circuits 12a, 12b and 12c also generate the gate pulses 13a, 13b and 13c respectively for indirectly turning the switching devices 30a to 30f of the power converter 3 on and off in each control period in accordance with the power generating system information 70. The processing circuits 12a, 12b and 12c are connected to each other by data transmission lines 14ac, 14ca, 14ab, 14ba, 14bc and 14cb.

The majority-decision making circuit 2 makes a decision based on a majority of the gate pulses 13a, 13b and 13c, outputting a gate pulse 21. It should be noted that the gate pulses 13a to 13c and the gate pulse 21 include gate pulses for the switching devices 30a to 30f.

The switching devices 30a to 30f employed in the power converter 30 are turned on and off by the gate pulses output by the major decision making circuit 2, converting the direct-current power generated by the direct-current power supply 4 into alternating-current power which is finally output to the power generating system 6 by way of the transformer 5.

The switching device 30a is a switching device on the positive side of a U phase while the switching device 30b is a switching device on the negative side of the U phase. On the other hand, the switching device 30c is a switching device on the positive side of a V phase while the switching device 30d is a switching device on the negative side of the V phase. Finally, the switching device 30e is a switching device on the positive side of a W phase while the switching device 30f is a switching device on the negative side of the W phase.

As described above, the switching devices 30a to 30f employed in the power converter 30 are turned on and off by the gate pulse signal output by the major decision making circuit 2. In this embodiment, a switching device is provided on the positive side and another on the negative side for each phase as described above. However, a plurality of switching devices connected in series can also be provided on each side of any phase in order to increase a voltage withstanding characteristic of the power converter 3.

Figure 2:
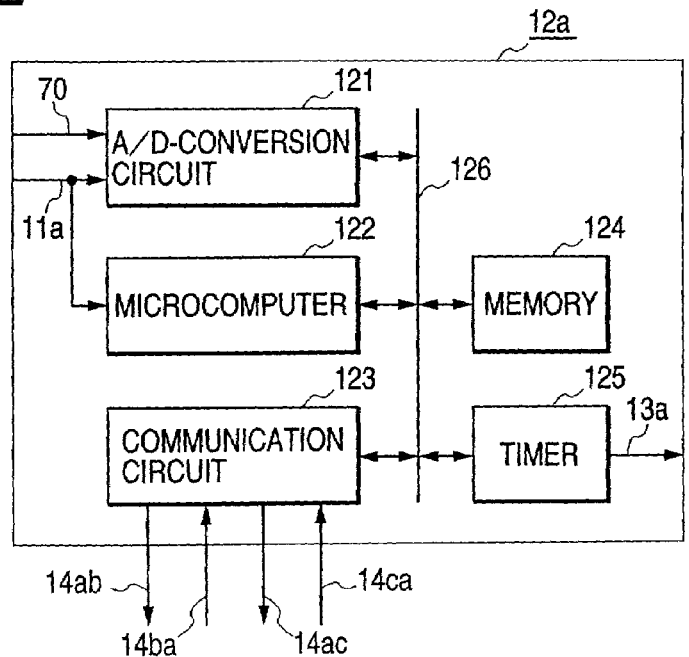
FIG. 2 is a block diagram showing a typical configuration of a processing circuit employed in the power converting apparatus shown in FIG. 1.

Next, the processing circuit 12a is explained by referring to FIG. 2. It should be noted that, the processing circuits 12b and 12c employed in the power converting apparatus shown in FIG. 1 have the same configuration as the processing circuit 12a.

As shown in FIG. 2, the processing circuit 12a comprises an A/D conversion circuit 121, a microcomputer 122, a communication circuit 123, a memory unit 124, a timer 125 and a bus 126. The A/D conversion circuit 121 samples the power generating system information 70 for each control period, converting the sampled analog value into digital data. The microcomputer 122 caries out processing based on current power generating system information obtained from the A/D conversion circuit 121 and past power generating system information stored in the memory unit 124 to determine on/off timing of the gate pulse 13a. The communication circuit 123 exchanges data with the processing circuits 12b and 12c. The memory unit 124 is used for storing a control program describing a procedure of operations carried out by the microcomputer 122 and power generating system information 70 obtained in the past. The timer 125 outputs the gate pulse 13a with on-timing thereof determined by the microcomputer 122. The bus 126 connects the A/D conversion circuit 121, the microcomputer 122, the communication circuit 123, the memory unit 124 and the timer 125 to each other.

The A/D conversion circuit 121 transfers the digital data resulting from the conversion of a sampled analog value of the power generating system information 70 to the microcomputer 122. The transfer is triggered by the period signal 11a received by the A/D conversion circuit 121 from the synchronization circuit 10a. That is to say, the transfer takes place at the start point of a control period.

The period signal 11a is also supplied to the microcomputer 122. Receiving the period signal 11a, the microcomputer 122 caries out processing based on the power generating system information 70 transferred from the A/D conversion circuit 121 and the past power generating system information 70 stored in the memory unit 124 to determine on/off timing of the gate pulse 13a, that is, a time at which the gate pulse 13a is to be output. The time is then communicated to the timer 125. When the due time instructed by the microcomputer 122 is detected, the timer 125 changes the gate pulse 13a from an on state to an off state or vice versa.

The microcomputer 122 also transmits the power generating system information 70 and information on the on/off timing of the pulse signal 13a to the processing circuits 12b and 12c by way of the communication circuit 123. By exchanging such information with the processing circuits 12b and 12c and comparing the information with each other, the controller 1a is capable of monitoring the operations of the controllers 1b and 1c.

Next, the major decision making circuit 2 is explained by referring to FIG. 3.

Figure 3A:
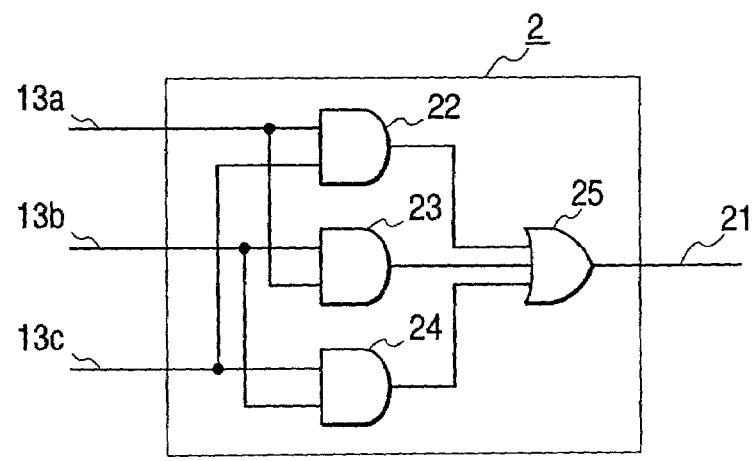
FIGS. 3(a) and 3(b) are a block diagram showing a typical configuration and timing charts of a majority-decision making circuit employed in the power converting apparatus shown in FIG. 1, respectively.

The explanation begins with a description of the configuration of the major decision making circuit 2 with reference to FIG. 3(a). In order to simplify the description, FIG. 3(a) only shows a portion of the major decision making circuit 2 for outputting a gate pulse to one of the switching devices 30a to 30f. In actuality, there are as many such portions as the switching devices 30a to 30f. Each of the portions outputs a gate pulse to one of the switching devices 30a to 30f.

As shown in FIG. 3(a), the major decision making circuit 2 comprises AND gates 22, 23 and 24 and an OR gate 25. Any 2 of the gate pulses 13a, 13b and 13c received from respectively the controllers 1a, 1b and 1c shown in FIG. 1 are supplied to one of the AND gates 22, 23 and 24. To be more specific, the AND gate 22 receives the gate pulses 13a and 13c, the AND gate 23 receives the gate pulses 13a and 13b and the AND gate 24 receives the gate pulses 13b and 13c.

The AND gates 22, 23 and 24 each output a logic value of 1 when the logic values of the 2 gate pulses supplied thereto are both 1. Otherwise, a logic value of 0 is output. To be more specific, the AND gate 22 outputs a logic value of 1 if the gate pulses 13a and 13c both have a logic value of 1, the AND gate 23 outputs a logic value of 1 if the gate pulses 13a and 13b both have a logic value of 1 and the AND gate 24 outputs a logic value of 1 if the gate pulses 13b and 13c both have a logic value of 1.

Signals output by the AND gates 22, 23 and 24 are supplied to the OR gate 25. The OR gate 25 outputs a value of 1 if at least one of the signals supplied by the AND gates 22, 23 and 24 has a value of 1. The OR gate 25 outputs a value of 0 only if all the signals supplied by the AND gates 22, 23 and 24 have a value of 0. The logic value output by the OR gate 25 is supplied to the power converter 3 shown in FIG. 1 as a gate pulse 21.

Figure 3B:
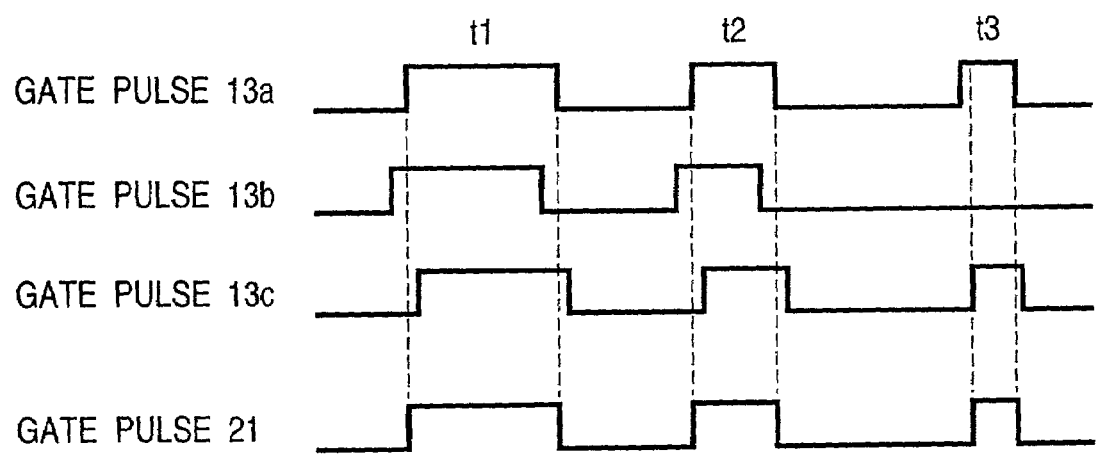

Next, the operation of the major decision making circuit 2 is explained by referring to FIG. 3(b) which shows timing charts of the major decision making circuit 2.

As shown in FIG. 3(b), at t1 and t2, the gate pulses 13a, 13b and 13c are shifted from each other. Such a shift in gate pulse is attributed to, among other causes, variations in processing time among the controllers 1a, 1b and 1c shown in FIG. 1. When the gate pulses 13a, 13b and 13c are shifted from each other, synchronization can be reestablished by the major decision making circuit 2 by using the gate pulse 21 which is generated in accordance with a decision based on a majority of the gate signals 13a, 13b and 13c.

Then, at t3, a failure occurs at the controller 1b; one of the 3 controllers 1a, 1b and 1c, causing no gate pulse 13b to be output. Even in such a state, the major decision making circuit 2 makes a decision based on a majority of the gate pulses 13a and 13c, being capable of outputting a normal gate pulse 21. In this way, the major decision making circuit 2 is capable of outputting a normal gate pulse 21 by making a decision based on a majority even if one of the 3 controllers 1a, 1b and 1c is out of order or even if a gate pulse 13a, 13b or 13c is output with improper timing.

Figure 4:
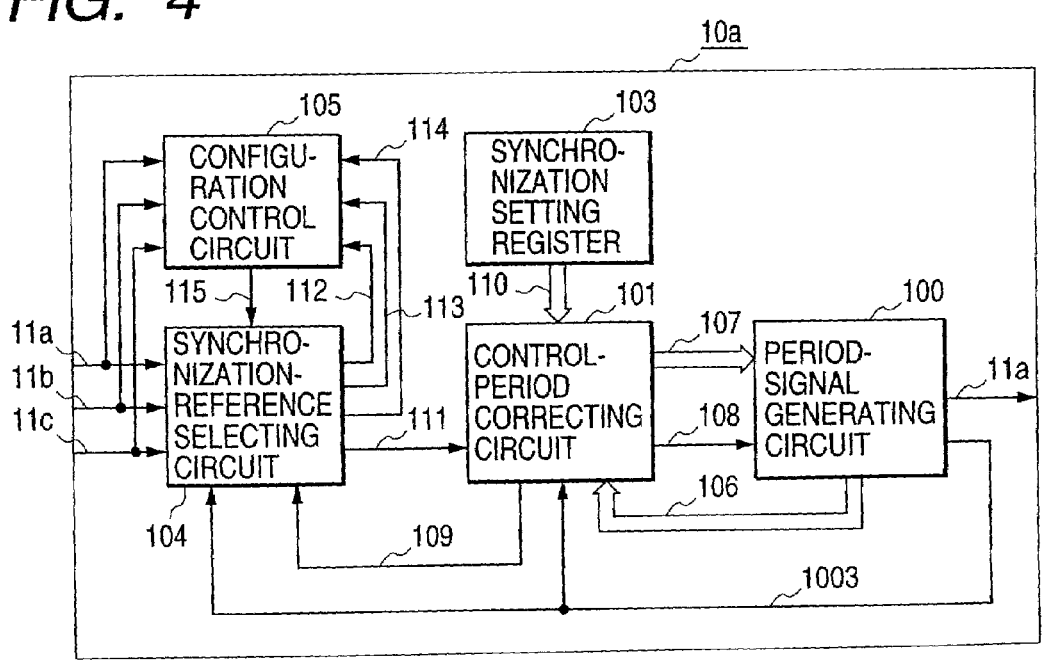
FIG. 4 is a block diagram showing a typical configuration of a synchronization circuit employed in the power converting apparatus shown in FIG. 1.

Next, the synchronization circuit 10a is explained by referring to FIG. 4. It should be noted that, the synchronization circuits 10b and 10c employed in the power converting apparatus shown in FIG. 1 have the same configuration as the synchronization circuit 10a shown in FIG. 4.

As shown in FIG. 4, the synchronization circuit 10a comprises a period-signal generating circuit 100, a control-period correcting circuit 101, a control-period setting register 103, a synchronization-reference selecting circuit 104 and a configuration control circuit 105.

The synchronization-reference selecting circuit 104 selects a synchronization reference among the period signals 11a, 11b and 11c of three systems, that is, the 3 phases U, V and W respectively. The configuration control circuit 105 controls the configuration of a synchronized operation such as a single-system operation, a double-system operation or a triple-system operation and the control-period setting register 103 is used for setting a control period. The control-period correcting circuit 101 corrects the control period set in the control-period setting register 103 so that the timing of the period signal 11a of the synchronization circuit 10a matches the synchronization reference. The period-signal generating circuit 100 generates the period signal 11a. The synchronization circuit 10a operates in synchronization with a clock signal at a control period determined by the contents of the control-period setting register 103. The unit of the contents of the control-period-setting register 103 representing the control period is the clock cycle of the clock signal.

The synchronization-reference selecting circuit 104 selects a synchronization reference among the period signals 11a, 11b and 11c, to be more specific, among period signals of systems in the synchronization operation indicated by information on the configuration supplied by the configuration control circuit 105, outputting the selected period signal as a synchronization-reference signal 111. The synchronization-reference signal 111 is a period signal selected during a period of time having the same length as 1 control period. Such a period which includes the start point of the control period of the synchronization circuit 10a is referred to hereafter as a synchronization-reference selection period. A period signal is so selected as a synchronization-reference signal 111 that, when the selected period signal appears, a majority of the period signals 11a, 11b and 11c have been detected during the synchronization-reference selection period. It is desirable to set the synchronization-reference selection period to start at a middle point in a control period of the synchronization circuit 10a preceding a start point, that is, a point of time t2 in the example shown in FIG. 5, and end at a middle point in a control period succeeding the start point. That is to say, a period between the starting middle point and the start point is the first half of the synchronization-reference selection period whereas a period between the start point and the ending middle point is the second half of the synchronization-reference selection period.

In the case of a three-system synchronized operation, for example, the synchronization-reference selecting circuit 104 selects the second period signal detected during the synchronization-reference selection period as a synchronization reference. In the case of a two-system synchronized operation, on the other hand, the synchronization-reference selecting circuit 104 selects the first period signal detected during the synchronization-reference selection period as a synchronization reference. It should be noted that a start middle point of a control period cited above is indicated by a middle-point signal 109 which is output at the end of the second half of each synchronization-reference selection period. A point of time at which the period signal 11a is output can be used as the start point of a control period of the synchronization circuit 10a.

If a controller is operating in a synchronized operation and a period signal of the controller is not output, the synchronization-reference selecting circuit 104 outputs a missing-control-period-signal indicating signal. To be more specific, if the controller 1a shown in FIG. 1 is operating in a synchronized operation and the period signal 11a of the controller 1a is not output during the synchronization reference selection period, a missing-control-period-signal indicating signal 112 is output. Similarly, if the controller 1b shown in FIG. 1 is operating in a synchronized operation and the period signal 11b of the controller 1b is not output during the synchronization reference selection period, a missing-control-period-signal indicating signal 113 is output. Likewise, if the controller 1c shown in FIG. 1 is operating in a synchronized operation and the period signal 11c of the controller 1c is not output during the synchronization reference selection period, a missing-control-period-signal indicating signal 114 is output.

The configuration control circuit 105 selects some of the controllers 1a, 1b and 1c that are capable of operating in the synchronized operation on the basis of the configuration of the synchronized operation set in advance and the missing-control-period-signal indicating signals 112, 113 and 114, outputting synchronized-operation information 115 indicating the selected controllers.

The control-period correcting circuit 101 forms a judgment as to whether or not a synchronization shift exists between the synchronization-reference signal 111 and the period signal 11a of the synchronization circuit 10a from output timing of a count-up signal 1003 and the synchronization-reference signal 111. On the basis of the result of the judgment, the control-period correcting circuit 101 lengthens or shortens the control period so that the next output timing of the period signal 11a matches the output timing of the synchronization-reference signal 111. The control-period correcting circuit 101 then supplies the period-signal generating circuit 100 with a new control-period value 107 which is determined by referring to a control-period set value 110 already stored in the control-period setting register 103 and a count value 106 supplied by the period-signal generating circuit 100. If the control period is corrected by lengthening it, the control-period correcting circuit 101 outputs a suppression signal 108 for temporarily suppressing the period signal 11a along with the control-period value 107.

As a period of time indicated by the control-period value 107 lapses since the start point of a control period, the period-signal generating circuit 100 outputs the count-up signal 1003. If the suppression signal 108 is not received from the control-period correcting circuit 101, the period signal 11a is generated along with the count-up signal 1003.

Next, the basic operation of the synchronization circuit 10a is explained by referring to FIG. 5 showing timing charts representing operations carried out by the synchronization circuit 10a. The operations of the synchronization circuits 10b and 10c are the same as that of the synchronization circuit 10a shown in FIG. 5.

A synchronization reference for a period signal 11a at a point of time t2 shown in FIG. 5 is selected among period signals detected during a synchronization-reference selection period. The current synchronization-reference selection period is set as a period of time comprising the 2 halves of a control period sandwiching the point of time t2. The start and the end of the synchronization-reference selection period are each indicated by the middle-point signal 109. Since FIG. 5 is a diagram showing a state of a three-system synchronized operation, the period signal 11b detected as a second signal in the current synchronization-reference selection period is selected as the synchronization-reference signal 111 because when the period signal 11b is detected, the period signals 11a and 11b, a majority of the period signals 11a, 11b and 11c, have appeared during the synchronization-reference selection period.

A judgment as to whether the control period of the controller 1a is leading ahead of or lagging behind the synchronization reference is formed as follows:

1. If the output timing of the synchronization-reference signal 111 coincides with the period signal 11a of the controller 1a, a synchronization shift is determined to be non-existent.

2. If the output timing of the synchronization-reference signal 111 leads ahead of the period signal 11a of the controller 1*a*, the control period of the controller 1*a* is judged to be lagging behind the synchronization reference.

3. If the output timing of the synchronization-reference signal 111 lags behind the period signal 11*a* of the controller 1*a*, the control period of the controller 1*a* is judged to be leading ahead of the synchronization reference.

In particular, with the synchronization-reference selection period set as a period of time comprising halves of a control period sandwiching the period signal 11*a* of the controller 1*a* as described above, the judgment as to whether the control period of the controller 1*a* is leading head of or lagging behind the synchronization reference is formed as follows:

1. If the output timing of the synchronization-reference signal 111 coincides with the period signal 11*a* of the controller 1*a*, a synchronization shift is determined to be non-existent.
2. If the synchronization-reference signal 111 is output during the first half of the synchronization-reference selection period preceding the period signal 11*a* of the controller 1*a*, the control period of the controller 1*a* is judged to be lagging behind the synchronization reference.
3. If the synchronization-reference signal 111 is output during the second half of the synchronization-reference selection period succeeding the period signal 11*a* of the controller 1*a*, the control period of the controller 1*a* is judged to be leading ahead of the synchronization reference. In the example shown in FIG. 5, since the synchronization-reference signal 111 is output during the first half of the synchronization-reference selection period preceding the period signal 11*a* of the controller 1*a*, the control period of the controller 1*a* is judged to be lagging behind the synchronization reference.

A lagging or leading control period of the controller 1*a* is corrected to eliminate a synchronization shift as follows.

1. A lagging control period of the controller 1*a* is corrected by shortening the next processing period by a synchronization-shift time td so that the next control period becomes shorter than a predetermined control period T.
2. A leading control period of the controller 1*a* is corrected by lengthening the next processing period by a synchronization-shift time td so that the next control period becomes longer than the predetermined control period T.

In the case of the example shown in FIG. 5, the period signal 11*a* is output at a point of time t2 which lags behind the synchronization-reference signal 111, indicating a lagging control period of the controller 1*a*. In this case, the next processing period is shortened by the synchronization-shift time td so that the next control period becomes equal to (T−td). As a result, at a point of time t3, the period signal 11*a* is output with timing coinciding with the timing of the synchronization-reference signal 111.

Figure 6:
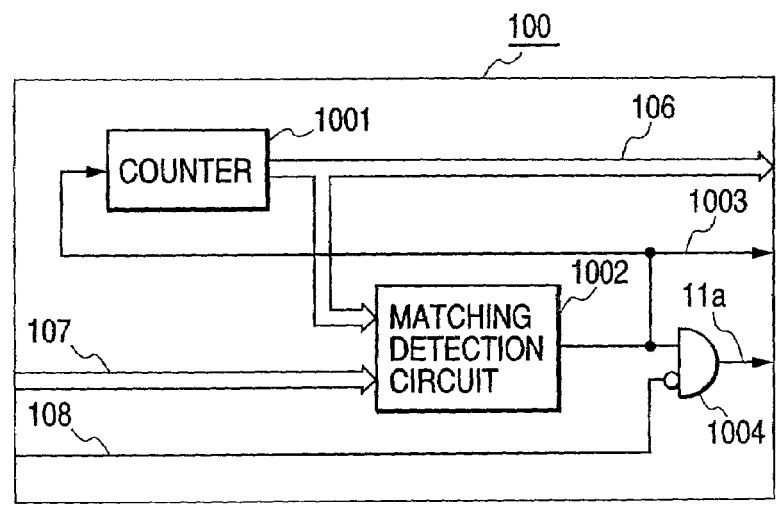
FIG. 6 is a block diagram showing a typical configuration of a period-signal generating circuit employed in the synchronization circuit shown in FIG. 4.

Next, the period-signal generating circuit 100 is explained by referring to FIG. 6.

As shown in FIG. 6, the period-signal generating circuit 100 comprises a counter 1001, a matching detection circuit 1002 and a logic circuit 1004.

The counter 1001 increments a count value 106 stored therein in synchronization with the clock signal. The matching detection circuit 1002 detects a state in which the count value 106 matches the control-period value 107. When such a state is detected, the matching detection circuit 1002 outputs the count-up signal 1003. The logic circuit 1004 controls an operation to output the period signal 11*a*.

When the count-up signal 1003 is output, the counter 1001 is reset and the counting is started. The counter 1001 outputs the count value 106 all the time. The matching detection circuit 1002 compares the count value 106 output by the counter 1001 with the control-period value 107 to detect a state in which the count value 106 matches the control-period value 107. When such a state is detected, the matching detection circuit 1002 outputs the count-up signal 1003 as described above.

The logic circuit 1004 outputs the period signal 11*a* when the count-up signal 1003 is output provided that the suppression signal 108 is not received. If the suppression signal 108 is received, on the other hand, the period signal 11*a* is not generated.

Figure 7:
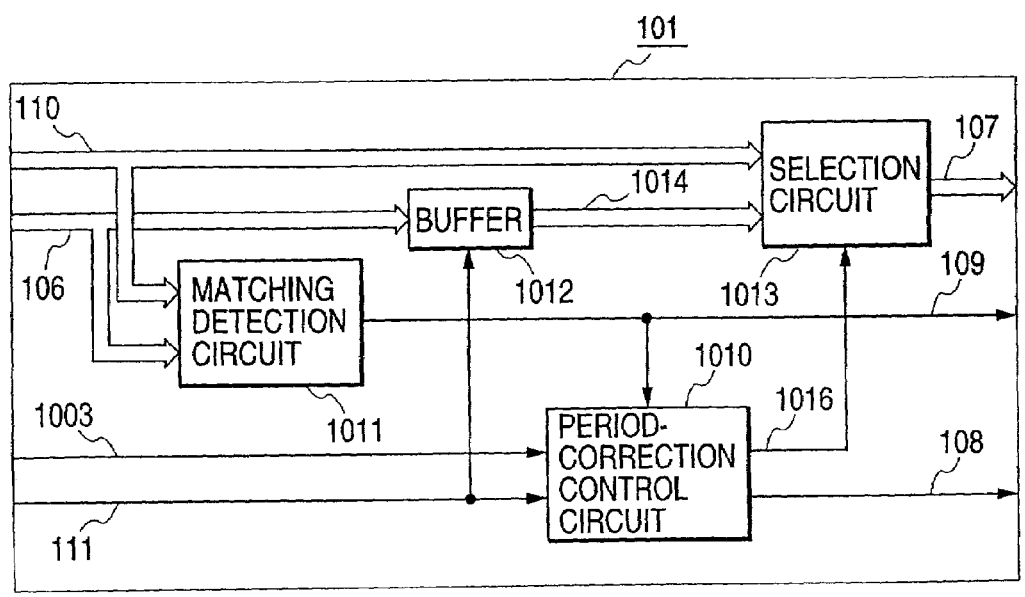
FIG. 7 is a block diagram showing a typical configuration of a control-period correcting circuit employed in the synchronization circuit shown in FIG. 4.

Next, the control-period correcting circuit 101 is explained by referring to FIG. 7.

As shown in FIG. 7, the control-period correcting circuit 101 comprises a period-correction control circuit 1010, a matching detection circuit 1011, a buffer 1012 and a selection circuit 1013.

The period-correction control circuit 1010 controls correction of the control period to eliminate a synchronization shift. The matching detection circuit 1011 outputs the middle-point signal 109 when the first half of the control period lapses since the start point thereof. The buffer 1012 is used for temporarily storing the count value 106 and the selection circuit 1013 outputs the control-period value 107.

To put it in detail, the period-correction control circuit 1010 outputs a selection signal 1016 and the suppression signal 108 on the basis of the generation-timings of the middle-point signal 109, the count-up signal 1003 and the synchronization-reference signal 111. The matching detection circuit 1011 outputs the middle-point signal 109 when the count value 106 matches a value obtained as a result of shifting the control-period set value 110 to the right by 1 bit, that is, half the control-period set value 110. The buffer 1012 stores the count value 106 when the synchronization-reference signal 111 is output. When the selection signal 1016 has a logic value of 0, the selection circuit 1013 outputs the control-period set value 110 as the control-period value 107. When the selection signal 1016 has a logic value of 1, on the other hand, the selection circuit 1013 outputs a count value 1014 stored in the buffer 1012 as the control-period value 107.

Figure 8:
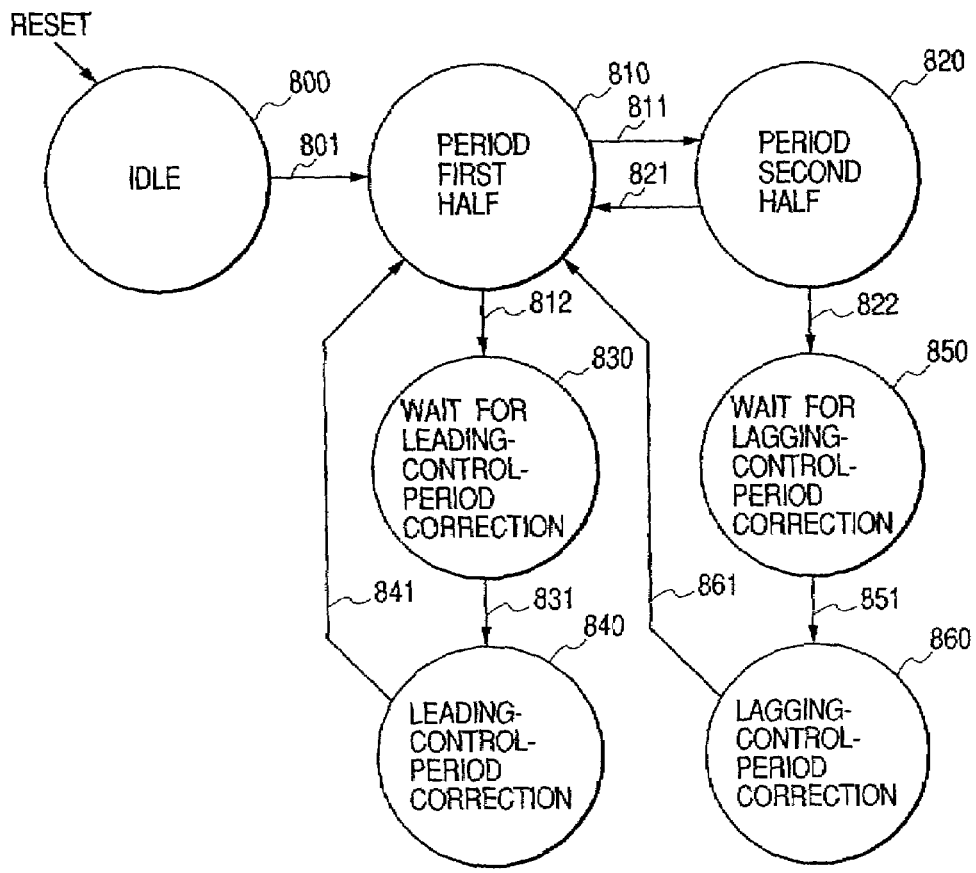
FIG. 8 is an explanatory diagram showing state transitions of the control-period correcting circuit shown in FIG. 7.

Next, the operation of the period-correction control circuit 1010 is explained by referring to FIG. 8, a diagram showing state transitions representing behaviors displayed by the period-correction control circuit 1010 employed in the control-period correcting circuit 101 shown in FIG. 7.

As shown in FIG. 8, possible states of the operation of the period-correction control circuit 1010 are an idle state 800, a period first-half state 810, a period second-half state 820, a leading-control-period-correction waiting state 830, a leading-control-period-correction state 840, a lagging-control-period-correction waiting state 850 and a lagging-control-period-correction state 860.

The idle state 800 is a state in which correction of the control period to eliminate a synchronization shift of a control period is not executed. The period first-half state 810 is a state between the start point of a control period and a middle point of the control period during which the synchronization-reference signal 111 is not output. The period second-half state 820 is a state between a middle point of a control period and the end point of the control period during which the synchronization-reference signal 111 is not output. The leading-control-period-correction waiting state 830 is a state of waiting for execution of leading-control-period correction to lengthen the current control period. The leading-control-period-correction state 840 is a state of execution of leading-control-period correction to lengthen the current control period. The lagging-control-period-correction waiting state 850 is a state of waiting for execution of lagging-control-period-correction to shorten the next control period. The leading-control-period-correction state 860 is a state of execution of lagging-control-period correction to shorten the current control period.

The period-correction control circuit 1010 shown in FIG. 7 enters the idle state 800 right after the system is reset. The period-correction control circuit 1010 transits from the idle state 800 to the period first-half state 810 in a state transition 801 when the count-up signal 1003 is output for the first time, that is, when the first pulse of the period signal 11a is output.

A state transition 812 from the period first-half state 810 to the leading-control-period-correction waiting state 830 takes place when the synchronization-reference signal 111 is output. A state transition 811 from the period first-half state 810 to the period second-half state 820 takes place when the middle-point signal 109 is output but the synchronization-reference signal 111 is not.

A state transition 822 from the period-second half state 820 to the lagging-control-period-correction waiting state 850 takes place when the synchronization-reference signal 111 is output and the count-up signal 1003 is not. A state transition 821 from the period-second half state 820 to the period first-half state 810 takes place when the count-up signal 1003 is output.

A state transition 831 from the leading-control-period-correction waiting state 830 to the leading-control-period-correction state 840 takes place when the count-up signal 1003 is output.

A state transition 841 from the leading-control-period-correction state 840 to the period first-half state 810 takes place when the count-up signal 1003 is output.

A state transition 851 from the lagging-control-period-correction waiting state 850 to the lagging-control-period-correction state 860 takes place when the count-up signal 1003 is output.

A state transition 861 from the lagging-control-period-correction state 860 to the period first-half state 810 takes place when the count-up signal 1003 is output.

In the control-period correcting circuit 101 shown in FIG. 7, the selection signal 1016 and the suppression signal 108 are determined by the state of the period-correction control circuit 1010. To put it in detail, in the leading-control-period-correction state 840 and the lagging-control-period-correction state 860, the selection signal 1016 has a logic value of 1. In other states, the selection signal 1016 has a logic value of 0. On the other hand, in the leading-control-period-correction waiting state 830, the suppression signal 108 has a logic value of 1. In other states, the suppression signal 108 has a logic value of 0.

Figure 9:
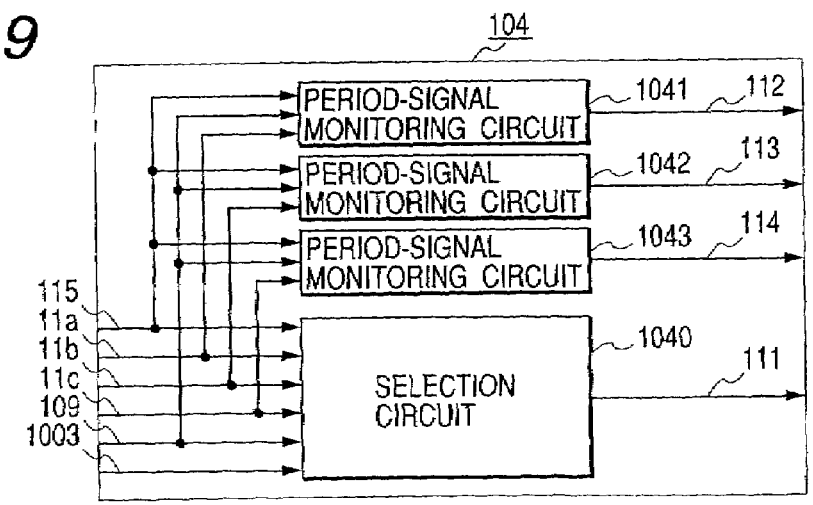
FIG. 9 is a block diagram showing a typical configuration of a synchronization-reference selecting circuit employed in the synchronization circuit shown in FIG. 4.

Next, the synchronization-reference selecting circuit 104 is explained by referring to FIG. 9.

As shown in FIG. 9, the synchronization-reference selecting circuit 104 comprises a selection circuit 1040 for selecting one of the period signals 11a, 11b and 11c as a synchronization reference and period-signal monitoring circuits 1041, 1042 and 1043 for monitoring appearances of the period signals 11a, 11b and 11c respectively in each control period. The selection circuit 1040 selects one of period signals appearing during a synchronization-reference selection period between 2 consecutive middle-point signals 109 with the center of the period coinciding with t2, a point of time sandwiched by the first and second halves of the synchronization-reference selection period as shown in an example of FIG. 5. To be more specific, as described above, if synchronized-operation information 115 indicates a three-system synchronized operation, the selection circuit 1040 selects the second period signal detected during the synchronization-reference selection period as a synchronization-reference 111. If the synchronized-operation information 115 indicates a two-system synchronized operation, on the other hand, the selection circuit 1040 selects the first period signal detected during the synchronization-reference selection period as a synchronization-reference signal 111.

The synchronized-operation information 115 indicating which controllers are operating in the synchronized operation is also supplied to the period-signal monitoring circuits 1041, 1042 and 1043. The period-signal monitoring circuits 1041, 1042 and 1043 are thereby capable of forming a judgment as to whether or not the period signals 11a, 11b and 11c for the controllers 1a, 1b and 1c respectively appear during the synchronization-reference selection period and thus capable of making a decision to output the missing-control-period-signal indicating signal 112, 113 or 114 in case the period signal 11a,11b or 11c respectively is missing.

To be more specific, assume that the synchronized-operation information 115 indicates that the controller 1a is operating in the synchronized operation and the period signal 11a does not appear during the synchronization-reference selection period. In this case, the period-signal monitoring circuit 1041 outputs the missing-control-period-signal indicating signal 112. Similarly, if the synchronized-operation information 115 indicates that the controller 1b is operating in the synchronized operation and the period signal 11b does not appear during the synchronization-reference selection period, the period-signal monitoring circuit 1042 outputs the missing-control-period-signal indicating signal 113. Likewise, if the synchronized-operation information 115 indicates that the controller 1c is operating in the synchronized operation and the period signal 11c does not appear during the synchronization-reference selection period, the period-signal monitoring circuit 1043 outputs the missing-control-period-signal indicating signal 114.

Figure 10:
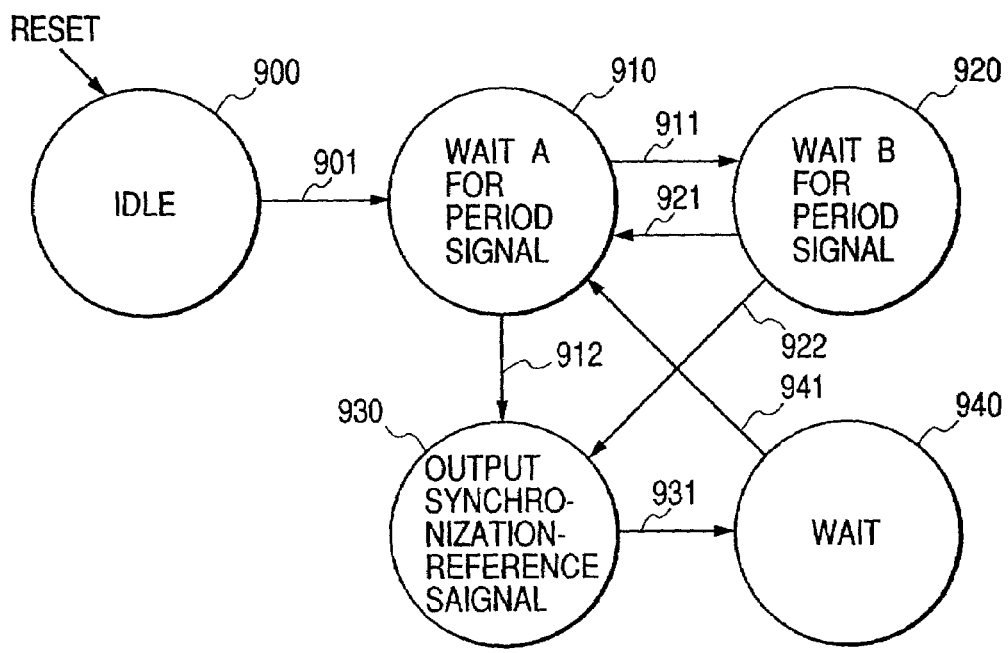
FIG. 10 is an explanatory diagram showing state transitions of a selection circuit employed in the synchronization-reference selecting circuit shown in FIG. 9.

Next, the operation of the selection circuit 1040 is explained by referring to FIG. 10, a diagram showing state transitions representing behaviors displayed by the selection circuit 1040 employed in the synchronization-reference selecting circuit 104 shown in FIG. 9.

As shown in FIG. 10, possible states of the selection circuit 1040 are an idle state 900, a period-signal A waiting state 910, a period-signal B waiting state 920, a reference-signal outputting state 930 and a waiting state 940.

The idle state 900 is a state in which selection of the synchronization reference is not executed. The period-signal A waiting state 910 is a state in which none of the period signals 11a, 11b and 11c are output. The period-signal B waiting state 920 is a state in which only 1 period signal is output in a three-system synchronized operation. The synchronization-reference-signal outputting state 930 is a state in which at least 2 period signals are output in a three-system synchronized operation or a state in which at least 1 period signals is output in a two-system synchronized operation. In the synchronization-reference-signal outputting state 930, the selection circuit 1040 employed in the reference-signal selecting circuit 104 shown in FIG. 10 outputs the synchronization-reference signal 111. The waiting state 940 is a state of waiting for the next synchronization-reference selection period to be started after the synchronization-reference signal 111 shown in FIG. 9 has been output.

The selection circuit 1040 employed in the reference-signal selecting circuit 104 shown in FIG. 10 enters the idle state 900 right after the system is reset. The selection circuit 1040 transits from the idle state 900 to the period-signal A waiting state 910 in a state transition 901 when the first period signal is output.

A state transition 911 from the period-signal A waiting state 910 to the period-signal B waiting state 920 takes place when only one period signal is output in a three-system synchronized operation. A state transition 912 from the period-signal A waiting state 910 to the synchronization-reference-signal outputting state 930 takes place when at least 2 period signals are output in a three-system synchronized operation or at least 1 period signal is output in a two-system synchronized operation.

A state transition 922 from the period-signal B waiting state 920 to the synchronization-reference-signal outputting state 930 takes place when at least 1 period signal is output. A state transition 921 from the period-signal B waiting state 920 to the period-signal A waiting state 910 takes place when none of the period signals 11c, 11b and 11c are output and the middle-point signal 109 is output.

A state transition 931 from the synchronization-reference signal outputting state 930 to the waiting state 940 takes place as soon as the synchronization-reference signal 111 is output.

A state transition 941 from the waiting state 940 to the period-signal A waiting state 910 takes place when the middle-point signal 109 is output.

Figure 11:
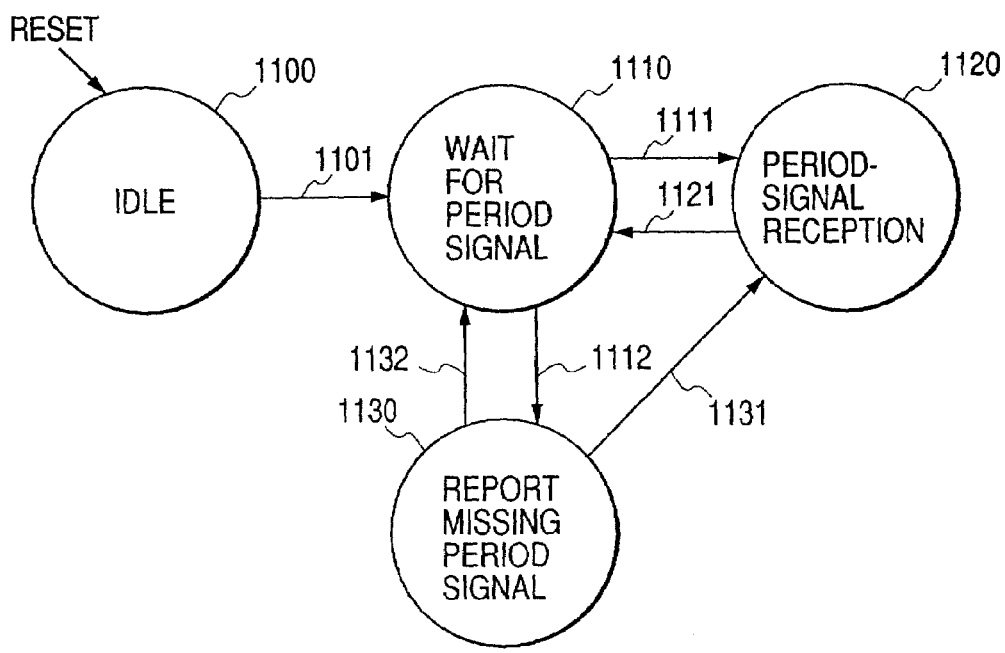
FIG. 11 is an explanatory diagram showing state transitions of a reference-signal monitoring circuit employed in the synchronization-reference selecting circuit shown in FIG. 9.

Next, the operation of the period-signal monitoring circuit 1041 employed in the reference-signal selecting circuit 104 shown in FIG. 9 is explained by referring to FIG. 11, a diagram showing state transitions representing behaviors displayed by the period-signal monitoring circuit 1041. It should be noted, however, that the behaviors displayed by the period-signal monitoring circuits 1042 and 1043 are the same as the period-signal monitoring circuit 1041.

As shown in FIG. 11, possible states of the period-signal monitoring circuit 1041 are an idle state 1100, a period-signal waiting state 1110, a period-signal outputting state 1120 and a missing-control-period-signal reporting state 1130.

The idle state 1100 is a state in which the monitoring of appearance of the period signal 11a is not executed. The period-signal waiting state 1110 is a state in which the period signal 11a is not output. The period-signal outputting state 1120 is a state in which the period signal 11a is output. The missing-control-period-signal reporting state 1130 is a state in which the missing-control-period-signal indicating signal 112 is output to indicate that the period signal 11a did not appear during the synchronization-reference selection period.

The period-signal monitoring circuit 1041 enters the idle state 1100 right after the system is reset. The period-signal monitoring circuit 1041 transits from the idle state 1100 to the period-signal waiting state 1110 in a state transition 1101 when the middle-point signal 109 is output.

A state transition 1111 from the period-signal waiting state 1110 to the period-signal outputting state 1120 takes place when the period signal 11a is output. A state transition 1112 from the period-signal waiting state 1110 to the missing-control-period-signal reporting state 1130 takes place when the period signal 11a is not output and the middle-point signal 109 is.

A state transition 1121 from the period-signal outputting state 1120 to the period-signal waiting state 1110 takes place when the period signal 11a is not output and the middle-point signal 109 is.

A state transition 1131 from the missing-control-period-signal reporting state 1130 to the period-signal outputting state 1120 takes place when the period signal 11a is output right after the missing-control-period-signal indicating signal 112 is.

A state transition 1132 from the missing-control-period-signal reporting state 1130 to the period-signal waiting state 1110 takes place when the period signal 11a is not output right after the missing-control-period-signal indicating signal 112 is.

Figure 12:
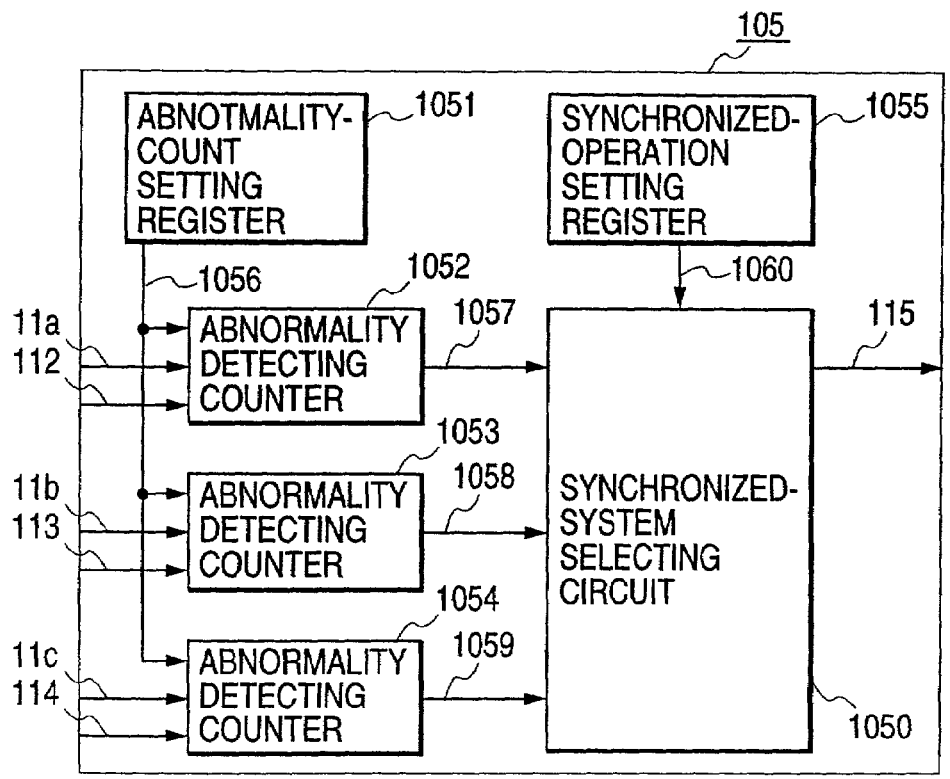
FIG. 12 is a block diagram showing a typical configuration of a configuration control circuit employed in the synchronization circuit shown in FIG. 4.

Next, the configuration control circuit 105 employed in the synchronization circuit 10a shown in FIG. 4 is explained by referring to FIG. 12. It should be noted that the configurations of the configuration control circuits employed in the synchronization circuits 10b and 10c are the same as that shown in FIG. 12.

As shown in FIG. 12, the configuration control circuit 105 comprises a synchronized-system selecting circuit 1050, an abnormality-count setting register 1051, abnormality detecting counters 1052, 1053 and 1054 and a synchronized-operation setting register 1055.

The synchronized-system selecting circuit 1050 selects systems capable of operating in a synchronized operation and outputs the synchronized-operation information 115. The abnormality-count setting register 1051 is used for setting an upper limit 1056 on the number of consecutive synchronization-reference selection periods during which the period signal 11a, 11b or 11c is not detected. The upper limit 1056 is used as a criterion for determining whether or not an abnormality exists. To put in detail, if the period signal 11a, 11b or 11c is not detected in a number of consecutive synchronization-reference selection periods exceeding the upper limit 1056, an abnormality is judged to exist in the period signal 11a, 11b or 11c. The synchronized-operation setting register 1055 is used for setting the configuration of the synchronized operation.

The abnormality detecting counter 1052 counts the number of consecutive synchronization-reference selection periods during which the period signal 11a is not detected by monitoring the period signal 11a and the missing-control-period-signal indicating signal 112, comparing the number with the upper limit 1056 set in the abnormality-count setting register 1051. As the number of consecutive synchronization-reference selection periods during which the period signal 11a is not detected reaches the upper limit 1056, a period-signal-abnormality indicating signal 1057 is output.

Similarly, the abnormality detecting counter 1053 counts the number of consecutive synchronization-reference selection periods during which the period signal 11b is not detected by monitoring the period signal 11b and the missing-control-period-signal indicating signal 113, comparing the number with the upper limit 1056 set in the abnormality-count setting register 1051. As the number of consecutive synchronization-reference selection periods during which the period signal 11b is not detected reaches the upper limit 1056, a period-signal-abnormality indicating signal 1058 is output. Likewise, abnormality detecting counter 1054 counts the number of consecutive synchronization-reference selection periods during which the period signal 11c is not detected by monitoring the period signal 11c and the missing-control-period-signal indicating signal 114, comparing the number with the upper limit 1056 set in the abnormality-count setting register 1051. As the number of consecutive synchronization-reference selection periods during which the period signal 11c is not detected reaches the upper limit 1056, a period-signal-abnormality indicating signal 1059 is output.

A value 1060 set in the synchronized-operation setting register 1055 is 3 bits in length. A logic value of 1 set in the first bit of the set value 1060 indicates that the controller 1a is operating in the synchronized operation. On the other hand, a logic value of 1 set in the second bit of the set value 1060 indicates that the controller 1b is operating in the synchronized operation. Finally, a logic value of 1 set in the third bit of the set value 1060 indicates that the controller 1c is operating in the synchronized operation.

The synchronized-system selecting circuit 1050 selects systems capable of operating in a synchronized operation by referring to the value 1060 set in the synchronized-operation setting register 1055 and the period-signal-abnormality indicating signals 1057, 1058 and 1059, and then outputs the synchronized-operation information 115.

Figure 13:
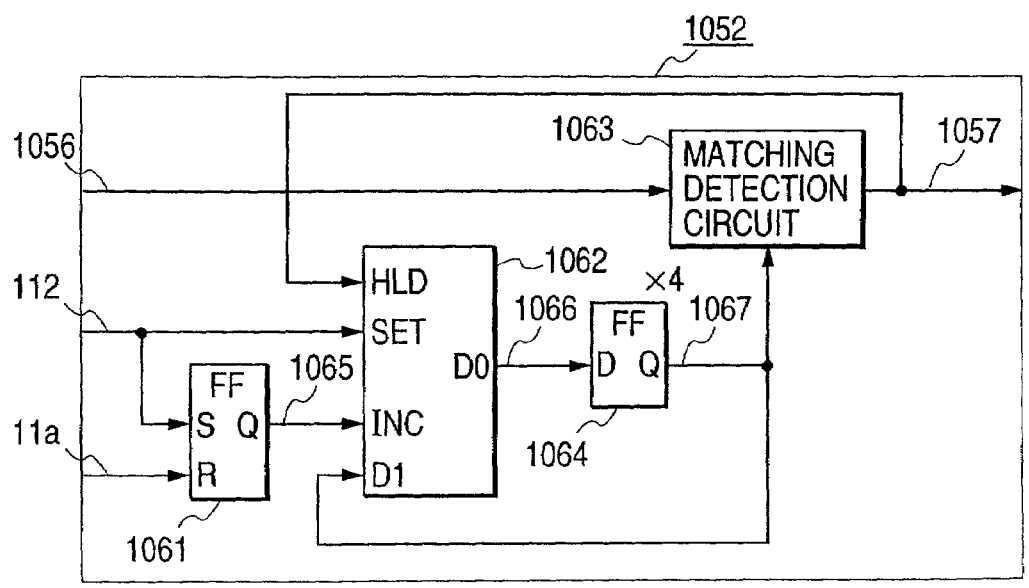
FIG. 13 is a block diagram showing a typical configuration of an abnormality detecting counter employed in the configuration control circuit shown in FIG. 12.

Next, the abnormality detecting counter 1052 is explained by referring to FIG. 13. FIG. 13 is a diagram showing the configuration of the abnormality detecting counter 1052. It should be noted, however, that the abnormality detecting counters 1053 and 1054 employed in the configuration control circuit shown in FIG. 12 have the same configurations as the abnormality detecting counter 1052.

As shown in FIG. 13, the abnormality detecting counter 1052 comprises a flip-flop circuit 1061, a logic circuit 1062, a matching detection circuit 1063 and a plurality of flip-flop circuits 1064. The flip-flop circuit 1061 is used for storing the fact that the period signal 11a was not detected during the immediately preceding synchronization-reference selection period. The logic circuit 1062 determines a count value. The matching detection circuit 1063 detects the fact that the count value becomes equal to the upper limit 1056 set in the abnormality-count setting register 1051. The same plurality of flip-flop circuits 1064 are used for storing the count value.

The flip-flop circuit 1061 sets its state signal 1065 to a logic value of 1 when the missing-control-period-signal indicating signal 112 is received and resets the output state signal 1065 to a logic value of 0 when the period signal 11a is received.

The logic circuit 1062 sets a new count value 1066 by referring to the reference-signal-abnormality indicating signal 1057, the missing-control-period-signal indicating signal 112, the state signal 1065 and the count value 1067. The logic circuit 1062 has HLD, SET, INC, DI and DO pins. The HLD, SET, INC and DI pins are used for inputting the reference-signal-abnormality indicating signal 1057, the missing-reference-signal indicating signal 112, the state signal 1065 and a count value 1067 respectively. The DO pin is used for outputting the new count value 1066 set on the basis of the reference-signal-abnormality indicating signal 1057, the missing-reference-signal indicating signal 112, the state signal 1065 and the count value 1067.

It is the count value 1066 that is stored in the same plurality of flip-flop circuits 1064.

The matching detection circuit 1063 outputs the period-signal-abnormality indicating signal 1057 when the count value 1067 becomes equal to the upper limit 1056 set in the abnormality-count setting register 1051.

Figures 14, 15:
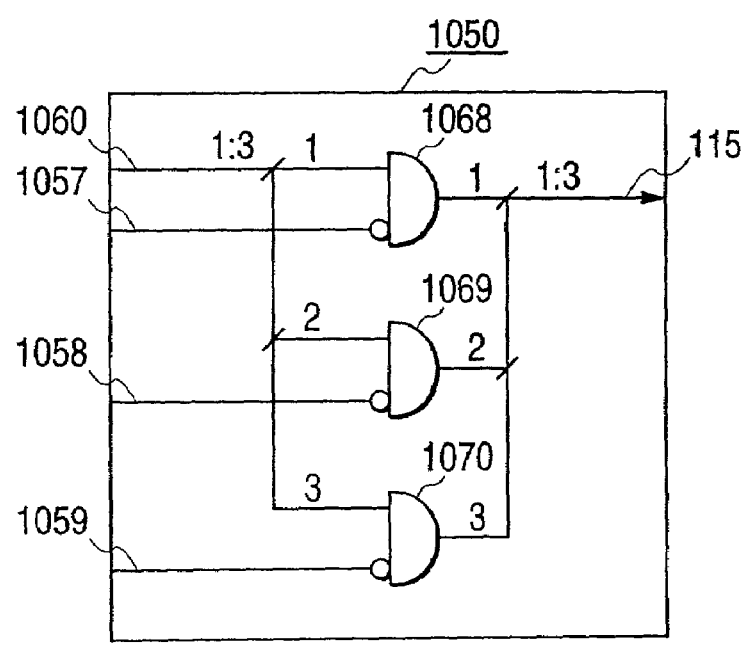
FIG. 14 is a truth table of a logic circuit employed in the abnormality detecting counter shown in FIG. 13.
FIG. 15 is a block diagram showing a typical configuration of a synchronized-system selecting counter employed in the configuration control circuit shown in FIG. 12.

The following is a description of operations carried out by the logic circuit 1062 to set a new count value with reference to a truth table shown in FIG. 14. In the truth table shown in FIG. 14, notations HLD, SET, INC, DI and DO represent logic values of the reference-signal-abnormality indicating signal 1057, the missing-reference-signal indicating signal 112, the state signal 1065, the count value 1067 and the new count value 1066 respectively.

As shown in the truth table of FIG. 14, the logic circuit 1062 employed in the abnormality detecting counter 1052 shown in FIG. 13 sets the count value 1066 at a logic value of 1 when the period-signal-abnormality indicating signal 1057 has a logic value of 0, the state signal 1065 has a logic value of 0 and the missing-control-period-signal indicating signal 112 has a logic value of 1, that is, the number of consecutive synchronization-reference selection periods has not reached the upper limit 1056 and, in the immediately preceding synchronization-reference selection period, the period signal 11a was output but, in the current synchronization-reference selection period, the period signal 11a was not output.

The logic circuit 1062 sets a new count value 1066 at a value equal to the former count value 1067 plus one when the period-signal-abnormality indicating signal 1057 has a logic value of 0, the state signal 1065 has a logic value of 1 and the missing-control-period-signal indicating signal 112 has a logic value of 1, that is, the number of consecutive synchronization-reference selection periods has not reached the upper limit 1056 and, in the immediately preceding synchronization-reference selection period, the period signal 11a was not output and, in the current synchronization-reference selection period, the period signal 11a was also not output.

The logic circuit 1062 sets a new count value 1066 at a value equal to the former count value 1067 when the period-signal-abnormality indicating signal 1057 has a logic value of 1, that is, the number of consecutive synchronization-reference selection periods has reached the upper limit 1056.

Next, the synchronized-system selecting circuit 1050 employed in the configuration control circuit 105 shown in FIG. 12 is explained by referring to FIG. 15. FIG. 15 is a block diagram showing the configuration of the synchronized-system selecting circuit 1050 employed in the configuration control circuit 105 of the synchronization circuit 10a. It should be noted, however, that the configurations of the synchronized-system selecting circuits 1050 employed in the configuration control circuits 105 of the synchronization circuits 10b and 10c shown in FIG. 1 are the same as that of the synchronization circuit 10a.

As shown in FIG. 15, the synchronized-system selecting circuit 1050 comprises logic circuits 1068, 1069 and 1070 for outputting information on a synchronized operation for the controllers 1a, 1b and 1c shown in FIG. 1 respectively. To put it in detail, the logic circuit 1068 sets an associated bit in the synchronized-operation information 115 at a logic value of 1 if the associated bit of the 3-bit value 1060 set in the synchronized-operation setting register 1055 shown in FIG. 12 has a logic value of 1 and the period-signal-abnormality indicating signal 1057 of the abnormality detecting counter 1052, one of the 3 abnormality detecting counters employed in the configuration control circuit 105 shown in FIG. 12, has a logic value of 0. Otherwise, the logic circuit 1068 sets an associated bit in the synchronized-operation information 115 at a logic value of 0. Similarly, the logic circuit 1069 sets an associated bit in the synchronized-operation information 115 at a logic value of 1 if the associated bit of the 3-bit value 1060 set in the synchronized-operation setting register 1055 shown in FIG. 12 has a logic value of 1 and the period-signal-abnormality indicating signal 1058 of the abnormality detecting counter 1053, one of the 3 abnormality detecting counters employed in the configuration control circuit 105 shown in FIG. 12, has a logic value of 0. Otherwise, the logic circuit 1069 sets an associated bit in the synchronized-operation information 115 at a logic value of 0. Likewise, the logic circuit 1070 sets an associated bit in the synchronized-operation information 115 at a logic value of 1 if the associated bit of the 3-bit value 1060 set in the synchronized-operation setting register 1055 shown in FIG. 12 has a logic value of 1 and the period-signal-abnormality indicating signal 1059 of the abnormality detecting counter 1054, one of the 3 abnormality detecting counters employed in the configuration control circuit 105 shown in FIG. 12, has a logic value of 0. Otherwise, the logic circuit 1070 sets an associated bit in the synchronized-operation information 115 at a logic value of 0.

That is to say, the logic circuit 1068 sets the first bit in the synchronized-operation information 115 at a logic value of 1 only if the first bit of the 3-bit value 1060 set in the synchronized-operation setting register 1055 employed in the configuration control circuit 105 shown in FIG. 12 has a logic value of 1 and the period-signal-abnormality indicating signal 1057 of the abnormality detecting counter 1052 also employed in the configuration control circuit 105 shown in FIG. 12 has a logic value of 0, that is, only if the controller 1a shown in FIG. 1 is operating in a synchronized operation and the period signal 11a of the controller 1a is normal. Otherwise, the logic circuit 1068 sets the first bit in the synchronized-operation information 115 at a logic value of 0.

Similarly, the logic circuit 1069 sets the second bit in the synchronized-operation information 115 at a logic value of 1 only if the second bit of the 3-bit value 1060 set in the synchronized-operation setting register 1055 employed in the configuration control circuit 105 shown in FIG. 12 has a logic value of 1 and the period-signal-abnormality indicating signal 1058 of the abnormality detecting counter 1053 also employed in the configuration control circuit 105 shown in FIG. 12 has a logic value of 0, that is, only if the controller 1b shown in FIG. 1 is operating in a synchronized operation and the period signal 11b of the controller 1b is normal. Otherwise, the logic circuit 1069 sets the second bit in the synchronized-operation information 115 at a logic value of 0.

Likewise, the logic circuit 1070 sets the third bit in the synchronized-operation information 115 at a logic value of 1 only if the third bit of the 3-bit value 1060 set in the synchronized-operation setting register 1055 employed in the configuration control circuit 105 shown in FIG. 12 has a logic value of 1 and the period-signal-abnormality indicating signal 1059 of the abnormality detecting counter 1054 also employed in the configuration control circuit 105 shown in FIG. 12 has a logic value of 0, that is, only if the controller 1c shown in FIG. 1 is operating in a synchronized operation and the period signal 11c of the controller 1c is normal. Otherwise, the logic circuit 1070 sets the third bit in the synchronized-operation information 115 at a logic value of 0.

Next, the operation of the synchronization circuit 10a is explained by referring to FIGS. 16 to 19. FIGS. 16 to 19 are timing charts used for explaining operations carried out by the synchronization circuit 10a shown in FIG. 1. It should be noted, however, that the synchronization circuits 10b and 10c also shown in FIG. 1 operate in the same way as the synchronization circuit 10a.

Figure 16:
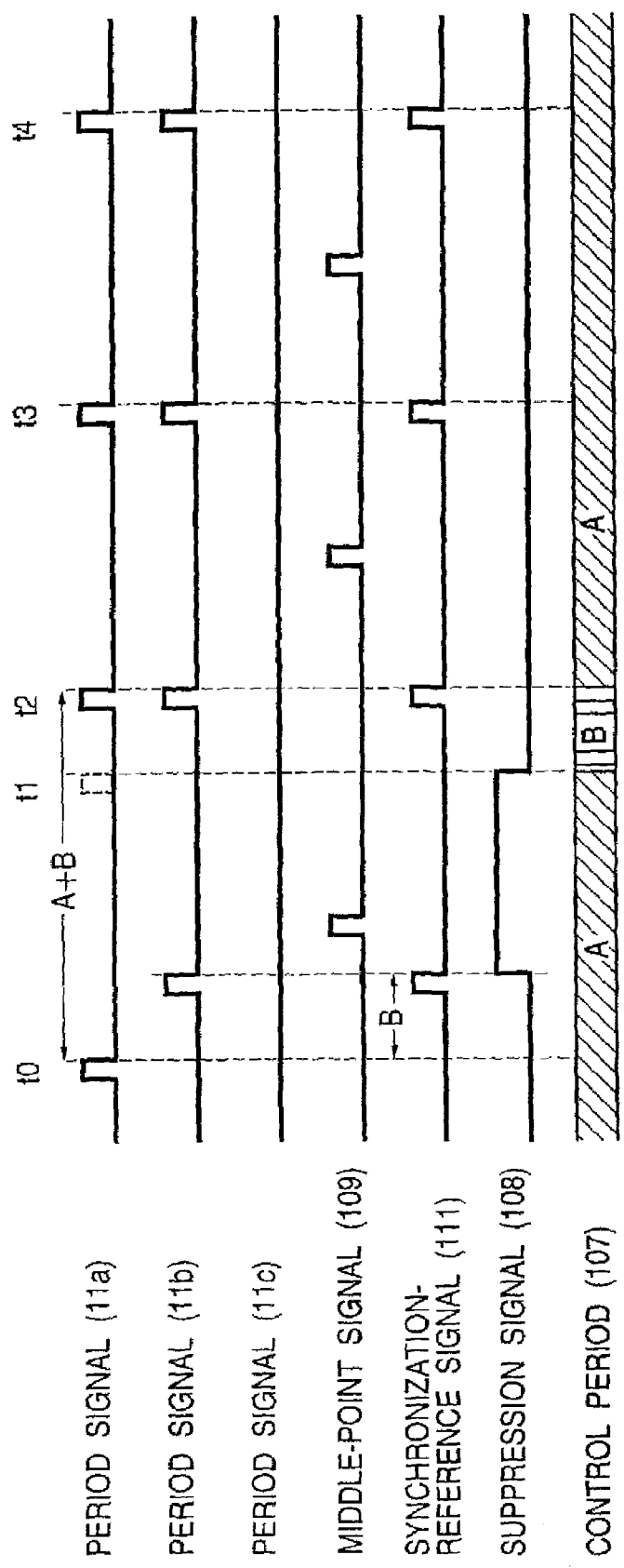
FIG. 16 is timing charts used for explaining the operation of the synchronization circuit shown in FIG. 4.

The explanation begins with a description of an operation carried out by the synchronization circuit 10a in a transition to a two-system synchronized operation wherein the controller 1a shown in FIG. 1 is put in synchronization with the controller 1b of also FIG. 1 which has been operating in a one-system operation with reference to FIG. 16.

In the timing charts shown in FIG. 16, as a first synchronization reference, the synchronization circuit 10a selects a period signal 11b output during a period between points of time t0 and t1 at which first and second period signals 11a are output respectively. Thus, in the state shown in FIG. 16, the point of time t0 at which the first period signal 11a is output is judged to be leading ahead of the first synchronization reference by a period of time B. In this case, the control period is lengthened by suppressing the period signal 11a at the point of time t1 at the end of a control period A, the length of which is determined in advance. The period signal 11a due at the point of time t1 is delayed to a point of time t2 which lags behind the point of time t1 by the period of time B. As a result, the period signal 11a output at the point of time t2 coincides with a second synchronization reference.

Figure 17:
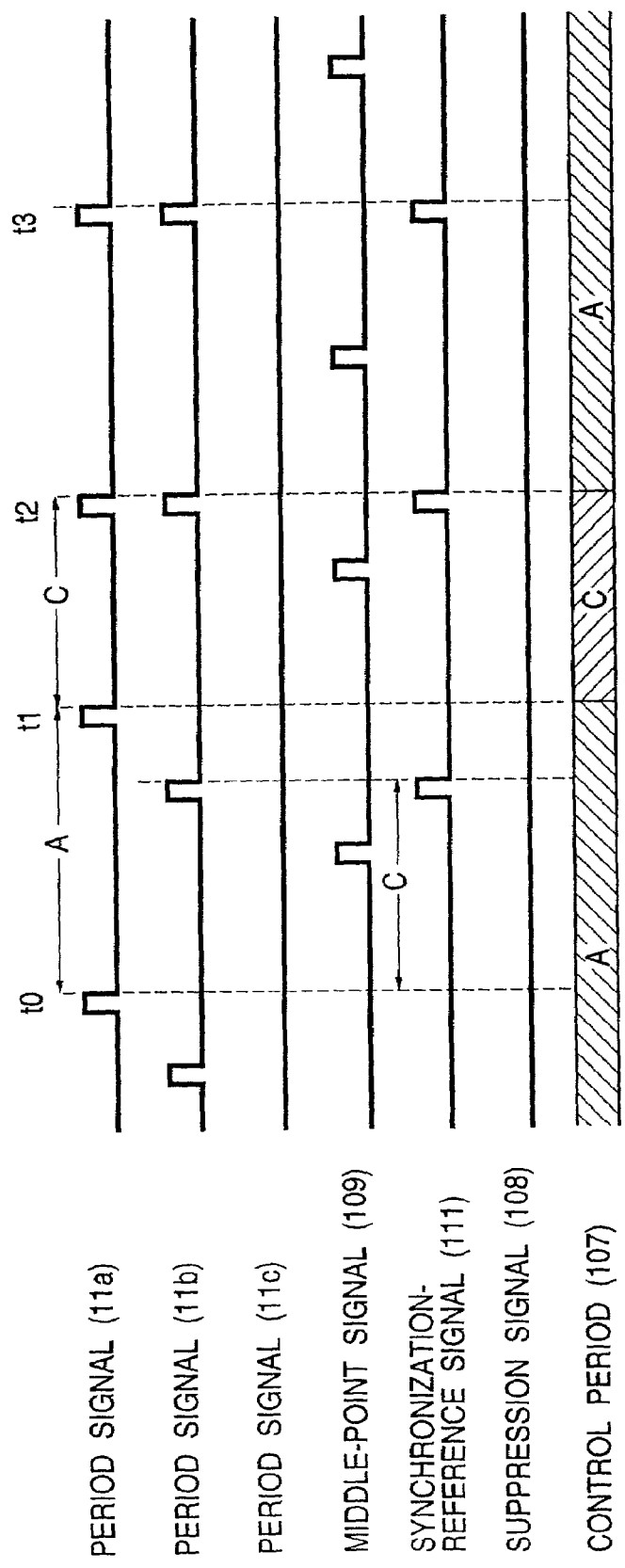
FIG. 17 is timing charts used for explaining the operation of the synchronization circuit shown in FIG. 4.

The following is a description of another operation carried out by the synchronization circuit 10a in a transition to a two-system synchronized operation wherein the controller 1a is put in synchronization with the controller 1b which has been operating in a one-system operation with reference to FIG. 17.

In the timing charts shown in FIG. 17, as a first synchronization reference, the synchronization circuit 10a selects a period signal 11b output during a period between points of time t0 and t1 at which first and second period signals 11a are output respectively. Thus, in the state shown in FIG. 17, the point of time t1 at which the second period signal 11a is output is judged to be lagging behind the first synchronization reference by a period of time (A–C). In this case, the control period is shortened by setting a control period C with the point of time t1 at the end of the control period A used as a start point. The period signal 11a is then output at a point of time t2 at the end of the control period C. As a result, the period signal 11a output at the point of time t2 coincides with a second synchronization reference.

Figure 18:
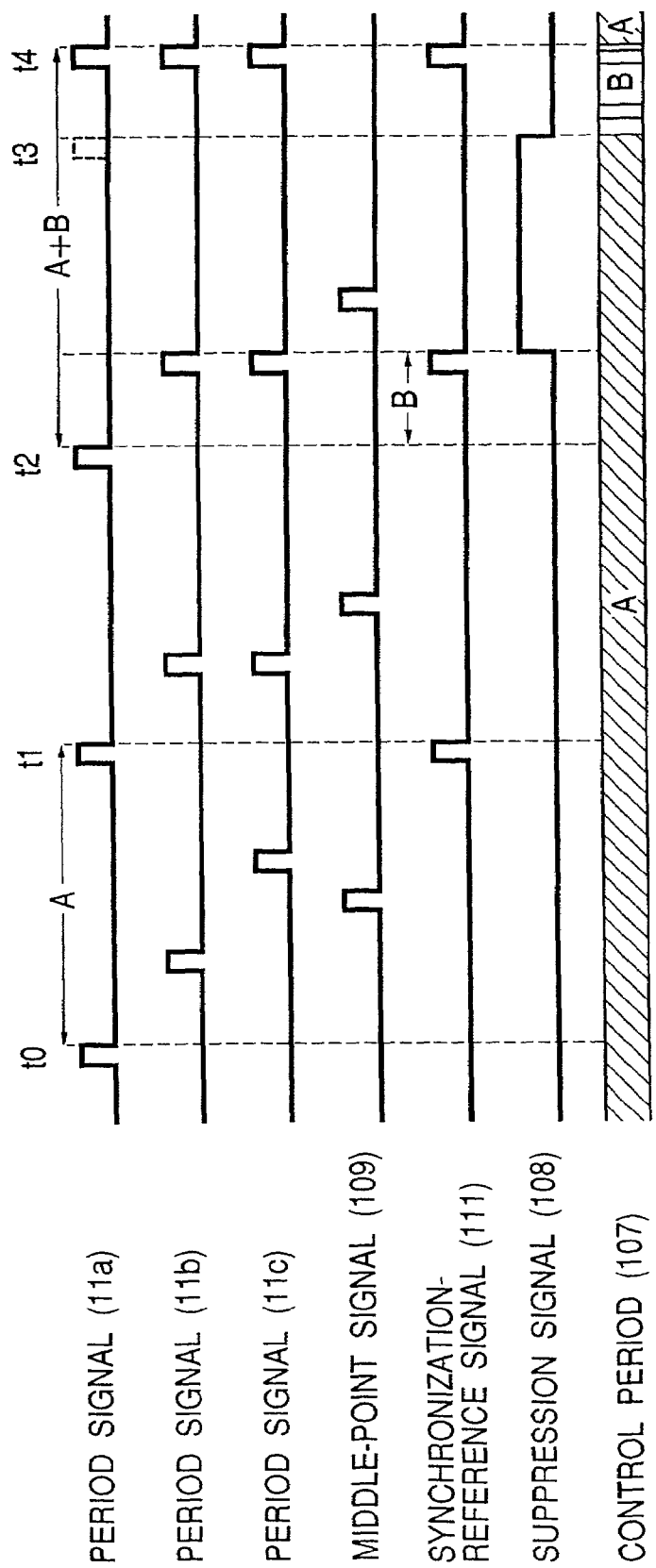
FIG. 18 is timing charts used for explaining the operation of the synchronization circuit shown in FIG. 4.

The following is a description of an operation carried out by the synchronization circuit 10a in a transition to a three-system synchronized operation wherein the controller 1a is put in synchronization with the controllers 1b and 1c also of FIG. 1 which have been operating in a two-system operation with reference to FIG. 18.

In the timing charts shown in FIG. 18, only 1 period signal, that is, the period signal 11b, is output during a period between a period signal 11a output at a point of time to and a middle-point signal 109 immediately following the period signal 11a. Thus, the synchronization circuit 10a does not determine a synchronization reference and outputs another period signal 11a at a point of time t1 at the end of the control period A, the length of which is determined in advance.

At the point of time t1 at which the period signal 11a is output, the period signal 11a itself is selected as a synchronization reference. Thus, another period signal 11a is output at a point of time t2 as the predetermined control period A lapses since the point of time t1.

After a second synchronization reference has been selected, however, the point of time t2 at which the first period signal 11a is output is judged to be leading ahead of the second synchronization reference by a period of time B. In this case, the control period is lengthened by suppressing the period signal 11a at the point of time t3 at the end of the control period A, the length of which is determined in advance. The period signal 11a due at the point of time t3 is delayed to a point of time t4 which lags behind the point of time t3 by the period of time B. As a result, the period signal 11a output at the point of time t4 coincides with a third synchronization reference.

Figure 19:
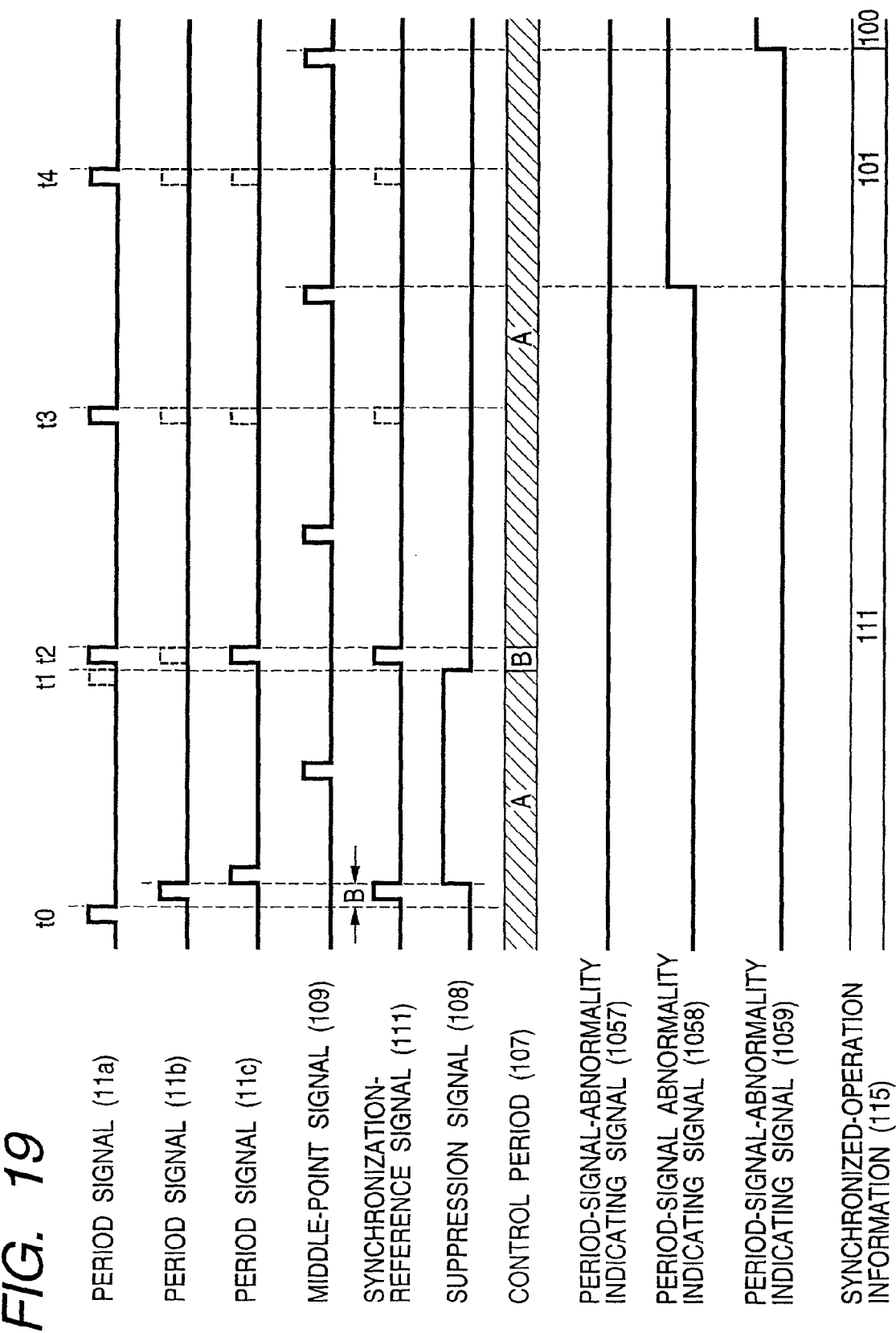
FIG. 19 is timing charts used for explaining the operation of the synchronization circuit shown in FIG. 4.

The following is a description of operations which are carried out by the synchronization circuit 10a when the period signals 11b and 11c are not output any more during a three-system synchronized operation of the controllers 1a, 1b and 1c also shown in FIG. 1 with reference to FIG. 19.

In the state shown in FIG. 19, the period signal 11b is missing at a point of time t2. However, a synchronization reference can be selected from the period signals 11a and 11c to correct the control period in order to eliminate a synchronization shift. Thereafter, at points of time t3 and t4, the 2 period signals 11b and 11c are missing, making it no longer possible to select a synchronization reference. Thus, the control signal 11a is output at a control period determined in advance. In addition, with a value of 2 set in the abnormality-count setting register 1051 employed in the configuration control circuit 105 shown in FIG. 12, at a point of time the middle-point signal 109 is output right after the point of time t3, the period signal 11b is found missing twice in a row, causing the period-signal-abnormality indicating signal 1058 to be output and the second bit of the synchronized-operation information 115 to be set at a logic value of 0. Then, at a point of time the middle-point signal 109 is output right after the point of time t4, the period signal 1c is found missing twice in a row, causing the period-signal-abnormality indicating signal 1059 to be output and the third bit of the synchronized-operation information 115 to be set at a logic value of 0. As described above, when the period signal for a system is not output steadily any more in a three-system synchronized operation, a synchronization reference is selected from the period signals of the remaining systems. Then, when the period signal for a system is not output steadily any more in a two-system synchronized operation, selection of a synchronization reference is not executed. In this case, an operation based on the remaining one system only.

It should be noted that the buffer 1012 employed in the control-period correcting circuit 101 shown in FIG. 7 is used for storing a period of time between a point of time a period signal 11a is output and a point of time an immediately succeeding synchronization reference 111 is selected for each control period. The period of time is read out back from the buffer 1012 to be compared with an allowable synchronization shift X for each control period. If the period of time is found longer than the allowable synchronization shift X but shorter than a value obtained as a result of subtraction of the allowable synchronization X from the control period A determined in advance, that is, if X<the period of time< (A–X), the synchronization shift of the period signal 11a for the U phase is judged to be greater than the allowable value X. In this case, an abnormal is determined to have occurred in the synchronization circuit 10a for the U phase.

When the synchronization shift of the period signal 11a for the U phase is judged to be greater than the allowable value X by using the method described above, the first bit of the synchronized-operation setting register 1055 employed in the configuration control circuit 105 shown in FIG. 12 is set at a logic value of 0 to exclude the period signal 11a for the U phase from candidates to be selected as a synchronization reference. In this case, the control period is synchronized forcibly to the remaining period signals.

Next, other functions of the synchronization circuit are explained by referring to FIGS. 20 to 25. In the present version, the control period is corrected to eliminate a synchronization shift by lengthening or shortening the period by 1 clock cycle. In this way, the control period of the system for which the synchronization circuit is assigned can be prevented from varying even if the other period signals are output with improper timing. The synchronization circuit of the present version is different from the synchronization circuit 10a shown in FIG. 4 in that the period-signal generating circuit and the control-period correcting circuit in the present version have different configurations from those shown in FIGS. 6 and 7 respectively. The rest of the synchronization circuit of the present version is the same as the synchronization circuit 10a shown in FIG. 4. The following description is focused on the differences.

Figure 20:
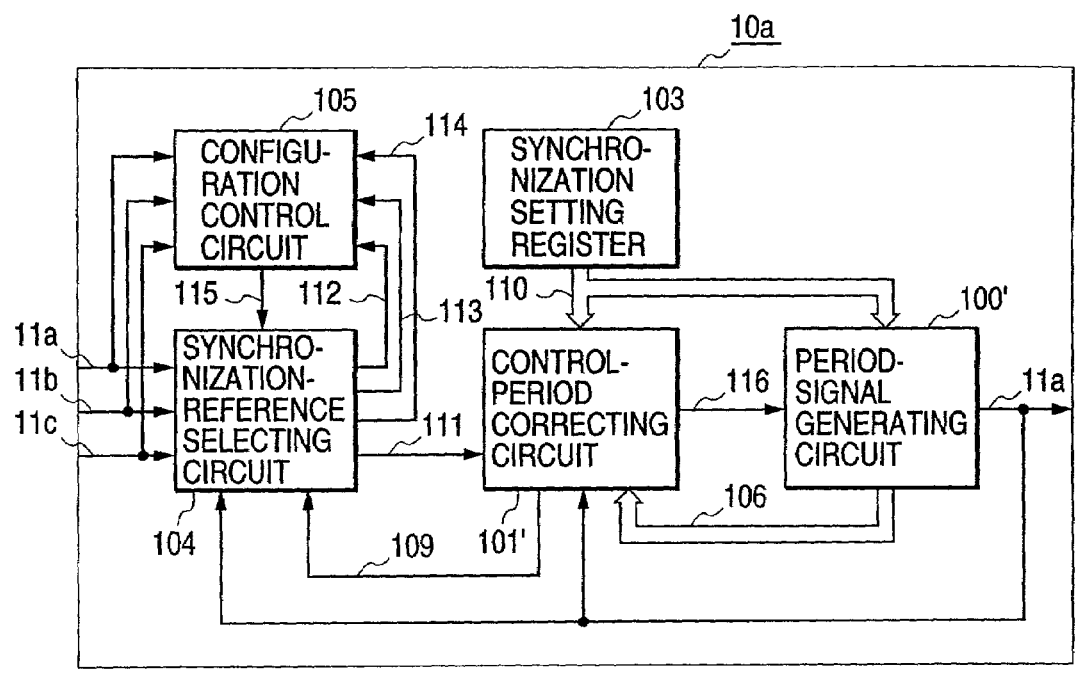
FIG. 20 is a block diagram showing the configuration of another version implementing the synchronization circuit employed in the power converting apparatus shown in FIG. 1.

The control-period correcting circuit 101' employed in the synchronization circuit 10a provided by the present version as shown in FIG. 20 forms a judgment as to whether or not the period signal 11a for the U phase is out of synchronization with the synchronization-reference signal 111. The judgment is based on output timing of the synchronization-reference signal 111 and the period signal 11a. The control-period correcting circuit 101' outputs a preset value 116 based on a result of the judgment in order to lengthen or shorten the control period by 1 clock cycle to the period-signal generating circuit 100'. The preset value 116 is 1 if the period signal 11a is synchronized with the synchronization-reference signal 111, 0 if the period signal 11a leads ahead of the synchronization-reference signal 111 or 2 if the period signal 11a lags behind the synchronization-reference signal 111.

The period-signal generating circuit 100' sets the preset value 116 and starts counting at the start point of a control period. As a period of time indicated by a control-period value 110 lapses, a period signal 11a is output.

Figure 21:
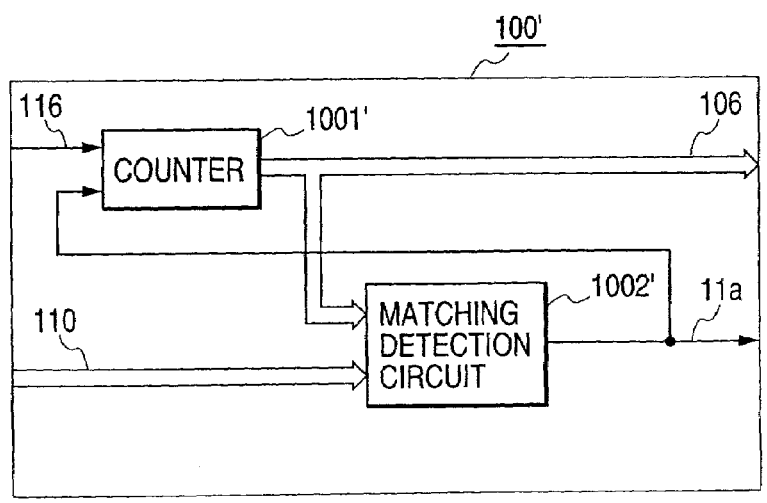
FIG. 21 is a block diagram showing a typical configuration of a period-signal generating circuit employed in the synchronization circuit shown in FIG. 20.

Next, the configuration of the period-signal generating circuit 100' employed in the synchronization circuit 10a shown in FIG. 20 is explained by referring to FIG. 21.

As shown in FIG. 21, the period-signal generating circuit 100' comprises a counter 1001' and a matching detection circuit 1002'. The counter 1001' increments the contents 106 thereof in synchronization with a clock signal and the matching detection circuit 1002' outputs a period signal 11a when the contents 106 of the counter 1001' match the control-period value 110.

When the matching detection circuit 1002' outputs the period signal 11a, the counter 1001' sets the preset value 116 and starts counting, outputting the contents 106 thereof all the time. The matching detection circuit 1002' outputs a period signal 11a when the contents 106 of the counter 1001' match the control-period value 110.

Figure 22:
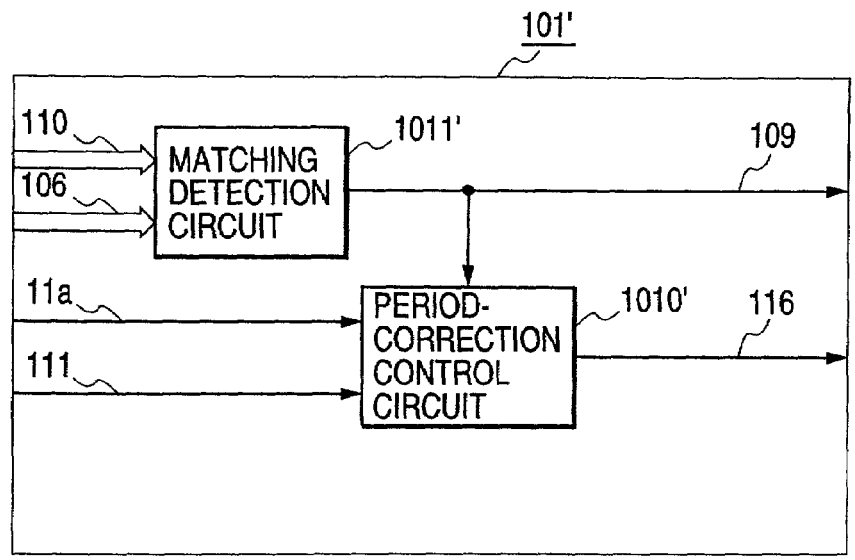
FIG. 22 is a block diagram showing a typical configuration of a control-period correcting circuit employed in the synchronization circuit shown in FIG. 20.

Next, the configuration of the control-period correcting circuit 101' employed in the synchronization circuit 10a shown in FIG. 20 is explained by referring to FIG. 22.

As shown in FIG. 22, the control-period correcting circuit 101' comprises a period-correction control circuit 1010' for controlling the correction of a control period to eliminate a synchronization shift and a matching detection circuit 1011' for detecting the fact that a half period of time has lapsed since the start point of the control period and outputting the middle-point signal 109.

The period-correction control circuit 1010' outputs the preset value 116 based on output timings of the synchronization-reference signal 111, the period signal 11a and the middle-point signal 109. On the other hand, the matching detection circuit 1011' outputs the middle-point signal 109 when a value obtained as a result of shifting a control-period set value 110 by 1 bit to the right matches a count value 106.

Figure 23:
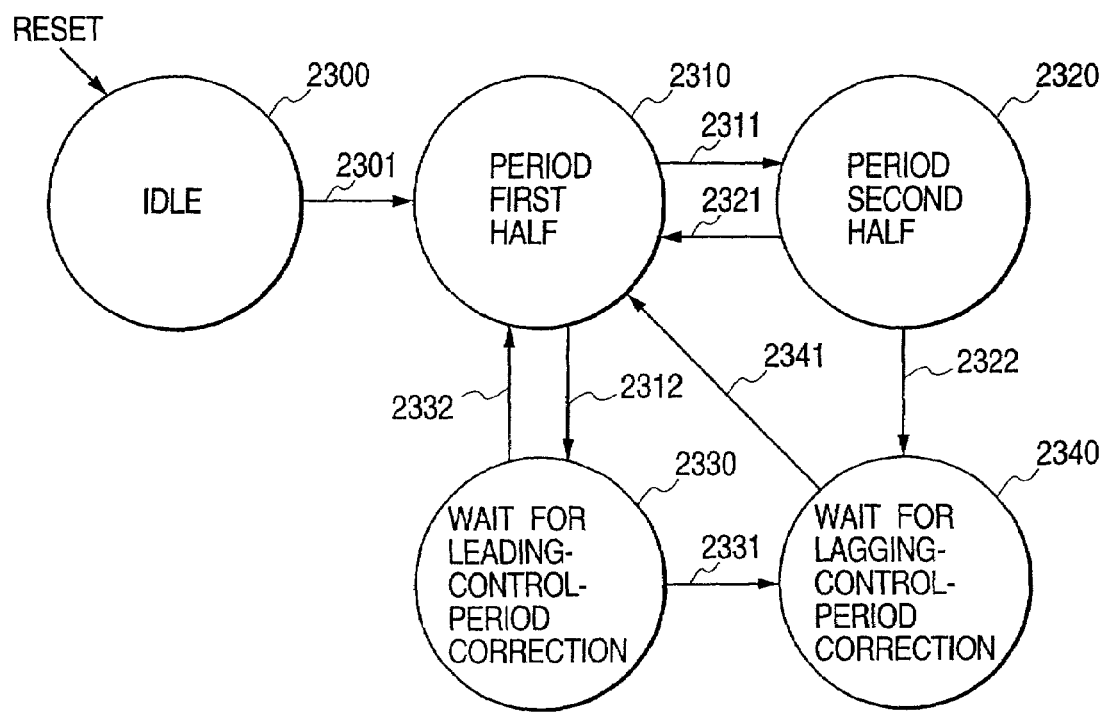
FIG. 23 is a diagram showing state transitions used for explaining the operation of the control-period correcting circuit shown in FIG. 22.

Next, the operation of the period-correction control circuit 1010' shown in FIG. 22 is explained by referring to a state-transition diagram shown in FIG. 23.

An idle state 2300 shown in the state-transition diagram of FIG. 23 is a state in which correction of a control period to eliminate a synchronization shift is not executed. A period first-half state 2310 is a state between the start and middle points of a control period in which the synchronization-reference signal 111 is not output. On the other hand, a period second-half state 2320 is a state between the middle and end points of a control period in which the synchronization-reference signal 111 is not output. A leading-control-period-correction waiting state 2330 is a state of waiting for execution of correction of a leading control period to delay the next control period. On the other hand, a lagging-control-period-correction waiting state 2340 is a state of waiting for execution of correction of a lagging control period to shorten the next control period.

The period-correction control circuit 1010' enters the idle state 2300 right after the system is reset. The period-correction control circuit 1010' transits from the idle state 2300 to the period first-half state 2310 in a state transition 2301 when the period signal 11a is output initially, that is, when an initial period signal is output. A state transition 2312 from the period first-half state 2310 to the leading-control-period-correction waiting state 2330 takes place when the synchronization-reference signal 111 is output. A state transition 2311 from the period first-half state 2310 to the period second-half state 2320 takes place when the synchronization-reference signal 111 is not output and the middle-point signal 109 is output. A state transition 2322 from the period second-half state 2320 to the lagging-control-period-correction waiting state 2340 takes place when the synchronization-reference signal 111 is output and the period signal 11a is output. A state transition 2321 from the period second-half state 2320 to the period first-half state 2310 takes place when the period signal 11a is output. A state transition 2331 from the leading-control-period-correction waiting state 2330 to the lagging-control-period -correction waiting state 2340 takes place when the synchronization-reference signal 111 is output and the period signal 11a is not output. A state transition 2332 from the leading-control-period-correction waiting state 2330 to the period first-half state 2310 takes place when the synchronization-reference signal 111 is output. A state transition 2341 from the lagging-control-period-correction waiting state 2340 to the period first-half state 2310 takes place when the period signal 11a is output.

The preset value 116 is determined by the state of the period-correction control circuit 1010'. To be more specific, the preset value 116 is set at 0 or 2 in the lagging-control-period-correction waiting state 2330 or the lagging-control-period-correction waiting state 2340 respectively. In the other states, the preset value 116 is set at 1.

Figure 24:
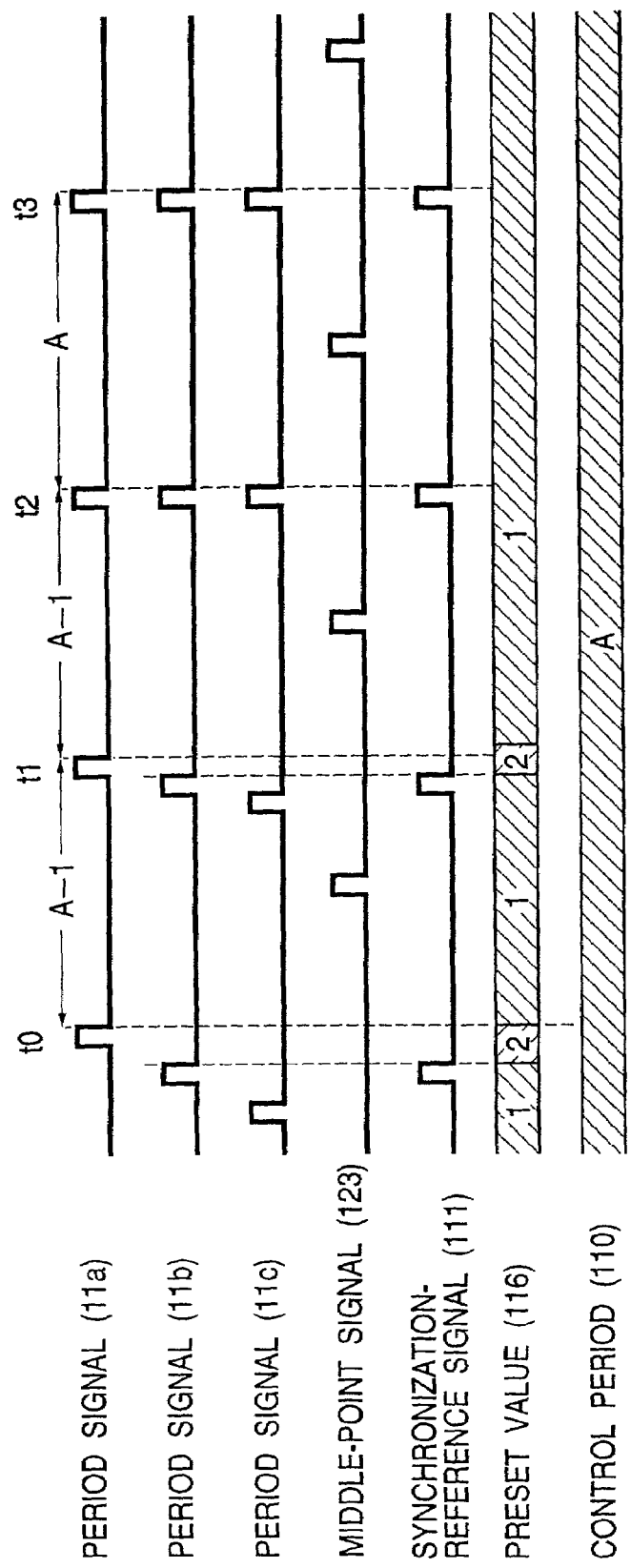
FIG. 24 is timing charts used for explaining the operation of the synchronization circuit shown in FIG. 20.
Figure 25:
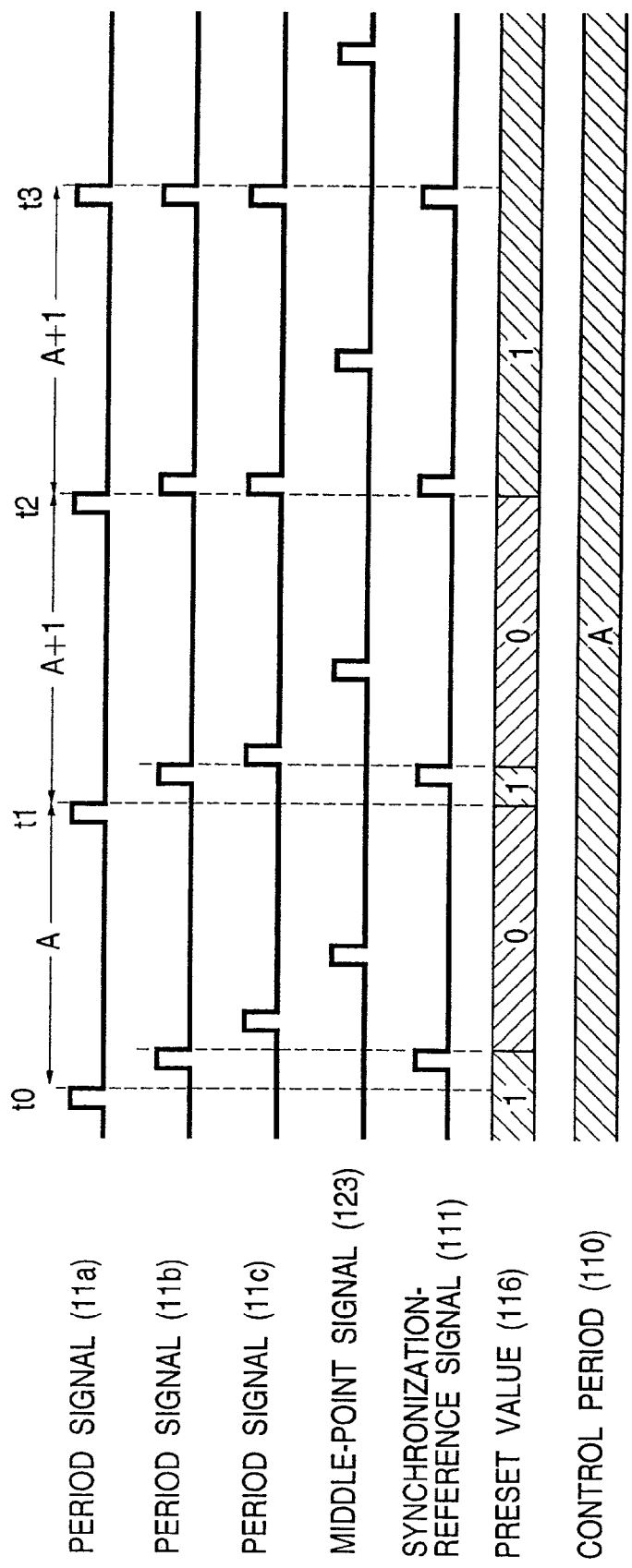
FIG. 25 is timing charts used for explaining the operation of the synchronization circuit shown in FIG. 20.

Next, operations of other implementations of the synchronization circuit 10a shown in FIG. 20 are explained by referring to timing charts shown in FIGS. 24 and 25.

First of all, the operation of the synchronization circuit 10a shown in FIG. 1 in a three-system synchronized operation of the controllers 1a, 1b and 1c also shown in FIG. 1 is explained by referring to the timing charts shown in FIG. 24.

It should be noted that a period A denotes the control period determined in advance. At points of time t0 and t1 in the timing charts shown in FIG. 24, the period signal 11a lags behind a synchronization reference. In this case, the preset value 116 is set at 2 to set the width of the next control period at (A−1) where the symbol A is the predetermined control period as described above. At points of time t2 and t3, on the other hand, the period signal 11a is synchronized with the synchronization reference. In this case, the preset value 116 is set at 1 to set the width of the next control period at A.

Next, the operation of the synchronization circuit 10a in the three-system synchronized operation of the controllers 1a, 1b and 1c is explained by referring to the timing charts shown in FIG. 25.

It should be noted that a period A similarly denotes the control period determined in advance. At a point of time t0 in the timing charts shown in FIG. 25, the period signal 11a leads ahead of a synchronization reference. In this case, the preset value 116 of a control period starting from a point of time t1 is set at 0 to set the width of this control period at (A+1) where the symbol A is the predetermined control period as described above. Also at the point of time t1, the period signal 11a leads ahead of the synchronization reference. In this case, the preset value 116 of a control period starting from a point of time t2 is set at 0 to set the width of this control period at (A+1). At a point of time t2, on the other hand, the period signal 11a is synchronized with the synchronization reference. In this case, the preset value 116 of a control period starting at a point of time t3 is set at 1 to set the width of this control period at A.

Figure 26:
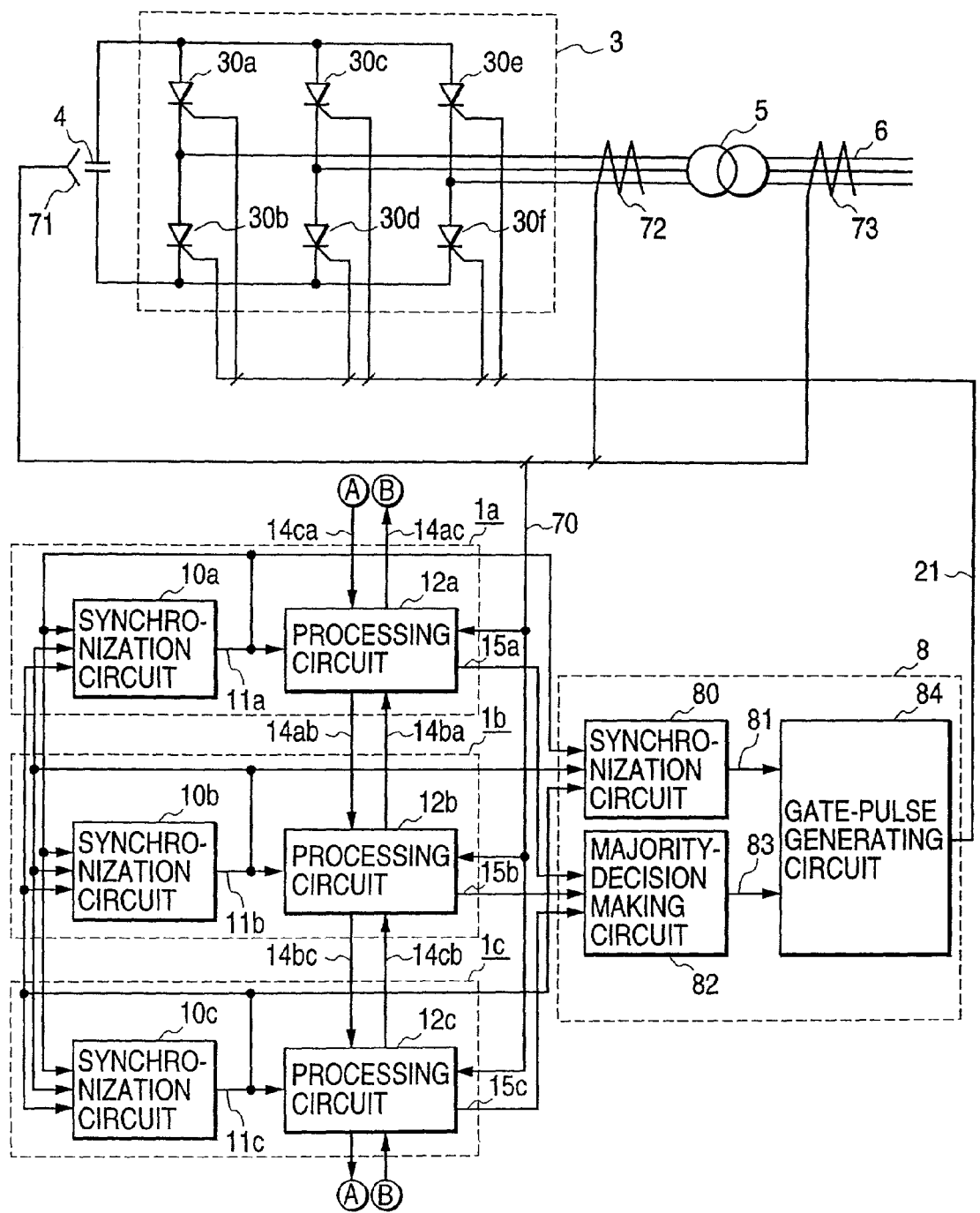
FIG. 26 is a block diagram showing a typical configuration of a power converting apparatus implemented by a second embodiment of the present invention.
Figure 27:
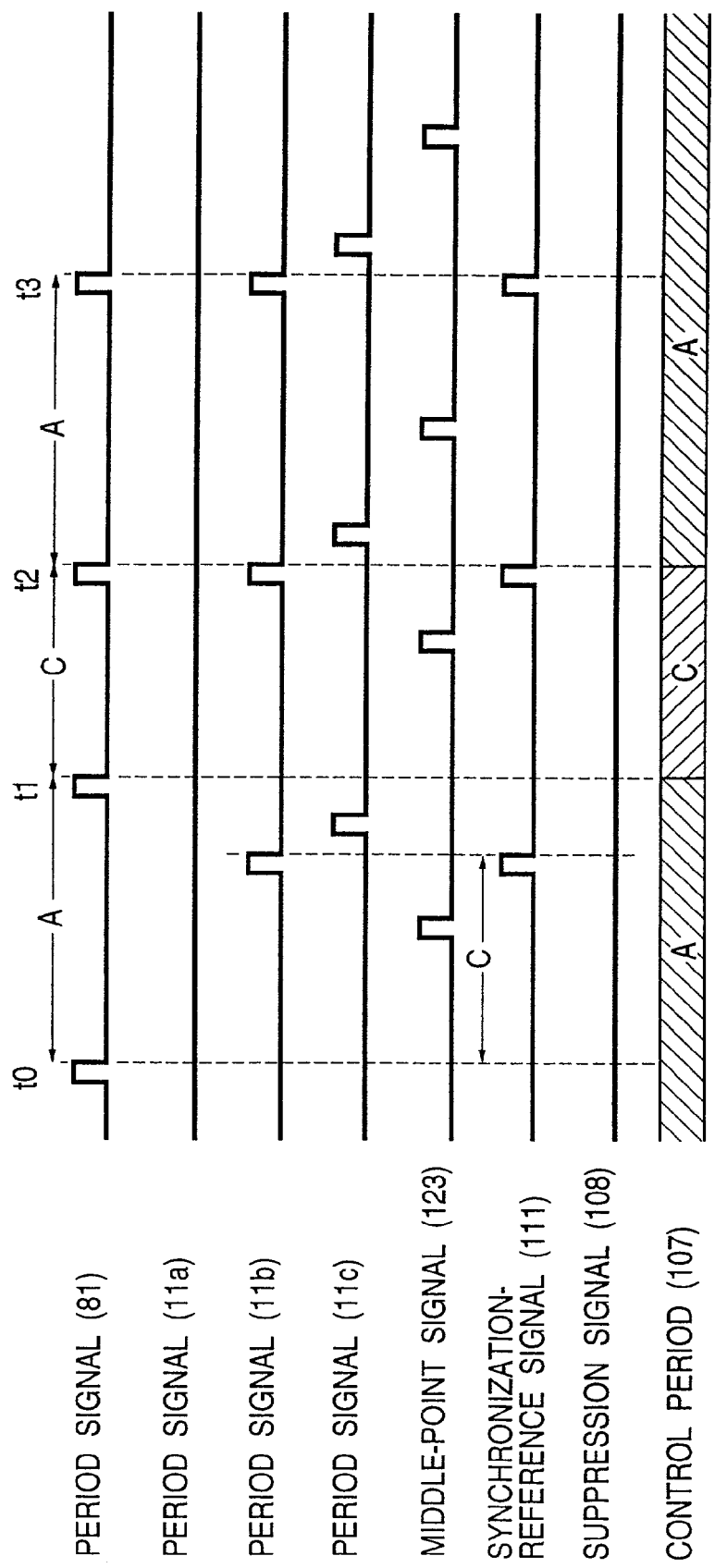
FIG. 27 is timing charts used for explaining the operation of the synchronization circuit employed in the power converting apparatus shown in FIG. 26.
Figure 28:
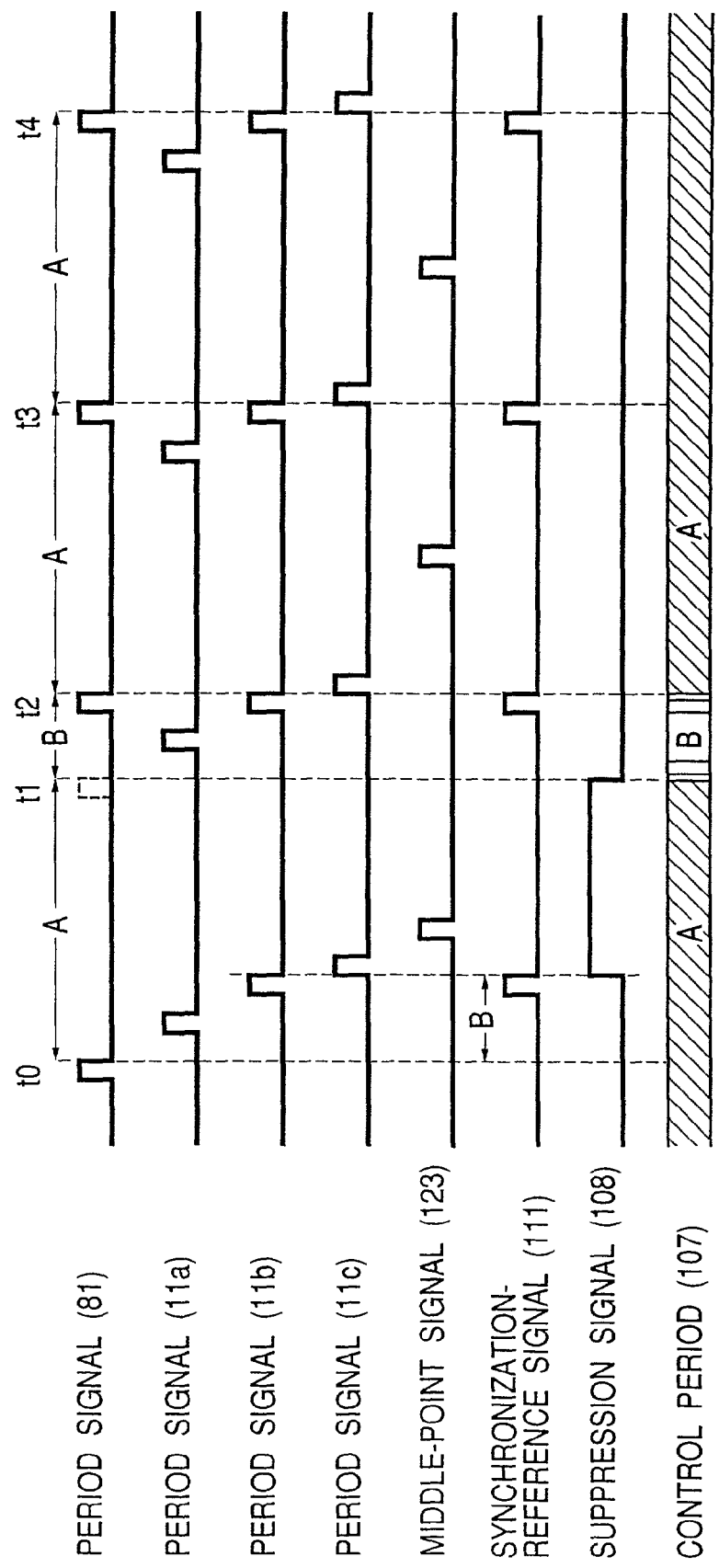
FIG. 28 is timing charts used for explaining the operation of the synchronization circuit employed in the power converting apparatus shown in FIG. 26.

Next, a second embodiment of the present invention is explained by referring to FIGS. 26 to 28.

The power converting apparatus implemented by the second embodiment as shown in FIG. 26 is different from the power converting apparatus implemented by the first embodiment as shown in FIG. 1 in that, in the case of the former, the processing circuits 12a, 12b and 12c of the controllers 1a, 1b and 1c respectively output gate-pulse changing times 15a, 15b and 15c respectively for each control period instead of outputting gate pulses. In addition, the power converting apparatus implemented by the second embodiment has a gate-pulse generating unit 8 for making a decision based on a majority of the gate-pulse changing times 15a, 15b and 15c and outputting a gate pulse 21 in accordance with the decision. The following description is focused on the differences.

The gate-pulse generating unit 8 comprises a synchronization circuit 80, a majority-decision making circuit 82 and a gate-pulse generating circuit 84. The synchronization circuit 80 synchronizes generation of gate pulses with control periods of the controllers 1a, 1b and 1c. The majority-decision making circuit 82 makes a decision based on a majority of the gate-pulse changing times 15a, 15b and 15c. The gate-pulse generating circuit 84 outputs gate pulses synchronously with the control periods of the controllers 1a, 1b and 1c on the basis the decision based on a majority of the gate-pulse changing times 15a, 15b and 15c.

The synchronization circuit 80 has the same configuration as the synchronization circuit 10 employed in the first embodiment. However, the synchronization circuit 80 is different from the synchronization circuit 10 employed in the first embodiment in that, in the case of the former, a synchronization reference selected from the period signals 11a, 11b and 11c output by other synchronization circuits 10a, 10b and 10c respectively is not used as a synchronization reference of its own period signal. The synchronization circuit 80 selects a synchronization reference from the period signals 11a, 11b and 11c output by the other synchronization circuits 10a, 10b and 10c respectively, outputting a period signal 81 synchronized with the selected synchronization reference.

The majority-decision making circuit 82 temporarily stores the gate-pulse changing times 15a, 15b and 15c output for each control period, makes a decision based on a majority of the gate-pulse changing times 15a, 15b and 15c and outputs the decision as a gate-pulse changing time 83.

Provided with a timer synchronized to the period signal 81, the gate-pulse generating circuit 84 outputs a gate pulse 21 in accordance with the gate-pulse changing time 83.

Next, the operation of the synchronization circuit 80 employed in the power converting apparatus implemented by the second embodiment shown in FIG. 26 is explained by referring to timing charts shown FIGS. 27 and 28. It should be noted that, in the following description, the symbol A represents a control period determined in advance.

First of all, the operation of the synchronization circuit 80 in a two-system synchronized operation of the controllers 1b and 1c is explained by referring to the timing chart shown in FIG. 27.

At a point of time t1 in the timing chart shown in FIG. 27, the period signal 81 lags behind a synchronization reference by a period of time (A–C). For this reason, a control period starting at the point of time t1 is set at a period of time C. As a result, at a point of time t2, the period signal 81 is synchronized with a synchronization reference.

Next, the operation of the synchronization circuit 80 in a three-system synchronized operation of the controllers 1a, 1b and 1c employed in the power converting apparatus shown in FIG. 26 is explained by referring to the timing chart shown in FIG. 28.

At a point of time t0 in the timing chart shown in FIG. 28, the period signal 81 leads ahead of the synchronization reference by a period of time B. For this reason, at a point of time t1, the outputting of the period signal 81 is suppressed. Instead, the period signal 81 is output at a point of time t2 lagging behind the point of time t1 by the period of time B. As a result, at the point of time t2, the period signal 81 is synchronized with a synchronization reference.

Figure 29:
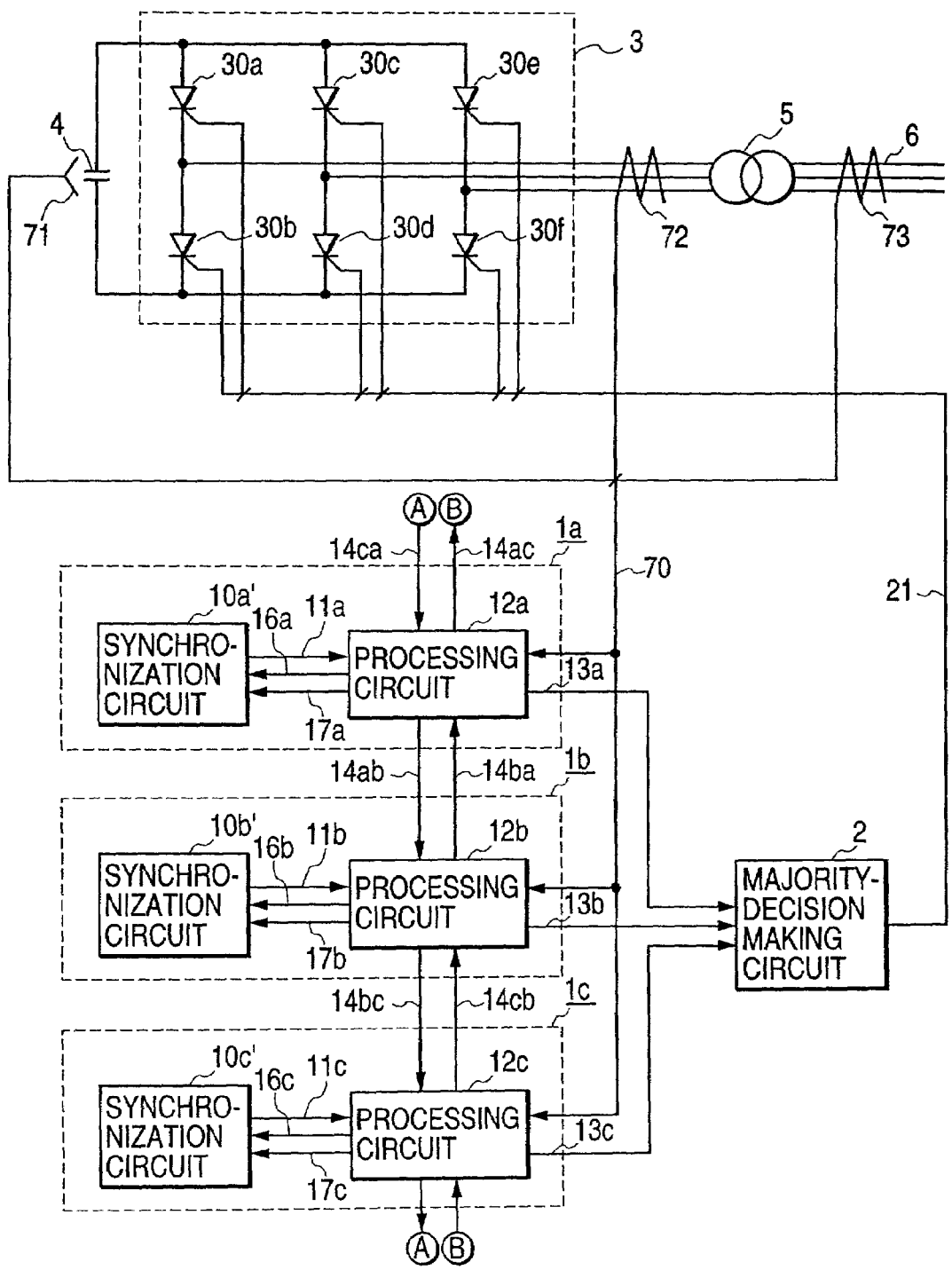
FIG. 29 is a block diagram showing a typical configuration of a power converting apparatus implemented by a third embodiment of the present invention.

Next, a third embodiment of the present invention is explained by referring to FIGS. 29 to 36. The power converting apparatus implemented by the third embodiment as shown in FIG. 29 is different from the power converting apparatus implemented by the first embodiment as shown in FIG. 1 in that, in the case of the former, the controllers 1a,1b and 1c do not exchange the period signals 11a, 11b and 11c directly. Instead, the controllers 1a, 1b and 1c exchange the period signals 11a, 11b and 11c through data transmission lines 14ab, 14ac, 14ba, 14bc, 14ca and 14cb. The following description is focused on the difference.

Receiving the period signal 11a, the processing circuit 12a, employed in the controller 1a of the power converting apparatus shown in FIG. 29 notifies the controllers 1b and 1c of the start point of the control period through the data transmission lines 14ab and 14ac. Notified by the controller 1b of the start point of a control period through the data transmission line 14ba, the controller 1a outputs a synchronization signal 16a to the synchronization circuit 10a'. Likewise, notified by the controller 1c of the start point of a control period through the data transmission line 14ca, the controller 1a outputs a synchronization signal 17a to the synchronization circuit 10a'. A controller is informed by another controller of the start point of a control period transmitted through a data transmission line as data of a specific pattern or a packet of a specific type. In this embodiment, in order to notify a controller of the start point of a control period, a packet distinguishable from other packets is transferred. Such a packet is referred to hereafter as a synchronization packet.

The synchronization circuit 10a' employed in the controller 1a selects a synchronization reference from the output timing of the period signal 11a and the input timings of the synchronization signals 16a and 17a, forming a judgment as to whether or not a synchronization shift exists. The synchronization circuit 10a, then corrects the control period by lengthening and shortening the period in order to eliminate the synchronization shift, if any. The synchronization signals 16a and 17a are output at points of times lagging behind the start points of the control periods of the controllers 1b and 1c respectively by time delays caused by propagation through the respective processing circuits and the respective data transmission lines. For this reason, a synchronization reference is selected and a judgment on the existence of a synchronization shift is formed by taking the output delay times of the synchronization signals 16a and 17a into consideration.

Figure 30:
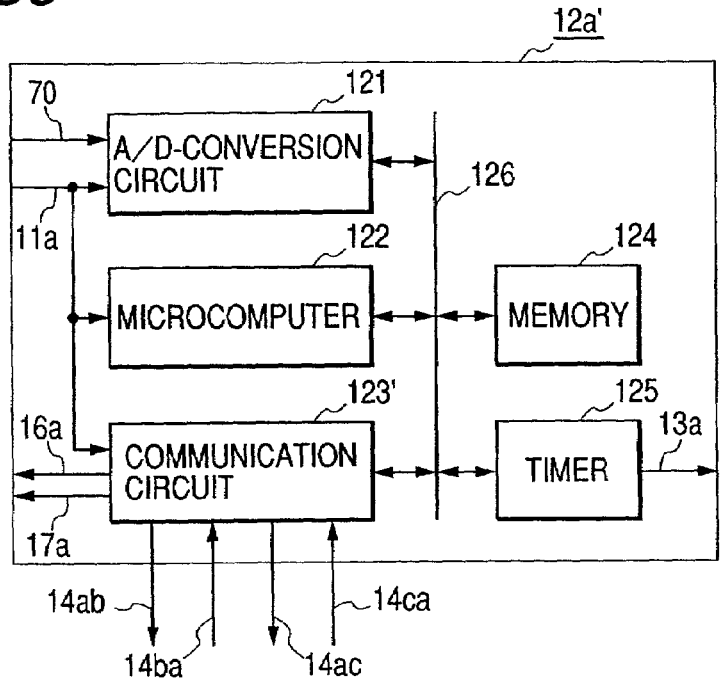
FIG. 30 is a block diagram showing a typical configuration of a processing circuit employed in the power converting apparatus shown in FIG. 29.

Next, the configuration of a processing circuit 12a' provided by a third embodiment is explained by referring to FIG. 30. A difference between the processing circuit 12a' provided by the present embodiment and the processing circuit 12a provided by the first embodiment lies on a communication circuit 123'.

Receiving the period signal 11a, the communication circuit 123' immediately transmits a synchronization packet to the processing circuits 12b, and 12c' through the data transmission lines 14ab and 14ac respectively. Receiving a synchronization packet from the processing circuit 12b' through the data transmission line 14ba, the communication circuit 123, immediately outputs the synchronization signal 16a to the synchronization circuit 10a'. Similarly, receiving a synchronization packet from the processing circuit 12c' through the data transmission line 14ca, the communication circuit 123' immediately outputs the synchronization signal 17a to the synchronization circuit 10a'.

Figure 31:
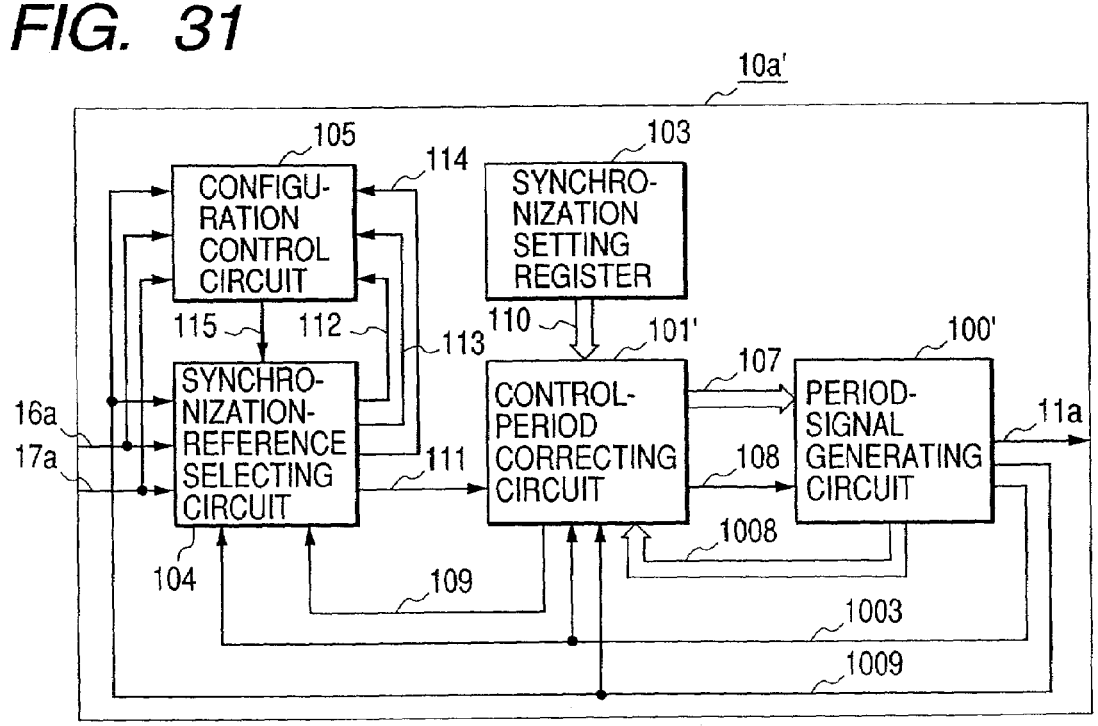
FIG. 31 is a block diagram showing a typical configuration of a synchronization circuit employed in the power converting apparatus shown in FIG. 29.

Next, the configuration of the synchronization circuit 10a' provided by the third embodiment is explained by referring to FIG. 31. Differences between the synchronization circuit 10a, provided by the third embodiment and the synchronization circuit 10a provided by the first embodiment lie on a period-signal generating circuit 100' and a control-period correcting circuit 101'.

When a period of time indicated by a control-period value 107 lapses since the start of a control period, the period-signal generating circuit 100' outputs a count-up signal 1003 and the period signal 11a provided that a suppression signal 108 is not received. In addition, as a predetermined period of time lapses since the period signal 11a is output, the period-signal generating circuit 100' outputs a synchronization signal 1009 always accompanied by a count value 1008 for a counter from which the counter starts.

The control-period correcting circuit 101' forms a judgment on a synchronization shift of the period signal 11a for its own controller 1a with respect to the synchronization-reference signal 111. The judgment is based on output timings of the synchronization-reference signal 111, the count-up signal 1003, the synchronization signal 1009 and the middle-point signal 109. In accordance with a result of the judgment, the control-period correcting circuit 101' outputs a next control-period value 107 to the period-signal generating circuit 100' by referring to a control-period value 110 stored in a control-period setting register 103 and a count value 1008 in the period-signal generating circuit 100' in order to lengthen or shorten the control period so that the next period signal is output synchronously with the synchronization reference. At the same time, the control-period correcting circuit 101' outputs the suppression signal 108 for temporarily suppressing the outputting of the period signal 11a to the period-signal generating circuit 100' if the control period is to be corrected by an increment.

It should be noted that, while the configurations of the synchronization-reference selecting circuit 104 and the configuration control circuit 105 are the same as those provided by the first embodiment, the synchronization signals 1009, 16a and 17a are input in place of the period signals 11a, 11b and 11c respectively. For this reason, the synchronization-reference selecting circuit 104 outputs the synchronization-reference signal 111 at a point of time lagging behind the due synchronization-reference time by an output delay time of the synchronization signals 1009, 16a and 17a.

Figure 32:
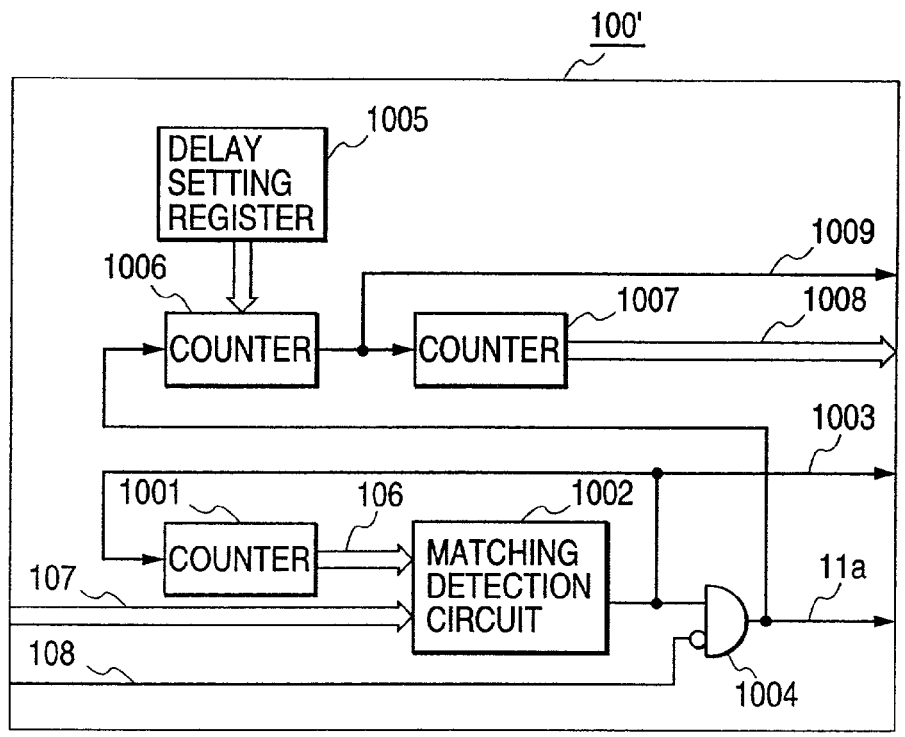
FIG. 32 is a block diagram showing a typical configuration of a period-signal generating circuit employed in the synchronization circuit shown in FIG. 31.

Next, the configuration of the period-signal generating circuit 100' provided by the third embodiment is explained by referring to FIG. 32.

As shown in FIG. 32, the period-signal generating circuit 100' comprises counters 1001, 1006 and 1007 increasing their contents synchronously with the clock signal, a matching detection circuit 1002 for detecting coincidence of the count value 106 stored in the counter 1001 with the control-period value 107, a logic circuit 1004 for controlling an operation to output the period signal 11a and a delay setting register 1005 for correcting the output delays of the synchronization signals 16a and 17a.

The counter 1001 starts counting when the count-up signal 1003 is supplied thereto, outputting the count value 106 all the time.

The matching detection circuit 1002 outputs the count-up signal 1003 when the count value 106 of the counter 1001 matches the control-period value 107.

The logic circuit 1004 outputs the period signal 11a when the count-up signal 1003 is active and the suppression signal 108 is not. When the suppression signal 108 is active, on the other hand, the logic circuit 1004 does not output the period signal 11a without regard to whether the count-up signal 1003 is active or inactive.

The counter 1006 starts counting when the period signal 11a is supplied thereto. As the count value of the counter 1006 matches a value set in the delay setting register 1005, the counter 1006 outputs the synchronization signal 1009, stopping the counting operation. The count value 1008 of the counter 1007 is reset to a zero when the synchronization signal 1009 is supplied thereto. The counter 1007 outputs the count value 1008 all the time.

If a value equal to the output delay time of the synchronization signals 16a and 17a is set in the delay setting register 1005, a relative time relation among the output timings of the synchronization signal 1009, the synchronization signal 16a and the synchronization signal 17a matches a relative time relation among the output timings of the period signals 11a, 11b and 11c due to the operations of the counters 1006 and 1007 described above.

Figure 33:
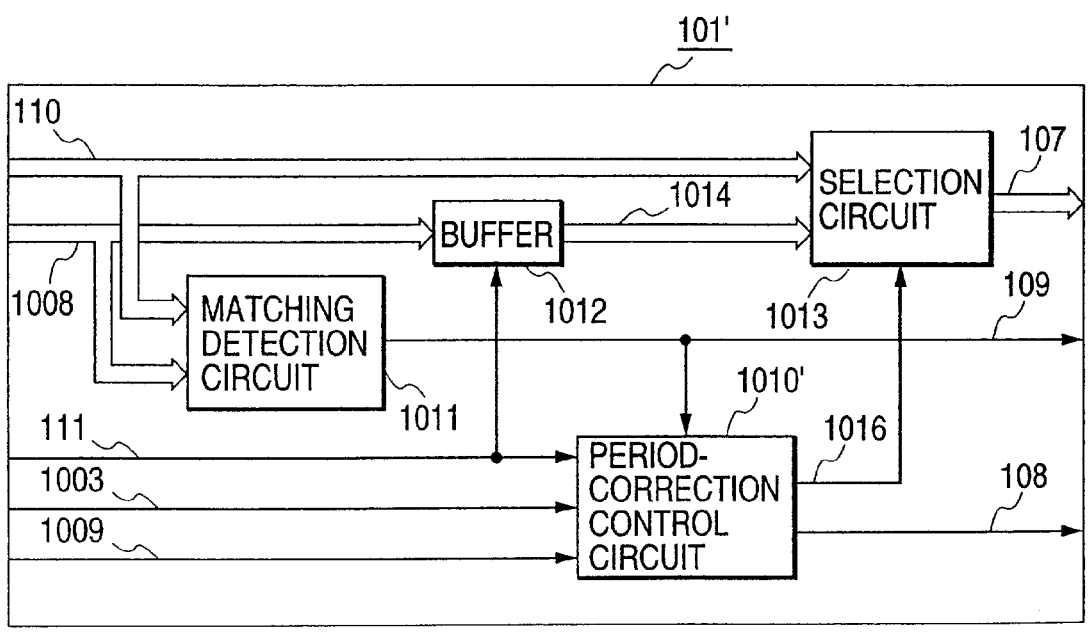
FIG. 33 is a block diagram showing a typical configuration of a control-period correcting circuit employed in the synchronization circuit shown in FIG. 31.

Next, the control-period correcting circuit 101' provided by the third embodiment is explained by referring to FIG. 33.

As shown in FIG. 33, the control-period correcting circuit 101' comprises a period-correction control circuit 1010', a matching detection circuit 1011, a buffer 1012 and a selection circuit 1013. The period-correction control circuit 1010 controls correction of the control period to eliminate a synchronization shift. The matching detection circuit 1011 outputs the middle-point signal 109 upon detection of the fact that the first half of the control period lapses since the start point thereof. The buffer 1012 is used for temporarily storing the count value 1008 and the selection circuit 1013 outputs the control-period value 107.

To put it in detail, the period-correction control circuit 1010' outputs a selection signal 1016 and the suppression signal 108 on the basis of the output timings of the middle-point signal 109, the synchronization signal 1009, the count-up signal 1003 and the synchronization-reference signal 111.

The matching detection circuit 1011 outputs the middle-point signal 109 when the count value 106 matches a value obtained as a result of shifting the control-period set value 110 to the right by 1 bit. The buffer 1012 stores the count value 1008 when the synchronization-reference signal 111 is output. When the selection signal 1016 has a logic value of 0, the selection circuit 1013 outputs the control-period set value 110 as the control-period value 107. When the selection signal 1016 has a logic value of 1, on the other hand, the selection circuit 1013 outputs a count value 1014 stored in the buffer 1012 as the control-period value 107.

Figure 34:
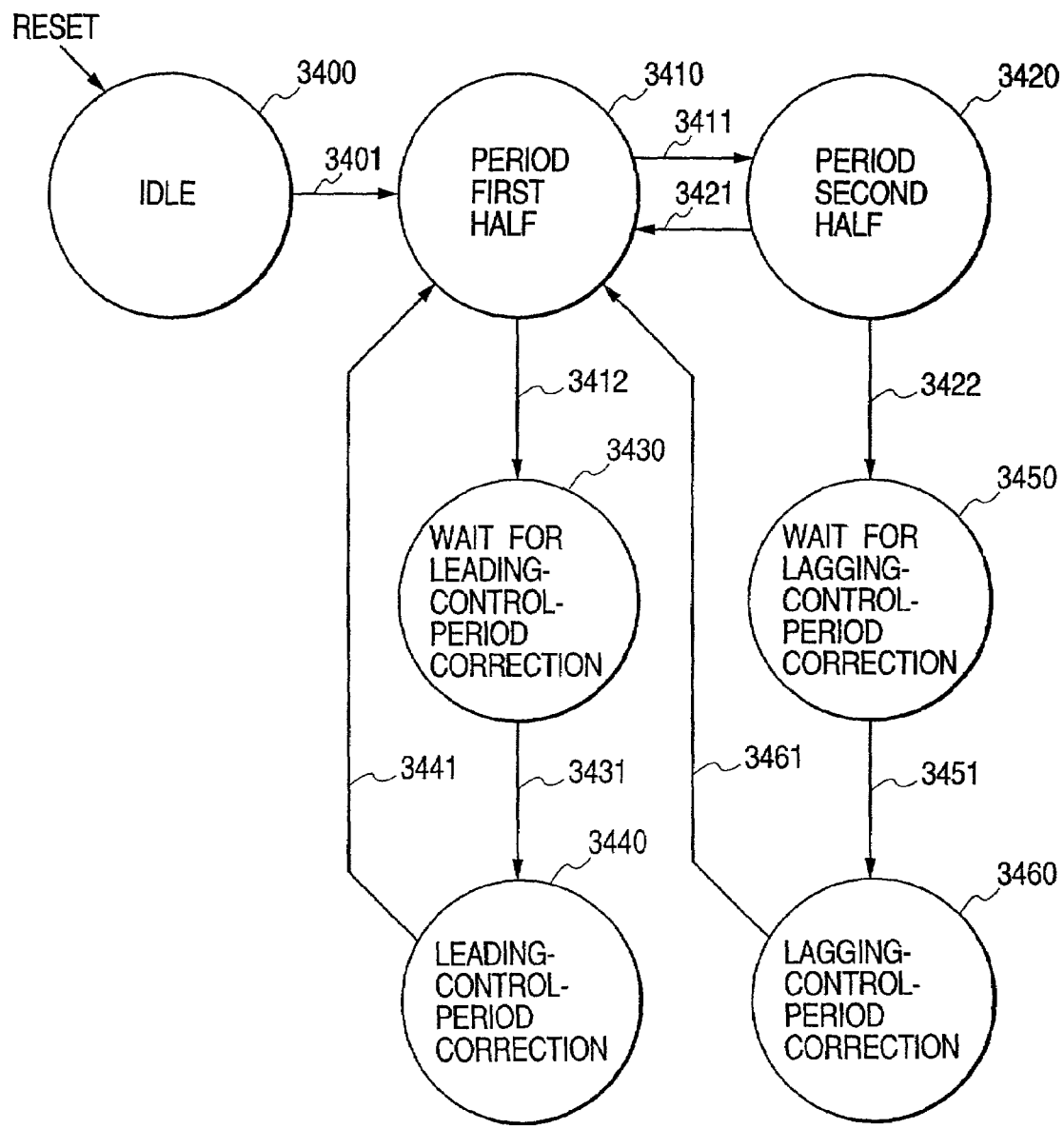
FIG. 34 is an explanatory diagram showing state transitions of the control-period correcting circuit shown in FIG. 33.

Next, the operation of the period-correction control circuit 1010' provided by the third embodiment is explained by referring to FIG. 34, a diagram showing state transitions representing behaviors displayed by the period-correction control circuit 1010'.

As shown in FIG. 34, possible states of the operation of the period-correction control circuit 1010' are an idle state 3400, a period first-half state 3410, a period second-half state 3420, a leading-control-period-correction waiting state 3430, a leading-control-period-correction state 3440, a lagging-control-period-correction waiting state 3450 and a lagging-control-period-correction state 3460.

The idle state 3400 is a state in which correction of the control period to eliminate a synchronization shift of the control period is not executed. The period first-half state 3410 is a state between the start point of a control period and a middle point of the control period during which the synchronization-reference signal 111 is not output. The period second-half state 3420 is a state between a middle point of a control period and the end point of the control period during which the synchronization-reference signal 111 is not output. The leading-control-period-correction waiting state 3430 is a state of waiting for execution of leading-control-period-correction to lengthen the current control period. The leading-control-period-correction state 3440 is a state of execution of leading-control-period correction to lengthen the current control period. The lagging-control-period-correction waiting state 3450 is a state of waiting for execution of lagging-control-period correction to shorten the next control period. The lagging-control-period-correction state 3460 is a state of execution of lagging-control-period correction to shorten the current control period.

The period-correction control circuit 1010' enters the idle state 3400 right after the system is reset. The period-correction control circuit 1010' transits from the idle state 3400 to the period first-half state 3410 in a state transition 3401 when the synchronization signal 1009 is output for the first time. A state transition 3412 from the period first-half state 3410 to the leading-control-period-correction waiting state 3430 takes place when the synchronization-reference signal 111 is output. A state transition 3411 from the period second-half state 3410 to the period second-half state 3420 takes place when the middle-point signal 109 is output but the synchronization-reference signal 111 is not. A state transition 3422 from the period-second half state 3420 to the lagging-control-period-correction waiting state 3450 takes place when the synchronization-reference signal 111 is output and the synchronization signal 1009 is not. A state transition 3421 from the period-second half state 3420 to the period first-half state 3410 takes place when the synchronization signal 1009 is output. A state transition 3431 from the leading-control-period-correction waiting state 3430 to the leading-control-period-correction state 3440 takes place when the count-up signal 1003 is output. A state transition 3441 from the leading-control-period-correction state 3440 to the period first-half state 3410 takes place when the count-up signal 1003 is output. A state transition 3451 from the lagging-control-period-correction waiting state 3450 to the lagging-control-period-correction state 3460 takes place when the count-up signal 1003 is output. A state transition 3461 from the lagging-control-period-correction state 3460 to the period first-half state 3410 takes place when the count-up signal 1003 is output.

The selection signal 1016 and the suppression signal 108 are determined by the state of the period-correction control circuit 1010'. To put it in detail, in the leading-control-period-correction state 3440 and the lagging-control-period-correction state 3460, the selection signal 1016 has a logic value of 1. In other states, the selection signal 1016 has a logic value of 0. On the other hand, in the leading-control-period-correction waiting state 3430, the suppression signal 108 has a logic value of 1. In other states, the suppression signal 108 has a logic value of 0.

Figure 35:
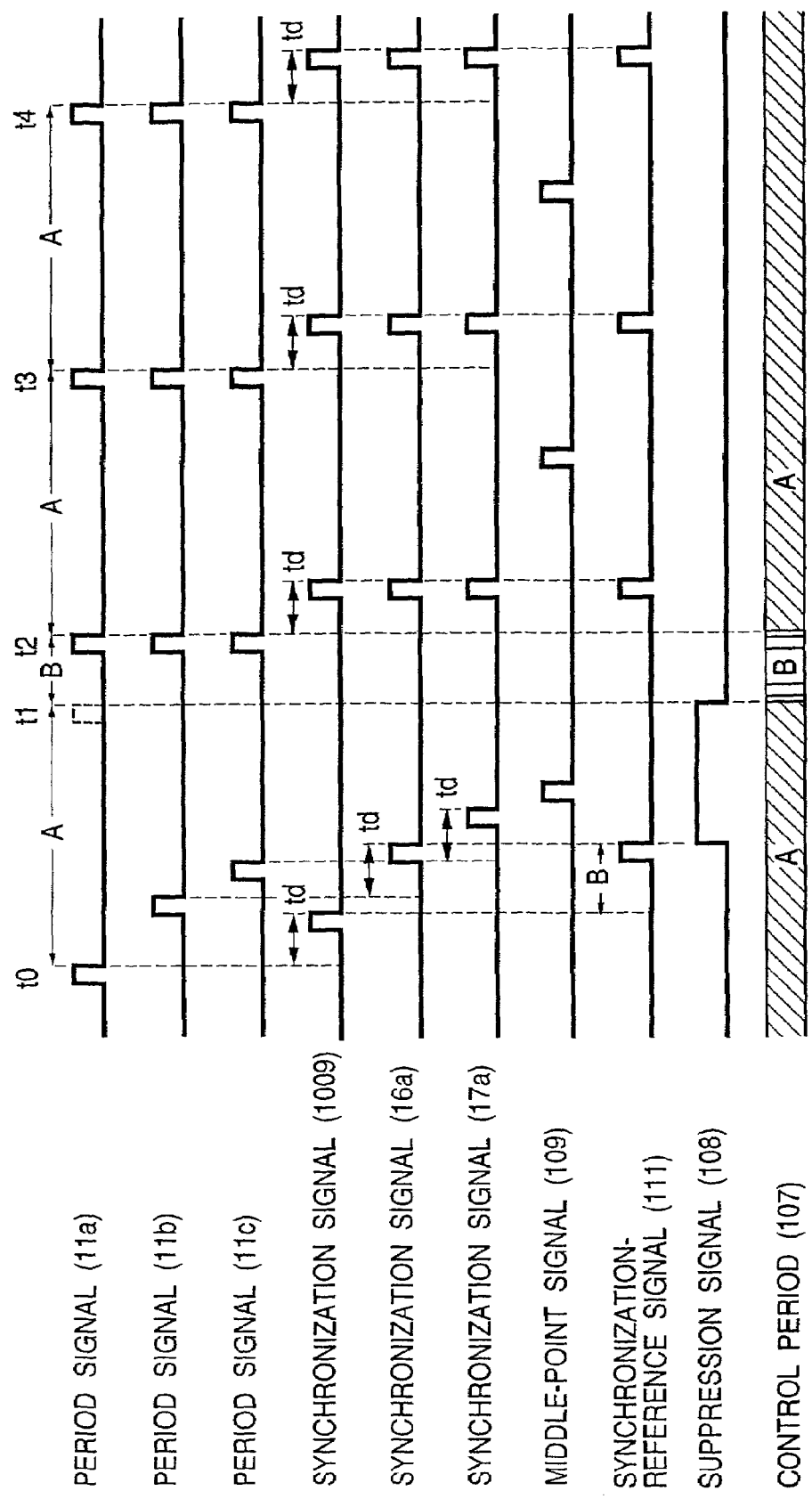
FIG. 35 is timing charts used for explaining the operation of the synchronization circuit shown in FIG. 31.
Figure 36:
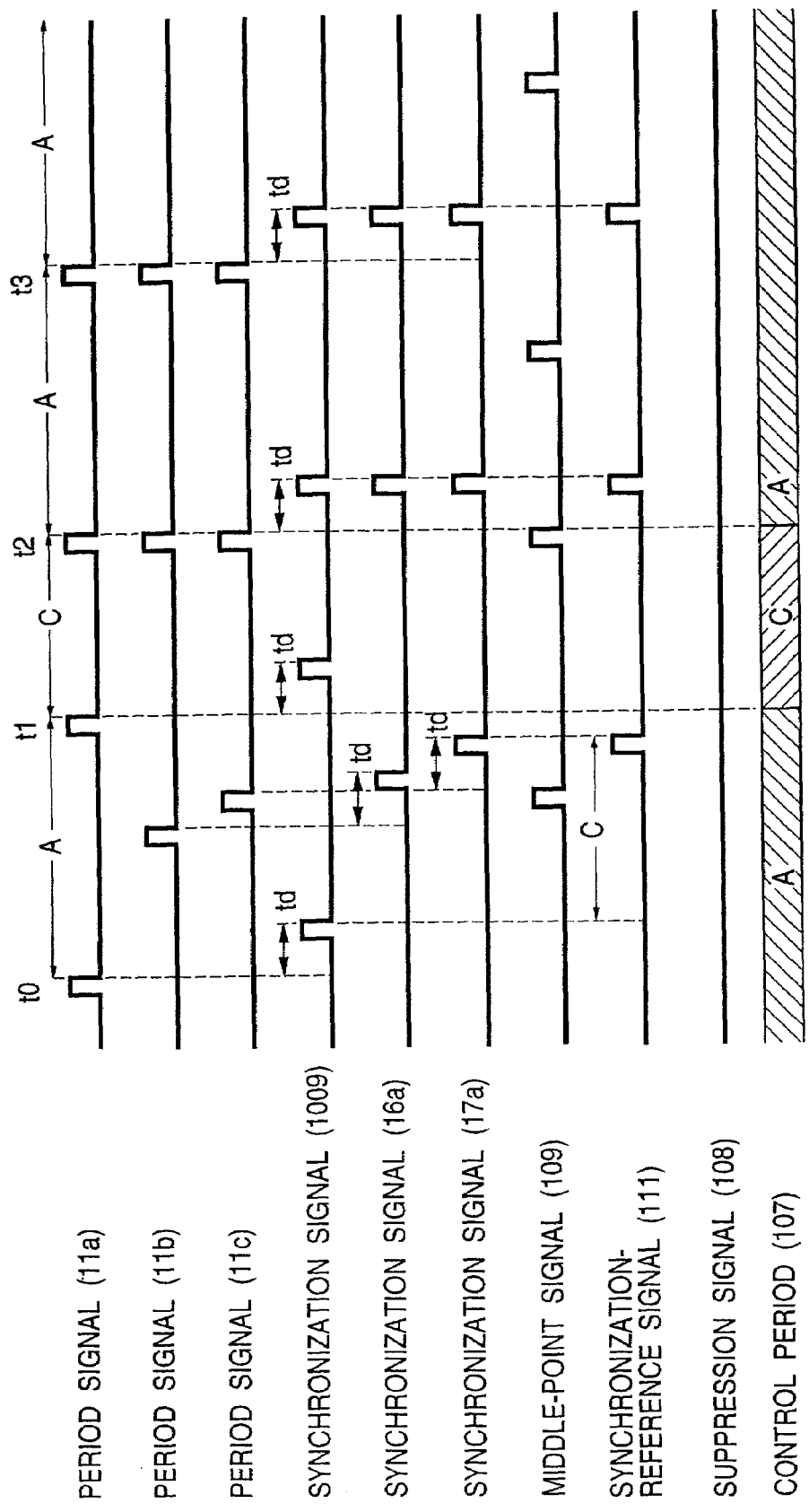
FIG. 36 is timing charts used for explaining the operation of the synchronization circuit shown in FIG. 31.

Next, operations of the synchronization circuit 10a', provided by the third embodiment are explained by referring to timing charts shown in FIGS. 35 and 36.

First of all, the operation of the synchronization circuit 10a', in a three-system synchronized operation of the controllers 1a, 1b and 1c is explained by referring to the timing charts shown in FIG. 35. As shown in the figure, the synchronization signal 16a is output, lagging behind the period signal 11b by a delay time td. Similarly, the synchronization signal 17a is output, lagging behind the period signal 11c also by the delay time td. The value set in the delay setting register 1005 is also equal to the delay time td.

At a point of time t0, the synchronization circuit 10a' lengthens the control period because the synchronization signal 1009 leads ahead of the synchronization-reference signal 111 by a period of time B. The control period is lengthened by suppressing the outputting of the period signal 11a at a point of time t1 lagging behind the point of time t0 by the control period A determined in advance and then outputting the period signal 11a at a point of time t2 lagging behind the point of time t1 by the period of time B.

Next, the operation of the synchronization circuit 10a', in the three-system synchronized operation of the controllers 1a, 1b and 1c is explained by referring to the timing charts shown in FIG. 36. Also in this case, the synchronization signal 16a is output, lagging behind the period signal 11b by a delay time td. Similarly, the synchronization signal 17a is output, lagging behind the period signal 11c also by the delay time td. The value set in the delay setting register 1005 is also equal to the delay time td.

At a point of time t1, the synchronization circuit loaf shortens the control period because the synchronization signal 1009 lags behind the synchronization-reference signal 111 by a period of time (A–C) where the symbol A is the control period determined in advance and the symbol C is the length of a period of time. The control period is lengthened by setting a control period starting at the point of time t1 to the period of time C and then outputting the period signal 11a at a point of time t2 lagging behind the point of time t1 by the period of time C.

In the above description, the present invention is exemplified by a control apparatus for a three-system synchronized operation. It is obvious, however, that the present invention can also be applied to a control apparatus for a two-system or four-system synchronized operation or synchronized operations for more than 4 systems.

In addition, while the present invention is applied to a power converting apparatus in the above description, the scope of the present invention also includes applications to control of synchronization for synchronized control operations of other apparatuses and systems.

As described above, according to the present invention, each system of a synchronous-multisystem control apparatus outputs a period signal for each control period and sets a synchronization reference at a point of time by which a majority of period signals of all systems in the apparatus has been output in order to form a judgment on a synchronization shift of its own system and to correct its own control period on the basis of a result of the judgment. In case a synchronization reference can not be determined due to the fact that a majority of period signals of all systems in the apparatus is not output, the control period of its own system is not corrected. For this reason, period signals can be output continually even if there is only 1 remaining normal system. As a result, it is possible to carry out processing to halt a power converting system in the event of multiple failures occurring in the control apparatus.

The following is a description of a communication control apparatus which is capable of performing receiving operations with a high degree of reliability, reducing the amount of hardware and lowering the magnitude of a reception-processing overhead.

Figure 37:
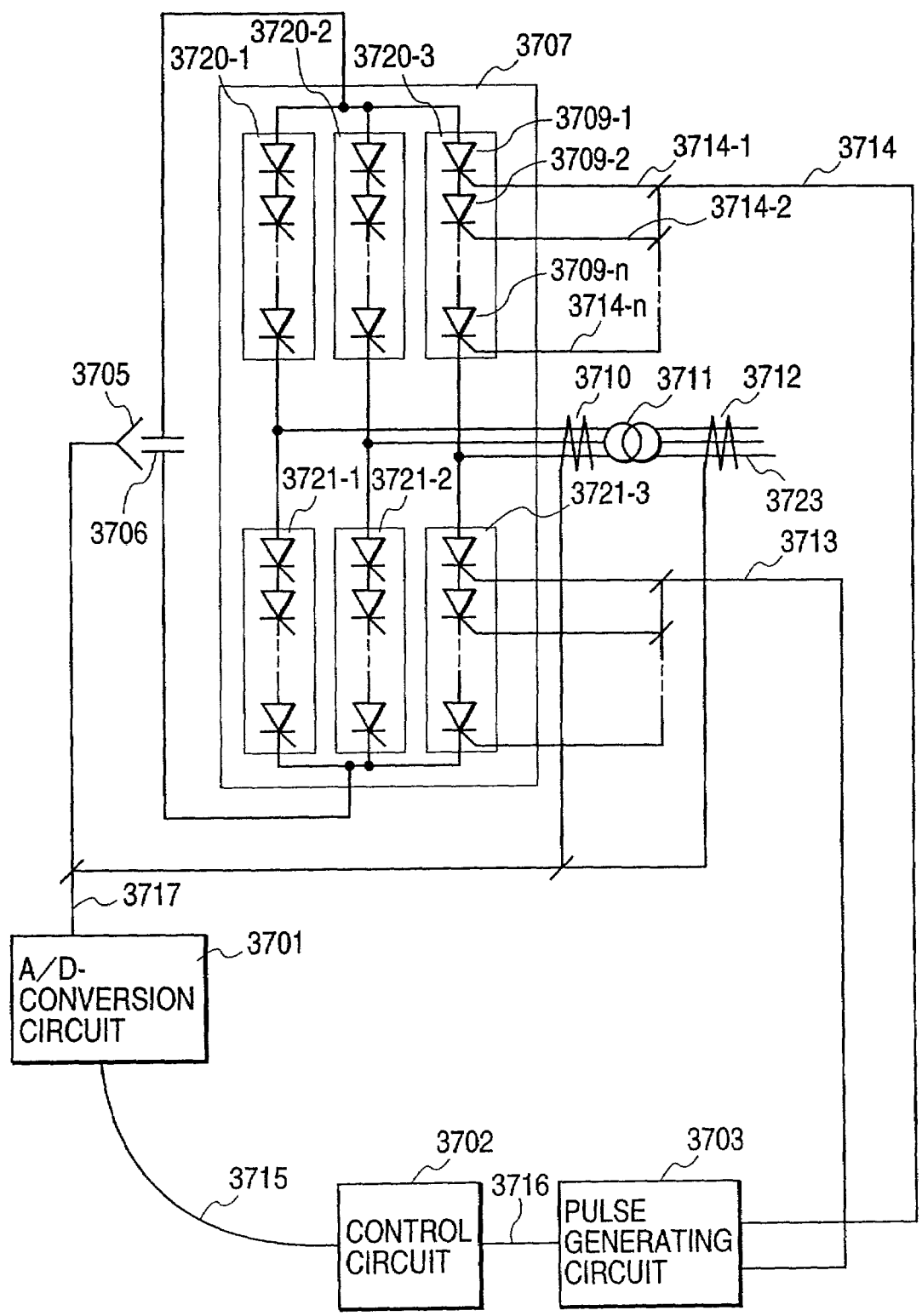
FIG. 37 is a block diagram showing the overall configuration of a power-converter controlling apparatus provided by the present invention.

The description begins with an explanation of the overall configuration of a power-converter control apparatus provided by the present invention with reference to FIG. 37. As shown in FIG. 37, the power-converter control apparatus comprises an A/D converter 3701, a control circuit 3702, a pulse generating circuit 3703, sensors 3705, 3710 and 3712, a direct-current power supply 3706, a power-conversion unit 3707, GTO devices 3709-1 to 3709-n, a transformer 3711, P-side arms 3720-1 to 3720-3 and N-side arms 3721-1 to 3721-3. It should be noted that each of the P-side arms 3720-1 to 3720-3 and the N-side arms 3721-1 to 3721-3 comprises the n GTO devices 3709-1 to 3709-n.

The A/D converter 3701 receives analog signals from the sensors 3705, 3710 and 3712 through signal lines 3717, converting each of the analog signals into digital data which is then transmitted to the control circuit 3702 through an optical fiber 3715. Receiving the digital data, the control circuit 3702 carries out PWM (pulse width modulation) to output a pulse signal to the pulse generating circuit 3703 through a signal line 3716. Receiving the pulse signal, the pulse generating circuit 3703 generates a P-side pulse signal and an N-side pulse signal and outputs the P-side pulse signal and the N-side pulse signal to the P-side arms 3720-1 to 3720-3 and the N-side arms 3721-1 to 3721-3 through signal lines 3714 and 3713 respectively as gate pulses. The P-side and the N-side pulse signals each maintain a dead time and a minimum pulse width.

Receiving the gate pulses through the signal lines 3714 and 3713, the P-side arms 3720-1 to 3720-3 and the N-side arms 3721-1 to 3721-3 employed in the power-conversion unit 3707 controls the voltages of the 3-phase system 3723 by adjusting the voltage of the direct-current power supply 3706.

Figure 38:
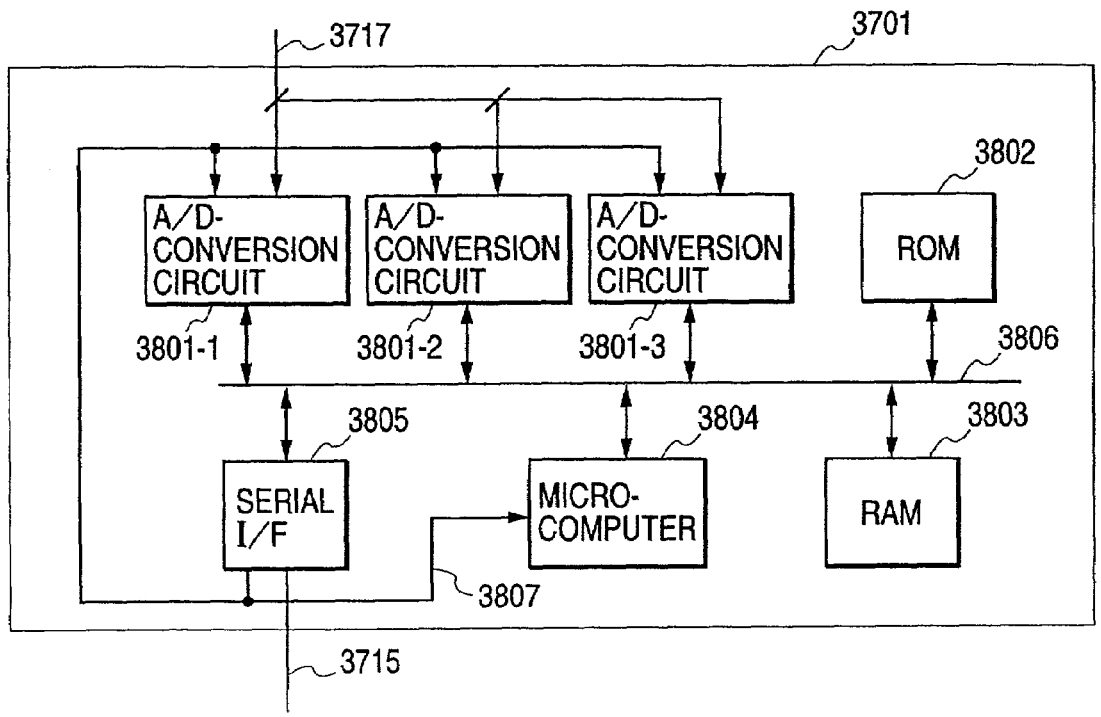
FIG. 38 is a block diagram showing a typical configuration of an A/D converter employed in the power-converter controlling apparatus shown in FIG. 37.

Next, the A/D converter 3701 employed in the power-converter control apparatus shown in FIG. 37 is described by referring to FIG. 38. As shown in FIG. 38, the A/D converter 3701 comprises A/D-conversion units 3801-1 to 3801-3, a read-only memory (ROM) unit 3802, a random-access memory (RAM) 3803, a microcomputer 3804 and a serial interface (serial I/F) unit 3805.

The A/D conversion units 3801-1 to 3801-3 receive analog signals generated by the sensors 3705, 3710 and 3712 respectively through the signal lines 3717, converting each of the analog signals into a digital value on the rising edge of a signal on the signal line 3807.

The ROM unit 3802 is used for storing a control program to be executed by the microcomputer 3804.

The RAM unit 3803 is used for storing data packets received from the serial I/F unit 3805.

Detecting the rising edge of the signal on the signal line 3807, the microcomputer 3804 executes the control program stored in the ROM unit 3802 to read out digital data stored in the A/D conversion-units 3801-1 to 3801-3. The digital data is then stored in the RAM unit 3803 at predetermined addresses.

The serial I/F unit 3805 receives an interrupt packet from the control circuit 3702 employed in the power-converter control apparatus shown in FIG. 37 through the optical fiber 3715, correcting an error in the interrupt packet, if any. If the interrupt packet is received correctly, the serial I/F unit 3805 raises the signal line 3807 to a level corresponding to a logic value of 1 for a predetermined period of time.

It should be noted that there are 2 kinds of packet, namely, data and interrupt packets. A data packet includes information such as the user's numerical data. On the other hand, an interrupt packet does not include the user's information. An interrupt packet is used for interrupting a reception control circuit of a receiver.

Figure 39:
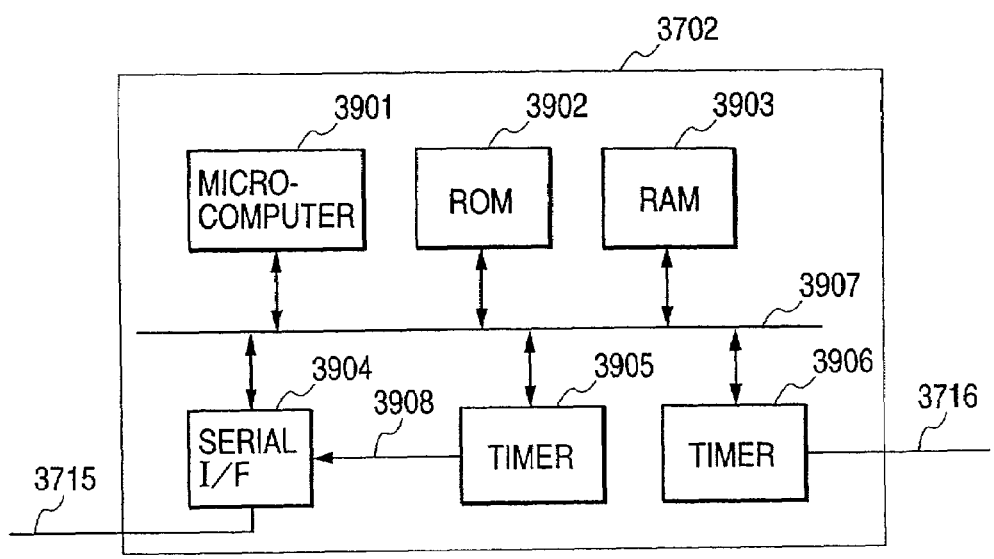
FIG. 39 is a block diagram showing a typical configuration of a control circuit employed in the power-converter controlling apparatus shown in FIG. 37.

Next, the control circuit 3702 employed in the power-converter control apparatus shown in FIG. 37 is described by referring to FIG. 39.

As shown in FIG. 39, the control circuit 3702 comprises a microcomputer 3901, a ROM unit 3902, a RAM unit 3903, a serial I/F unit 3904 and timers 3905 and 3906.

The serial I/F unit 3904 employed in the control circuit 3702 has the same configuration as the serial I/F unit 3805 employed in the A/D converter 3701 shown in FIG. 38 except that the former does not receive an interrupt packet generated by an external source while the latter does and the former receives an interrupt signal generated by an internal source while the latter does not. To be more specific, the serial I/F unit 3805 employed in the A/D converter 3701 receives an external interrupt packet from the control circuit 3702 while the serial I/F unit 3904 employed in the control circuit 3702 receives an internal interrupt signal generated by the timer 3905.

The ROM unit 3902 is used for storing a processing program to be executed by the microcomputer 3901.

The microcomputer 3901 executes the processing program stored in the ROM unit 3902 to carry out processing based on A/D-conversion data stored in the RAM unit 3903 for generating PWM pulses which are supplied to the timer 3906.

The RAM unit 3903 is used for storing data packets received from the A/D converter 3701 through the optical fiber 3715. A data packet includes A/D-conversion data.

The serial unit I/F 3904 receives a data packet from the A/D converter 3701 through the optical fiber 3715, correcting an error in the data packet, if any. The I/F unit 3904 then stores the data packet into the RAM unit 3903. The serial I/F 3904 also receives a signal from the timer 3905 through a signal line 3908, transmitting an interrupt packet to the A/D converter 3701 through the optical fiber 3715 with timing coinciding with the reception of the signal from the timer 3905. The interrupt packet is used for notifying the A/D converter 3701 of a time to start A/D conversion.

Figure 40A:
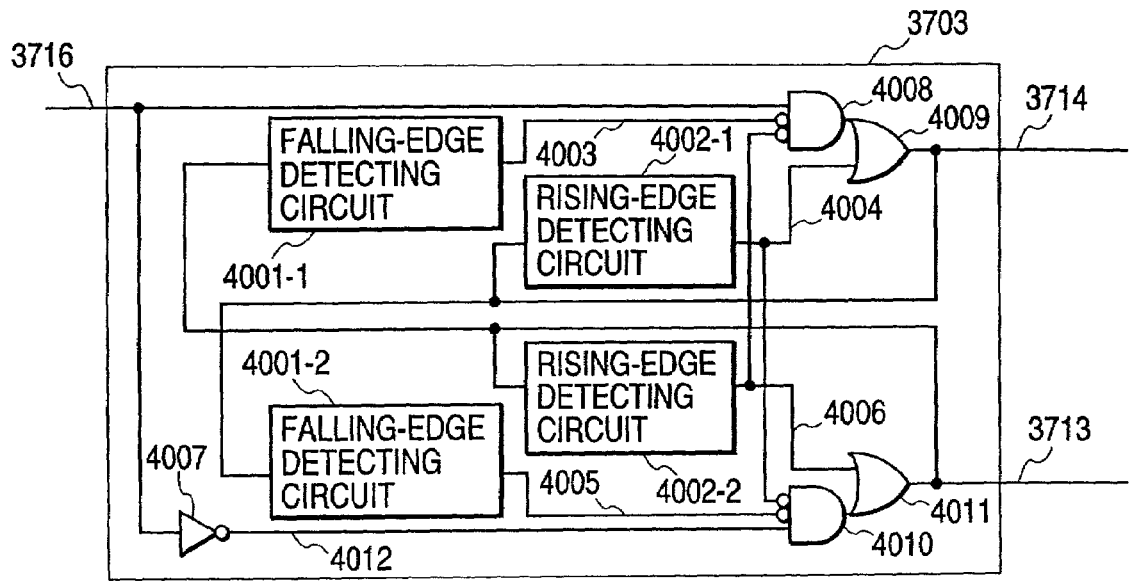
FIGS. 40(a) and 40(b) are a block diagram showing a typical configuration of a pulse generating circuit employed in the power-converter controlling apparatus shown in FIG. 37 and timing charts representing the operation of the pulse generating circuit, respectively.

Next, the pulse generating circuit 3703 employed in the power-converter control apparatus shown in FIG. 37 is described by referring to FIG. 40(*a*).

As shown in FIG. 40(*a*), the pulse generating circuit 3703 comprises falling-edge detecting circuits 4001-1 and 4001-2, raising-edge detecting circuits 4002-1 and 4002-2, 3-input AND gates 4008 and 4010, 2-input OR gates 4009 and 4011 and a NOT gate 4007.

The falling-edge detecting circuits 4001-1 and 4001-2 each detect the falling edge of an input signal, outputting an ON pulse on the detected falling edge for a predetermined period of time.

On the other hand, the rising-edge detecting circuits 4002-1 and 4002-2 each detect the raising edge of an input signal, outputting an ON pulse on the detected raising edge for a predetermined period of time.

Figure 40B:
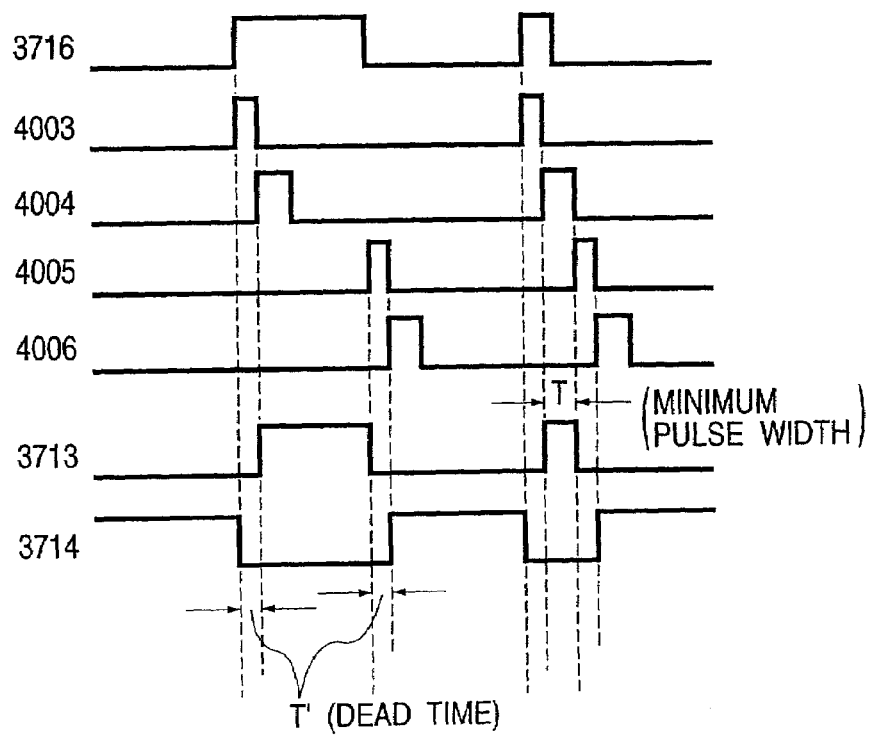
Figure 41A:
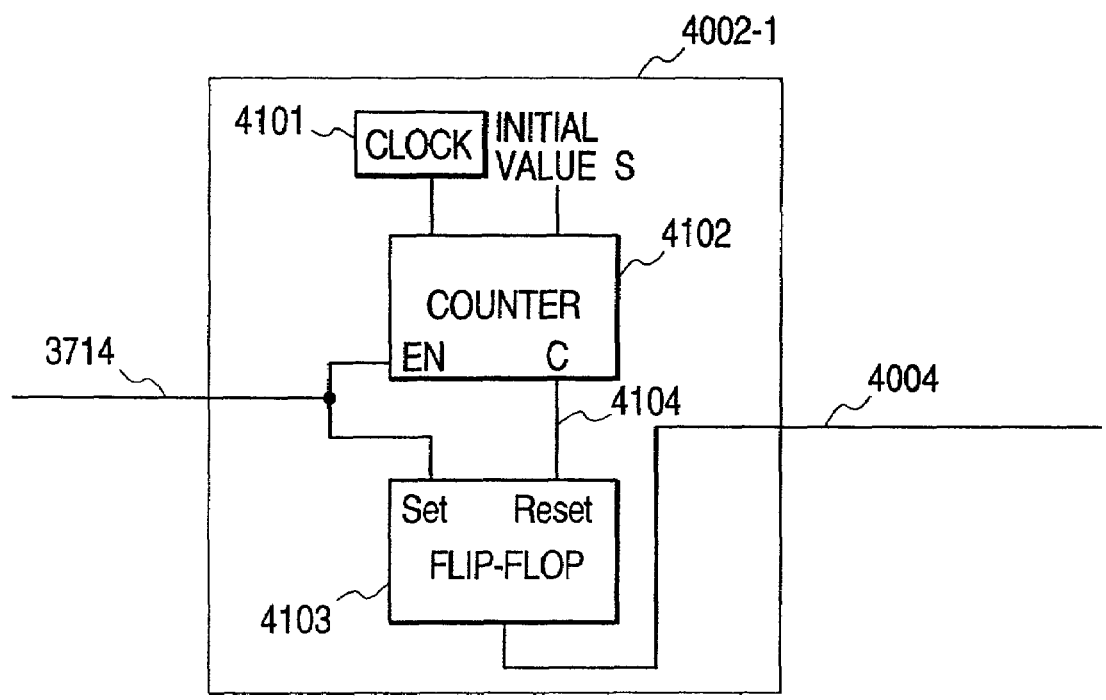
FIGS. 41(a) and 41(b) are block diagrams showing typical configurations of a falling-edge detecting circuit and a rising-edge detecting circuit employed in the pulse generating circuit shown in FIG. 40.
Figure 41B:
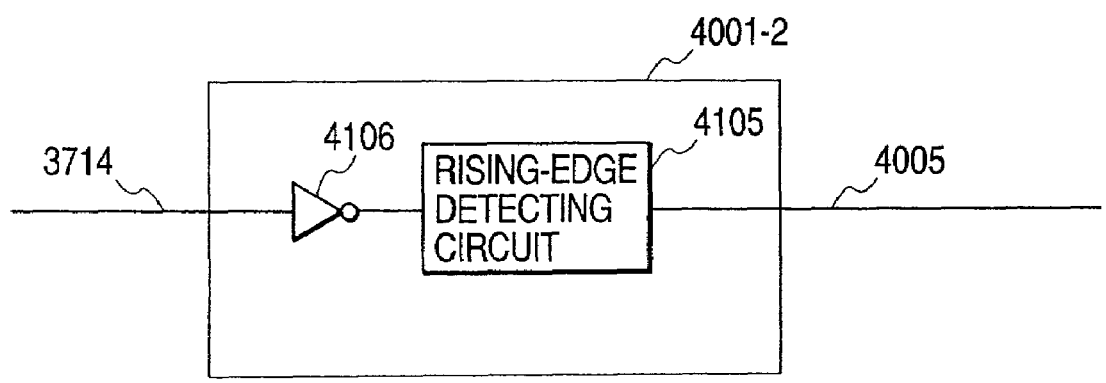

FIG. 41(*a*) is a block diagram showing an example of the configuration of the raising-edge detecting circuit 4002-1 employed in the pulse generating circuit 3703 shown in FIG. 40(*a*).

As shown in FIG. 41(*a*), the raising-edge detecting circuit 4002-1 comprises a clock-signal generating circuit 4101, a counter 4102, an RS flip-flop circuit 4103 and signal lines 3714, 4104 and 4004.

The signal line 3714 is connected to an enable pin EN of the counter 4102 and a set input pin SET of the RS flip-flop circuit 4103. A clock input pin of the counter 4102 is connected to an output pin of the clock-signal generating circuit 4101. The signal line 4104 is used for connecting a carry-signal output pin C of the counter 4102 to a reset input pin RESET of the RS flip-flop circuit 4103. An output pin Q of the RS flip-flop circuit 4103 is connected to the signal line 4004.

The raising-edge detecting circuit 4002-2 has the same configuration as the raising-edge detecting circuit 4002-1.

FIG. 41(*b*) is a block diagram showing an example of the configuration of the falling-edge detecting circuit 4001-2 employed in the pulse generating circuit 3703 shown in FIG. 40(*a*).

As shown in FIG. 41(*b*), the falling-edge detecting circuit 4001-2 comprises an inverter (NOT gate) 4106, the input pin of which is connected to the signal line 3714, and a raising-edge detecting circuit 4105 connected to the output pin of the NOT gate 4106.

The raising-edge detecting circuit 4105 has the same configuration as the raising-edge detecting circuit 4002-1.

The falling-edge detecting circuit 4001-1 has the same configuration as the falling-edge detecting circuit 4001-2.

Before explaining the overall operation of the pulse generating circuit 3703, the operations of the raising-edge detecting circuit 4002-1 shown in FIG. 41(*a*) and the falling-edge detecting circuit 4001-2 shown in FIG. 41(*b*) are explained by referring to timing charts shown in FIGS. 42(*a*) and 42(*b*) respectively.

When the signal on the signal line 3714 rises as shown in FIG. 42(*a*), the enable pin EN of the counter 4102 employed in the rising-edge detecting circuit 4002-1 is raised to a logic level "H". With the enable pin EN raised to the logic level "H", an initial value S set in a pin 2808 is loaded into the counter 4102 and the counter 4102 starts a counting operation synchronized with a clock signal input from the clock-signal generating circuit 4101.

Figure 42A:
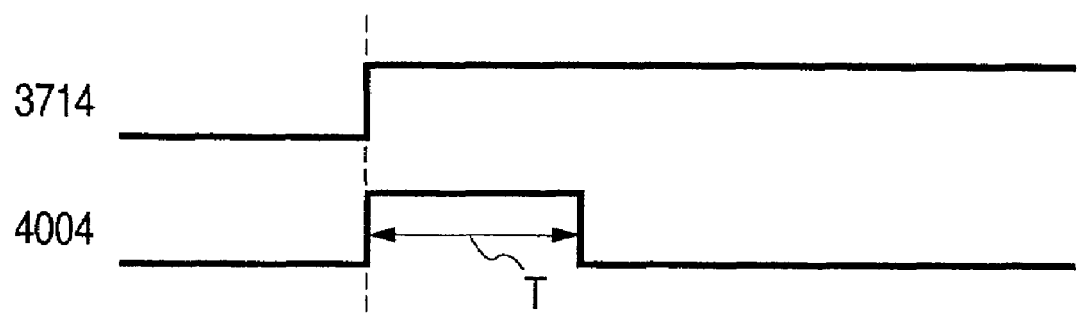
FIGS. 42(a) and 42(b) are timing charts used for explaining the operations of the falling-edge detecting circuit and the rising-edge detecting circuit shown in FIG. 41.

The signal on the signal line 3714 is also supplied to the set input pin SET of the RS flip-flop circuit 4103. Thus, when a signal on the signal line 3714 rises, the RS flip-flop circuit 4103 is set, raising the output pin Q to the logic level "H". In the mean time, the counter 4102 is counting up. As a period of time T lapses since the start of the counting operation, a carry signal is output by the counter 4102 from the carry-signal output pin C to the reset input pin RESET of the RS flip-flop circuit 4103 through the signal line 4104. The period of time T is determined by the initial value S and the frequency of the clock signal driving the counter 4102. That is to say, the carry signal is generated after the counter 4102 counts up till the initial value S. The carry signal resets the RS flip-flop circuit 4103, bringing the signal on the output pin Q to the low logic level. As a result, the signal line 4004 connected to the output pin Q of the RS flip-flop circuit 4103 rises on the rising edge of the signal on the signal line 3714 and falls down back after the period of time T lapses as shown in FIG. 42(a).

Figure 42B:
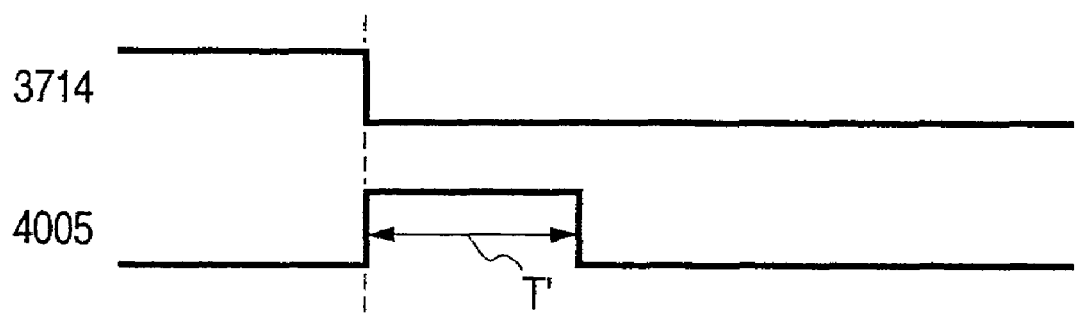

Next, the operation of the falling-edge detecting circuit 4001-2 is explained by referring to the timing chart shown in FIG. 42(b). When the signal on the signal line 3714 falls down, the signal output by the NOT gate 4106 rises to the logic level "H". The rising-edge detecting circuit 4105 operates in the same way as the rising-edge detecting circuit 4002-1. As a result, the signal line 4005 output by the rising-edge detecting circuit 4105 rises on the falling edge of the signal on the signal line 3714 and falls down back after the period of time T' lapses as shown in FIG. 42(b).

The falling-edge detecting circuit 4001-1 and the rising-edge detecting circuit 4002-2 operate in the same way as the falling-edge detecting circuit 4001-2 and the rising-edge detecting circuit 4002-1 respectively.

Next, the overall operation of the pulse generating circuit 3703 is explained by referring to the timing charts shown in FIG. 40(b). The timing charts of FIG. 40(b) show waveforms of signals appearing at a variety of points in the pulse generating circuit 3703. A number appended on the left end of each timing chart is a reference numeral denoting a signal line conveying a signal, the waveform of which is represented by the timing chart.

Assume that, at the present time, the n GTO devices 3709-1 to 3709-n of each of the P-side arms 3720-1 to 3720-n are all in an off state while the n GTO devices 3709-1 to 3709-n of each of the N-side arms 3721-1 to 3721-n are all in an on state. That is to say, the P-side pulse signal on the signal line 3713 is reset at the logic level "L" while the N-side pulse signal on the signal line 3714 is reset at the logic level "H". In this state, let the pulse signal on the signal line 3716 supplied to the pulse generating circuit 3703 rise to the logic level "H". In this case, the signal output by the NOT gate 4007 falls down to the logic level "L" and, hence, the signal output by the AND gate 4010 also falls down to the logic level "H" as well. At that time, the signal output by the rising-edge detecting circuit 4002-2, that is, the signal on a signal line 4006, has fallen down to the logic level "L". As a result, the signal output by the OR gate 4011, that is, the signal on a signal line 3714, falls down to the logic level If the signal output by the rising-edge detecting circuit 4002-2 has not fallen down from the logic level "H", the signal on a signal line 3714 does not fall down to the logic level "L", being sustained at the logic level "H". Also in this case, since the signal output by the rising-edge detecting circuit 4002-2 is connected to an inverting input pin of the 3-input AND gate 4008, the signal output by the AND gate 4008 is sustained at the logic level "L" because the signal output by the rising-edge detecting circuit 4002-2 has not fallen down from the logic level "H" even if the signal on the signal line 3716 rises to the logic level "H". As a result, the signal output by the AND gate 4008, that is, the signal on a signal line 3713, does not change, being sustained at the logic level "L". That is to say, if the signal on the signal line 3716 rises to the logic signal "HI, before the signal output by the rising-edge detecting circuit 4002-2 falls down from the logic level "H", the pulse signals on both the signal lines 3713 and 3714 remain unchanged from their present levels.

In this case, it is assumed that the signal on the signal line 3716 rises to the logic signal "H" after the signal output by the rising-edge detecting circuit 4002-2 has fallen down from the logic level "H". As described above, the signal on the signal line 3714 falls down to the logic level "L". Detecting the falling of the signal on the signal line 3714, the falling-edge detecting circuit 4001-1 outputs a pulse signal with a duration T' on the signal line 4003 as shown in FIG. 40(b). This pulse signal is applied to an inverting input pin of the AND gate 4008, sustaining the signal output by the AND gate 4008 at the logic level "L" during the period of time TV without regard to the fact that the signal on the signal line 3716 has risen to the logic level "H". As a result, the signal on the signal line 3713 is also sustained at the logic level "L" during the period of time T'. As the period of time T' lapses, the signal output by the falling-edge detecting circuit 4001-1 falls to the logic level "L". As assumed above, the signal output by the rising-edge detecting circuit 4002-2 also has fallen down from the logic level "H". Thus, the signal output by the AND gate 4008 rises to the logic level "H". As a result, the signal on the signal line 3713 also rises to the logic level "H" as well. That is to say, the falling-edge detecting circuit 4001-1 has a function to delay the rising edge of the signal on the signal line 3713 by the period of time T' after the rising edge of the signal on the signal line 3716 to the logic level "H". This period of time T' is referred to a dead time. The dead time is a period of time during which the GTOs of the P-side arms 3720-1 to 3720-n and the GTOs of the N-side arms 3721-1 to 3721-n are not conductive simultaneously. By providing such a dead time, it is possible to avoid a short-circuit accident caused by a state in which the GTOs of the P-side arms 3720-1 to 3720-n and the GTOs of the N-side arms 3721-1 to 3721-n are conductive at the same time. It should be noted that the rising-edge detecting circuit 4002-1 detects a rising edge of the signal on the signal line 3713 and outputs a pulse signal on a signal line 4004 at the logic level "H" for a period of time T determined in advance.

Thereafter, when the signal on the signal line 3716 falls down to the low logic level, the signal output by the AND gate 4008 also falls to the logic level "L". If the signal on the signal line 3716 falls down to the low logic level after the pulse signal output by the rising-edge detecting circuit 4002-1 (that is, the signal on the signal line 4004) falls down, the signal on the signal line 3713 also falls down to the logic level "L". The falling of the signal on the signal line 3713 to the low logic level causes the falling-edge detecting circuit 4001-2 to output a pulse signal with a duration T' which, in turn, drives the AND gate 4010 to sustain its output at the logic level "L" for the period of time T'. At that time, the signal output by the rising-edge detecting circuit 4002-2 has also been being sustained at the logic level "L". Thus, the signal on the signal level 3714 is also sustained at the logic level "L". As the period of time T' lapses, the signal output by the falling-edge detecting circuit 4001-2 is inverted to the low logic level. At that time, the signal output by the AND gate 4010 is also inverted to the logic level "H", causing the signal on the signal line 3714 to be also inverted to the logic level "H". That is to say, the falling-edge detecting circuit 4001-2 has a function to delay the rising edge of the signal on the signal line 3714 by the period of time T' after the falling edge of the signal on the signal line 3817 to the logic level "L". This period of time T' is referred to a dead time. It should be noted that the rising-edge detecting circuit 4002-2 detects a rising edge of the signal on the signal line 3714 and outputs a pulse signal on a signal line 4006 at the logic level "H" for a period of time T determined in advance.

If the signal on the signal line 3716 falls down to the low logic level before the pulse signal output by the rising-edge detecting circuit 4002-1 falls down, that is, if the duration of the pulse signal on the signal line 3716 is too short, on the other hand, the signal on the signal line 3713 does not fall down to the low logic level, being sustained at the logic level "H" as shown by a waveform on the right-hand side of FIG. 40(*b*).

In addition, since the signal output by the rising-edge detecting circuit 4002-1 is at the logic level H", the signal output by the AND gate 4010 is sustained at the logic level "L" in spite of the fact that the signal output by the NOT gate 4007 has been inverted to the logic level "H". Since the signal output by the rising-edge detecting circuit 4002-2 is at the logic level "L", on the other hand, the signal on the signal line 3714 is also sustained at the logic level "L". That is to say, the pulse signals on both the signal lines 3713 and 3714 remain unchanged from their present levels.

In this case, when the signal output by the rising-edge detecting circuit 4002-1 falls down to the low logic level after the predetermined period of time T lapses, the signal on the signal line 3714 also falls down to the logic level "L" as well. On the other hand, when the signal on the signal line 3713 falls down to a low logic level, the falling-edge detecting circuit 4001-2 outputs a pulse signal with a duration T, determined in advance to the signal line 4005. As the period of time T' lapses, the signal output by the falling-edge detecting circuit 4001-2 is inverted to the low logic level. At that time, the signal output by the AND gate 4010 is also inverted to the logic level "H", causing the signal on the signal line 3714 to be also inverted to the logic level "H". That is to say, during the predetermined period of time T in which the pulse signal output by the rising-edge detecting circuit 4002-1 does not fall down to the low logic level, being sustained at the logic level "H", the signal on the signal line 3713 is sustained at the high logic level even if the signal on the signal line 3716 falls down. The period of time T is referred to as a minimum pulse width. The minimum pulse width is a minimum period of time during which the signal on the signal line 3713 or 3714 needs to be sustained at the logic level "H". According to a characteristic of a GTO, it takes the GTO a time to transit from an off state to an on state. If the duration of the gate pulse is shorter than the transition time, the GTO may be damaged. The minimum pulse width is assured in order to prevent the GTO from being damaged.

As described above, the falling-edge detecting circuits 4001-1 and 4001-2 each have a function for setting a dead time whereas the rising-edge detecting circuits 4002-1 and 4002-2 each have a function for setting a minimum pulse width.

Figure 43:
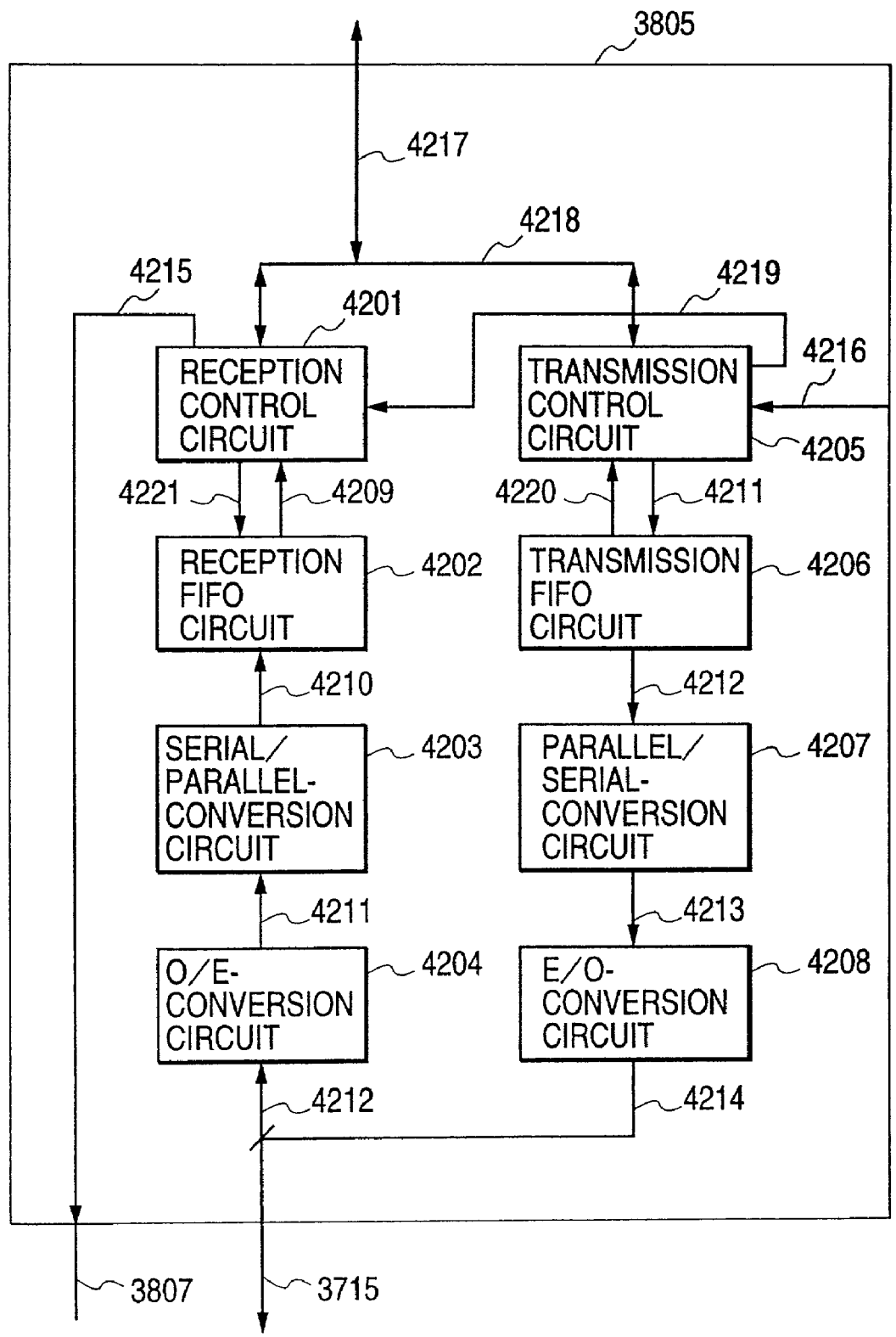
FIG. 43 is a block diagram showing a typical configuration of a serial interface circuit employed in the A/D converter shown in FIG. 38.

A block configuration of the serial I/F interface unit 3805 employed in the A/D converter 3701 shown in FIG. 38 is explained in concrete terms by referring to FIG. 43. As shown in FIG. 43, the I/F interface unit 3805 comprises a reception control circuit 4201, a reception FIFO (first-in-first-out) buffer 4202, a transmission FIFO (first-in-first-out) buffer 4206, a serial/parallel-conversion circuit 4203, an E/O (electro/optical)-conversion circuit 4204, a transmission control circuit 4205, a parallel/serial-conversion circuit 4207 and an O/E (opto/electrical)-conversion circuit 4208. The serial I/F interface 3904 employed in the control circuit 3702 shown in FIG. 39 has the same configuration as this serial I/F interface 3805. In the case of the serial I/F interface unit 3805 employed in the A/D converter 3701 shown in FIG. 38, the input signal line 4216 is connected to the logic level "L" which is not explicitly shown in FIG. 43. In the case of the serial I/F interface 3904 employed in the control circuit 3702 shown in FIG. 39, on the other hand, the output signal line 4215 is not used and a signal line 3908 is connected to the input signal line 4216.

The reception control circuit 4201 picks up information of a packet received from the reception FIFO circuit 4202 through a signal line 4209. If the received packet is an interrupt packet, the reception control circuit 4201 sustains the signal line 4215 at the logic level "H" for a fixed period of time. The reception control circuit 4201 also receives a set value for packet reception through a bus 4218 and a set value of the number of repeated transmissions from the transmission control circuit 4205 through a signal line 4219. The reception control circuit 4201 outputs a busy-reception-control-circuit signal indicating that the circuit 4201 is busy to the reception FIFO buffer 4202 through a signal line 4221. The reception FIFO buffer 4202 receives packets from the serial/parallel-conversion circuit 4203 through a signal line 4210, temporarily storing the packets in a buffer memory thereof. The packets are then output to the reception control circuit 4201 through the signal line 4209 on a FIFO (first-in-first-out) basis. While the busy-reception-control-circuit signal is being asserted on the signal line 4221, however, a packet to be output to the signal line 4209 is held in the buffer memory as it is. The serial/parallel-conversion circuit 4203 receives information of an incoming packet through a signal line 4211 as serial data, converting the serial data into parallel information which is then output to the reception FIFO buffer 4202 through a signal line 4210. The opto/electrical conversion circuit 4204 converts an optical s Signal received from an optical fiber 4212, converts the optical signal into an electrical signal and outputs the electrical signal to the serial/parallel-conversion circuit 4203 through the signal line 4211. The transmission control circuit 4205 outputs information of a transmission packet to the transmission FIFO buffer 4206 through a signal line 4211. While the transmission control circuit 4205 is receiving a full-transmission-FIFO-buffer signal indicating that the transmission FIFO buffer 4206 is full through a signal line 4220, information of a packet to be transmitted is held as it is to temporarily suspend the transmission. The transmission control circuit 4205 also receives an interrupt signal from the signal line 4216, generates an interrupt packet, outputs a set value of the number of repeated transmissions to the reception control circuit 4201 through the signal line 4219 and receives a set value for packet transmission through the bus 4218. The transmission FIFO buffer 4206 receives information of transmitted packets and temporarily stores the packets in a buffer memory thereof before outputting them to the parallel/serial-conversion circuit 4207 on a first-in-first-out basis through a signal line 4212. When the buffer memory becomes full, the transmission FIFO buffer 4206 outputs a full-transmission-FIFO-buffer signal to the transmission control circuit 4205 through the signal line 4220. The parallel/serial-conversion circuit 4207 receives information of a transmitted packet from the transmission FIFO buffer 4206 as parallel data through a signal line 4212, converting the parallel data into serial one which is then output to the electro/optical-conversion circuit 4208 through a signal line 4213. The electro/optical-conversion circuit 4208 receives the electrical serial signal from the parallel/serial-conversion circuit 4207 through the signal line 4213, converts the electrical signal into an optical signal and outputs the optical signal to an optical fiber 4214. It should be noted that an optical fiber 3715 comprises the optical fibers 4212 and 4214 which are bundled together.

Next, the operation of the parallel/serial-conversion circuit 4207 is explained by referring to timing charts shown in FIG. 46(a). In FIG. 46(a), notation DAT denotes parallel data prior to the conversion, notation VLD denotes a signal indicating that the parallel data DAT is valid, notation SCLK denotes a transmission clock signal and notation SDAT denotes transmitted data. As shown in FIG. 43, the data DAT and the signal VLD are supplied to the parallel/serial-conversion circuit 4207 from the signal line 4212 while the transmitted data SDAT is output from the circuit 4207 to the signal line 4213. FIG. 46(a) is a diagram showing an example in which 8-bit parallel data $0110_{13}$ 0010 is converted into serial data. The logic level "H" of the signal VLD indicates that the transmitted data is valid. When the signal VLD is set at the logic level "H", the transmitted data SDAT is also set at the logic level "H" for 1 period of the transmission clock signal SCLK as indicated by reference numeral 4501 in FIG. 46(a). Thereafter, the transmitted data SDAT is generated and output serially bit after bit in synchronization with the clock transmission signal SCLK in accordance with the parallel data '0110_0010' starting with the most significant bit.

Next, the operation of the serial/parallel-conversion circuit 4203 is explained by referring to timing charts shown in FIG. 46(b). In FIG. 46(b), notation RDAT denotes received data, notation RCLK denotes a clock signal for converting the received data RDAT, notation DAT denotes parallel data obtained as a result of the conversion and notation VLD is a signal indicating that the parallel data DAT is valid. The frequency of the clock signal RCLK is 4 times the frequency of the clock signal SCLK. Initially, the serial/parallel-conversion circuit 4203 is in an idle state. When the received data RDAT rises to the logic level "H" in the idle state at a point of time 4502, the serial/parallel-conversion circuit 4203 transits to a reception state. In the reception state, the received data is latched for every 4-cycle period of the clock signal RCLK for converting the received data starting at a point of time 4503. At a point of time 4504 at which received data of 8 bits has been latched, the serial/parallel-conversion circuit 4203 goes back to the idle state. At a point of time 4505, parallel data DAT is output and the signal VLD is set to the logic level "H" to indicate that the parallel data DAT is valid.

Figure 44:
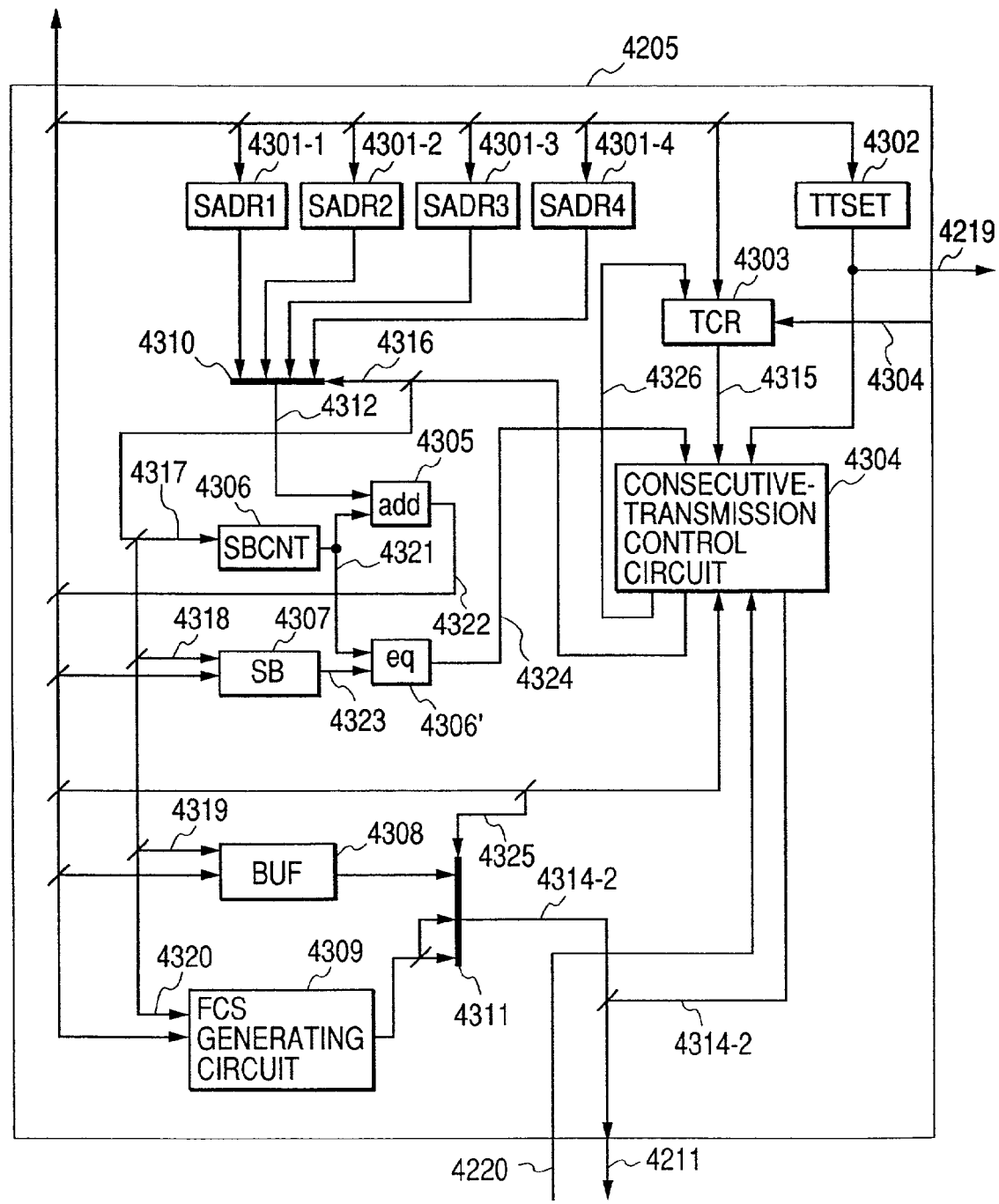
FIG. 44 is a block diagram showing a typical configuration of a transmission control circuit employed in the serial interface circuit shown in FIG. 43.

Next, the configuration of the transmission control circuit 4205 employed in the serial I/F unit 3805 shown in FIG. 43 is explained by referring to FIG. 44. In FIG. 44, reference numerals 4301-1 to 4301-4 each denote a transmission-start-address register and reference numeral 4302 denotes a repeated-transmission-count setting register. Reference numerals 4303 and 4304 are a transmission control register and a repeated-transmission control circuit respectively. Reference numeral 4305 denotes an adder and reference numeral 4306' is a comparator. Reference numerals 4306 and 4307 denote a transmitted-byte-count counter and a transmitted-byte-count holding register respectively. Reference numeral 4308 is a transmission buffer and reference numeral 4309 denotes a 16-bit FCS (frame check sequence) generating circuit. Reference numerals 4310 and 4311 each denote a selector. It should be noted that the transmission-start-address registers 4301-1 to 4301-4, the repeated-transmission-count setting register 4302 and the transmission control register 4303 can be accessed by the microcomputer 3804 in a read or write operation through a signal line 4222 shown in FIG. 43.

The transmission-start-address registers 4301-1 to 4301-4 are used for holding transmission start addresses of packets to be transmitted. In the repeated-transmission-count setting register 4302, the number of consecutive transmissions is set. The transmission control register 4303 is a 4-bit register comprising a first bit (Bit 1) to a fourth bit (Bit 4). When the rising edge of a signal on the signal line 4313 is detected, only the fourth bit is set to a logic value of 1.

The 4 bits of the transmission control register 4303, namely, Bit 4, Bit 3, Bit 2 and Bit 1, are associated with the transmission-start-address registers 4301-4, 4301-3, 4301-2 and 4301-1 respectively. When Bit 4, Bit 3, Bit 2 or Bit 1 of the transmission control register 4303 is set to a logic value of 1, the transmission-start-address register 4301-4, 4301-3, 4301-2 or 4301-1 associated bit the set bit is selected by the selector 4311 and a packet starting from the transmission start address in the selected transmission-start-address register is transmitted through the signal line 4211. If a plurality of bits of the transmission control register 4303 are set to a logic value of 1, only one of packets corresponding to the set bits with a highest priority is transmitted with a priority order determined by the following sequence: Bit 4, Bit 3, Bit 2 and Bit 1. When the transmission of a packet is completed, only the bit of the transmission control register 4303 corresponding to the transmitted packet is cleared by a control signal of the repeated-transmission control circuit 4304 through a control line 4326. The transmitted-byte-count counter 4306 clears or increments its data held thereby in accordance with a control signal output by the repeated-transmission control circuit 4304. Data is cleared when transmission of a packet is started while data is incremented when a full-transmission-FIFO-buffer signal is not received through the signal line 4220 during transmission of a packet. The transmitted-byte-count holding register 4307 is used for storing the number of bytes of a packet currently being transmitted. As the number of bytes in a packet, the transmitted-byte-count holding register 4307 latches the second byte of the packet being transmitted read out by the transmission control circuit 4205 from the RAM unit 3803 as instructed by a control signal received from the repeated-transmission control circuit 4304. It should be noted that the formats of packets are shown in FIG. 50 to be described later. The transmission buffer 4308 is used for storing data of a packet to be transmitted next. The frame-check-sequence generating circuit 4309 generates a frame check sequence required for coding the data currently being transmitted by using a CRC (cyclic redundancy code).

Next, the operation of the transmission control circuit 4205 is explained. The operation is exemplified in concrete terms by classifying origins activating an operation to transmit a packet into 2 categories, namely, the microcomputer 3804 and a raising edge of the signal on the signal line 4216.

The first activation, that is, activation of transmission of a packet by the microcomputer 3804, is explained by referring to FIG. 50(a). First of all, as preparation for transmission of a packet, it is necessary to lay out data of the packet to be transmitted as shown in FIG. 50(a) on a memory which is implemented by the RAM unit 3803 in the case of the A/D converter 3701 shown in FIG. 38 or the RAM unit 3903 in the case of the processing control circuit 3702 shown in FIG. 39. In the case of the example shown in FIG. 50(a), 6-byte data of a packet is laid out on the memory starting from address $0010. The first byte of the data indicates the type of the packet and the second byte is the size of the packet, that is, the number of bytes in the packet. The third to sixth bytes are user information. The start address $0010 of the data of the packet laid out on the memory minus 1 is stored in the transmission-start-address register 4301-1 by the microcomputer 3804 in a write operation. In the repeated-transmission-count setting register 4302, a value equal to (the number of transmissions-1) is stored by the microcomputer 3804. In this example, assume that the number of transmissions be 2. Accordingly, a value of 1 is stored in the repeated-transmission-count setting register 4302. Then, the microcomputer 3804 sets Bit 1 of the transmission control register 4303 to a logic value of 1. When the repeated-transmission control circuit 4304 receives a signal from the transmission control register 4303 through the signal line 4315, the state of a finite state machine (also known as a sequential circuit) employed in the repeated-transmission control circuit 4304 transits from an idle state to an in-transmission state, outputting a signal to select the transmission-start-address register 4301-1 to the selector 4310 through a signal line 4316. In addition, the finite state machine also outputs a reset signal to the transmitted-byte-count counter 4306 through a signal line 4317 and an initialization signal to the transmitted-byte-count holding register 4307 through a signal line 4318 to initialize the transmitted-byte-count holding register 4307 at an initial value of 2. Furthermore, the finite state machine also outputs an enable signal to the transmission buffer 4308 through a signal line 4319 and a reset signal to the FCS generating circuit 4309 through a signal line 4320. In addition, the adder 4305 adds the transmission start address received from the transmission-start-address register 4301-1 through the selector 4310 and a signal line 4312 to the number of transmitted bytes received from the transmitted-byte-count counter 4306 through a signal line 4321, outputting the sum to a signal line 4322. The signal on the signal line 4322 is supplied to the address signal line of a bus connected to the RAM unit 3803, causing the first byte of the packet stored in the RAM 3803 in a format shown in FIG. 50(a) to be output to a data line of the bus and latched into the transmission buffer 4308. The sequence number of the consecutive packet transmission is set in the bits of this 8-bit first byte denoted by reference numeral 4901 or 4902 in FIG. 50(a) by the repeated-transmission control circuit 4304 through a control line. In the case of the first packet of the consecutive transmission shown in FIG. 50(a), the bits 4901 indicate that the sequence number of the consecutive packet transmission is 00. In the case of the second packet of the consecutive transmission shown in FIG. 50(a), the bits 4902 indicate that the sequence number of the consecutive packet transmission is 01.

The comparator 4306' compares the number of already-transmitted bytes received from the transmitted-byte-count counter 4306 through a signal line 4321 with the total number of bytes in the packet received from the transmitted-byte-count holding register 4307 through a signal line 4323. When the former is found equal to the latter, the comparator 4306' sets a signal line 4324 to the logic level "H". When the transmission of the packet is started, the former is not equal to the latter. Thus, the comparator 4306' sets a signal line 4324 to the logic level "L". The selector 4311 receives a select signal from the repeated-transmission control circuit 4304 through a signal line 4325. When the transmission of the packet is started, the selector 4311 selects the transmission buffer 4308, outputting data stored in the buffer 4308 to a signal line 4314-1. In this way, the first byte of the packet stored in the transmission buffer 4308 is output by the selector 4311 to the signal line 4314-1 and, at the same time, a signal having a logic value of 1 is asserted by the repeated-transmission control circuit 4304 on a signal line 4314-2 to indicate that the data on the signal line 4314-1 is valid. At that time, if the full-transmission-buffer signal is not received from the signal line 4220, the repeated-transmission control circuit 4304 outputs an increment signal to the transmitted-byte-count counter 4306 to increment the contents thereof. The adder 4305 then computes the address of the second byte in the packet by using the incremented contents of transmitted-byte-count counter 4306, outputting the address to the bus. As the second byte is read out from the RAM unit 3803, the repeated-transmission control circuit 4304 outputs an enable signal to the transmitted-byte-count holding register 4307 through a signal line 4318 to latch the second byte into the transmitted-byte-count holding register 4307. Being data of the packet to be transmitted, the second byte is also stored in the transmission buffer 4308. In the example shown in FIG. 50(a), the number of bytes in the packet stored in the transmitted-byte-count holding register 4307 is 6 as indicated by the second byte of the packet. After the transmission of all bytes of the packet has been completed, the comparator 4306' detects the end of the packet, setting the signal line 4324 to the logic level "H". Detecting the logic level "H" of the signal line 4324, the finite state machine employed in the repeated-transmission control circuit 4304 transits from the in-transmission state to an FCS1 state in a clock cycle and then to an FCS2 state in another clock cycle. In the FCS1 state, the repeated-transmission control circuit 4304 outputs a control signal to the selector 4311 to select the upper-order 8 bits of the 16-bit FCS through the signal line 4325. In the following FCS2 state, on the other hand, the repeated-transmission control circuit 4304 outputs a control signal to the selector 4311 to select the lower-order 8 bits of the 16-bit FCS through the signal line 4325.

After the FCS has been transmitted, the sequence number of the repeated transmission of the same packet indicated by the bits 4901 or 4902 of the first byte of the packet shown in FIG. 50(a) is compared by the repeated-transmission control circuit 4304 with the contents of the repeated-transmission-count setting register 4302. If the former is found greater than the latter, the repeated-transmission control circuit 4304 returns to the idle state, transmitting a control signal to the transmission control register 4303 to clear the first bit thereof through a signal line 4326. If the consecutive transmissions have not been completed, that is, if the sequence number of the repeated transmission of the same packet is found equal to or smaller than the contents of the repeated-transmission-count setting register 4302, on the other hand, the repeated-transmission control circuit 4304 transmits a reset signal to the repeated-transmission-count counter 4306 through the signal line 4317 to clear the contents thereof, going back to the in-transmission state. In this state, the next transmission of the same packet is carried out. It should be noted, however, that the sequence number of the repeated transmission indicated by the bits 4902 of the first byte of a packet shown in FIG. 50(a) is different from the sequence number of the repeated transmission indicated by the bits 4901 of the first byte of a packet transmitted in the immediately preceding transmission even though the second byte and the user-data bytes of the 2 packets are the same.

As described above, data of a packet is read out from a memory, that is, the RAM unit 3803, sequentially byte after byte and then transmitted to the transmission FIFO buffer 4206 through the signal line 4211 shown in FIG. 43 repeatedly. After all data of a packet has been read out, an FCS is output by the FCS generating circuit 4309 to the transmission FIFO buffer 4206 through the signal line 4211. If the transmission FIFO buffer 4206 outputs a full-FIFO-buffer signal to the transmission control circuit 4205 during the transmission of the data through the signal line 4220, however, the repeated-transmission control circuit 4304 temporarily halts its operation while the full-FIFO-buffer signal is being output.

Figure 45A:
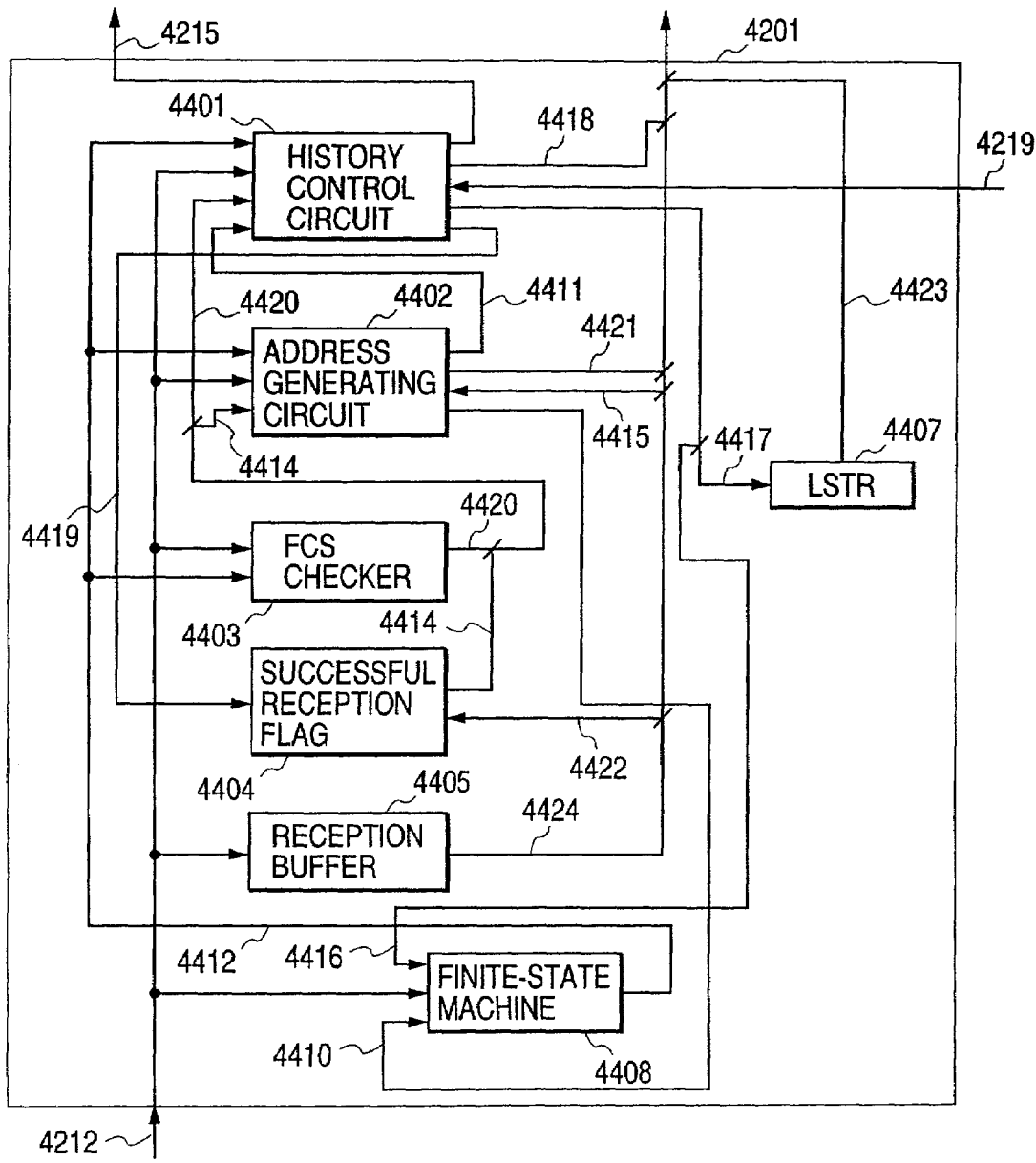
FIGS. 45(a) and 45(b) is a block diagram showing a typical configuration of a reception control circuit employed in the serial interface circuit shown in FIG. 43 and state transitions of a finite state machine employed in the reception control circuit.
Figure 45B:
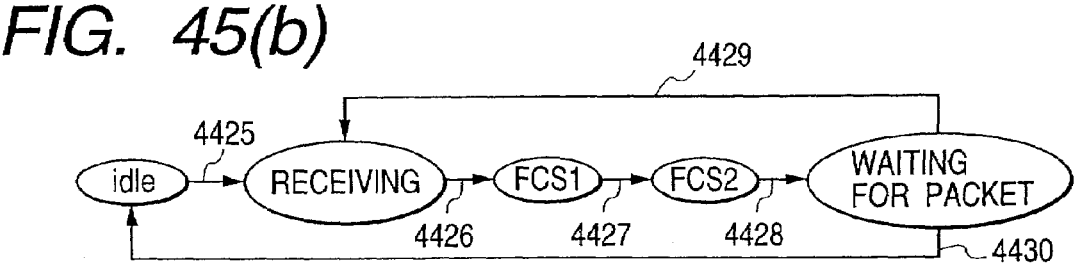

Next, the second activation, that is, activation of transmission of a packet by a raising edge of the signal on the signal line 4216 is explained by referring to FIG. 45(b). First of all, as preparation for transmission of a packet, it is necessary to lay out data of the packet to be transmitted as shown in FIG. 50(b) on the RAM unit 3803. The start address $0110 of the data of the packet in the RAM unit 3803 is stored by the microcomputer 3804 into the transmission-start-address register 4301-4 in a write operation. The repeated-transmission-count holding register 4307 is set in the same way as the data shown in FIG. 45(a). On the rising edge of the signal on the signal line 4216, the fourth bit of the transmission control register 4303 is set. This bit is associated with the transmission-start-address register 4301-4. Operations carried out thereafter are the same as the data shown in FIG. 45(a).

Next, the repeated-transmission control circuit 4304 is explained by referring to FIG. 47.

Figure 47A:
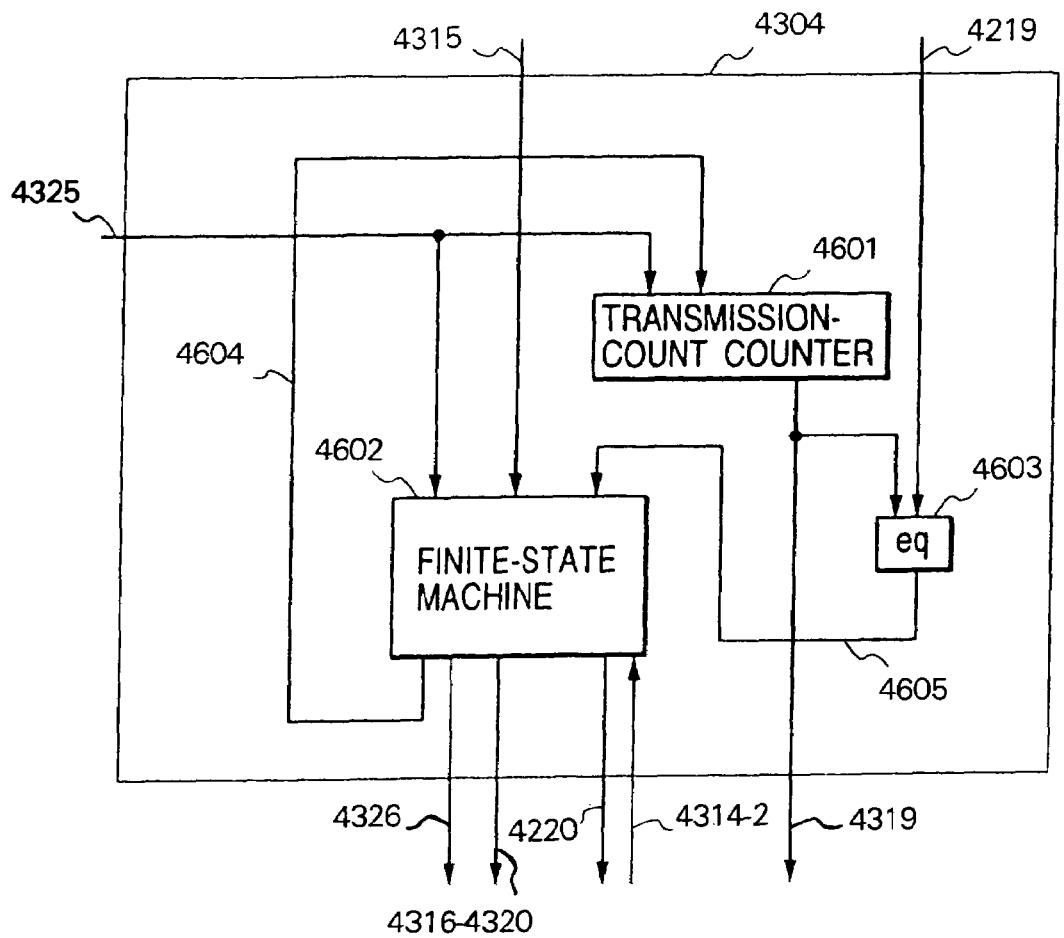
FIGS. 47(a) and 47(b) are block diagrams showing a typical configuration of a repeated-transmission control circuit employed in the transmission control circuit shown in FIG. 44 and state transitions of a finite state machine employed in the repeated-transmission control circuit.

FIG. 47(a) is a block diagram showing the configuration of the repeated-transmission control circuit 4304. In the figure, reference numeral 4601 denotes a transmission-count counter and reference numeral 4602 denotes a finite state machine. Reference numeral 4603 is a comparator.

Figure 47B:
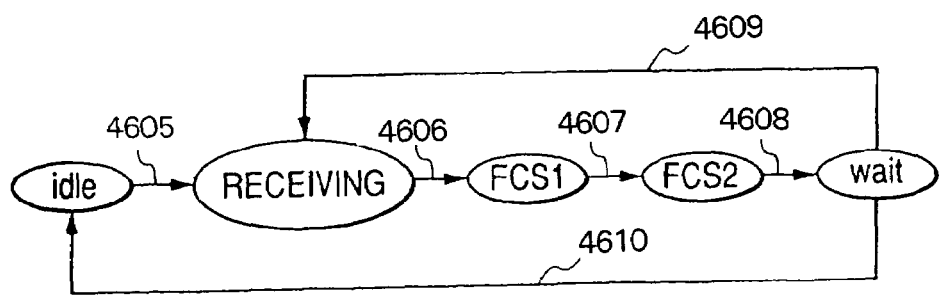

FIG. 47(b) is a diagram showing state transitions representing behaviors displayed by the finite state machine 4602.

In the configuration shown in FIG. 47(a), the transmission-count counter 4601 increments the count value thereof, that is, the number of transmissions, when a transmission-end signal is received from a signal line 4324. The transmission-count counter 4601 clears the count value when a signal indicating completion of all consecutive transmissions of the same packet is received from a signal line 4604. The transmission-count counter 4601 outputs the count value indicating the sequence number of the repeated transmission to a signal line 4319. The comparator 4603 compares the count value received from the signal line 4319 with the contents of the repeated-transmission-count setting register 4302 received from a signal line 4219, setting a signal line 4605 to the logic level "H" if the former is found equal to the latter. The finite state machine 4602 receives signals from signal lines 4220, 4324, 4315 and 4605 and has states, the transitions of which are shown in FIG. 47(b). As shown in FIG. 47(b), a state transition 4605 from an idle state to an in-transmission state takes place at the start of transmission of a packet. A state transition 4606 from the in-transition state to an FCS1 state takes place at the end of transmission of user data in the packet. A state transition 4607 from the FCS1 state to an FCS2 state takes place at the end of transmission of an FCS1 byte. A state transition 4608 from the FCS2 state to a wait state takes place at the end of transmission of FCS2 byte. A state transition 4609 from the wait state back to the in-transmission state takes place at the start of the next transmission of a packet of the same type. A state transition 4610 from the wait state back to the idle state takes place when all consecutive transmissions of the same packet have been completed. The finite state machine 4602 outputs control signals to signal lines 4326, 4316 to 4320 and 4314-2.

The configuration of the reception control circuit 4201 employed in the serial I/F unit 3805 shown in FIG. 43 is explained in concrete terms by referring to a block diagram of FIG. 45. In FIG. 45, reference numerals 4401 and 4402 denote a history control circuit and an address generating circuit respectively. Reference numeral 4403 is an FCS (frame check sequence) inspecting circuit and reference numeral 4404 denotes a successful-reception flag register. Reference numerals 4405 and 4408 denote a reception buffer and a finite state machine respectively. Reference numeral 4407 is an error-log register. It should be noted that data can be read out from or written into in the successful-reception flag register 4404 and the error-log register 4407 by the microcomputer 3804 through the signal line 4217 shown in FIG. 43.

When a packet is received from a signal line 4212, the type and the size of the packet are held in the history control register 4401 according to control executed by the finite state machine 4408 through a signal line 4412. In addition, the history control register 4401 also receives the contents of the repeated-transmission-count setting register 4302 from a signal line 4219, outputs an interrupt signal to a signal line 4215, receives information on a CRC error from a signal line 4420, receives a write-disable signal from a signal line 4411, outputs error-log information to a signal line 4417, outputs a request for a memory write operation to the bus through a signal line 4418 and outputs a successful-reception flag set signal through a signal line 4419. The address generating circuit 4402 outputs the write-disable signal to the signal line 4411, outputs a memory write address and read data of reception address registers 4806 to 4808 to a signal line 4421, receives a request to read or write the reception-address registers 4806 to 4808 from a signal line 4415 and outputs a packet-reception-end signal to a signal line 4410. The FCS inspecting circuit 4403 receives information of a packet currently being received from a line 4212, a signal to reset the FCS inspecting circuit 4403 from the signal line 4412 and outputs information on a CRC error to a signal line 4420. The successful-reception flag 4404 comprises 3 bits associated with the reception-address registers 4817 to 4819 respectively. The bit associated with a data packet successfully received this time is set to a logic value of 1 through the signal line 4419. When the microcomputer 3804 detects a set bit or a plurality of set bits in the successful-reception flag 4404, the microcomputer 3804 carries out processing using a data packet corresponding to the set bit and clears the bit to allow a next data packet of the same type to be received. A data packet of the same type which arrives before the bit corresponding to the data packet is cleared causes an overrun error on the data packet. The successful-reception flag 4404 can be only read or reset by the microcomputer 3804 shown in FIG. 38 or the microcomputer 3901 shown in FIG. 39 through a signal line 4422. The reception buffer 4405 is a buffer for latching 1 byte of packet data received from a signal line 4212 and outputting the latched information to a signal line 4424. The finite state machine 4408 experiences state transitions shown in FIG. 45(b). As shown in the figure, there are 5 possible states, namely, an idle state, an in-reception state, an FCS1 state, an FCS2 state and a packet waiting state. A state transition 4425 from the idle state to the in-reception state takes place at the start of reception of a packet. A state transition 4426 from the in-transition state to the FCS1 state takes place at the end of reception of user data in the packet. A state transition 4427 from the FCS1 state to the FCS2 state takes place at the end of reception of an FCS1 byte. A state transition 4428 from the FCS2 state to the packet waiting state takes place at the end of reception of FCS2 byte. A state transition 4429 from the packet waiting state back to the in-reception state takes place at the start of the next consecutive reception of a packet of the same type. A state transition 4430 from the packet waiting state back to the idle state takes place when all consecutive receptions of the packets of the same type have been completed, that is, reception of the last packet has been completed. The state transition 4430 also takes place when the packet waiting state has been lasting for a predetermined period of time in which case no next packet in the consecutive receptions is judged to arrive, that is, the packet received last is judged to be the last packet. For the state transition 4425 to take place, the input is received from a signal line 4212. For the state transition 4426 to take place, the input is received from a signal line 4410. For the state transition 4427 to take place, the input is received from the signal line 4212. For the state transition 4428 to take place, the input is received from the signal line 4212. For the state transition 4429 to take place, the input is received from a signal line 4416. The state transition 4430 takes place when the packet waiting state of the finite state machine 4408 has been lasting for a predetermined period of time during which no next packet is received from the signal line 4212.

Next, the operation of the finite state machine 4408 is explained by referring to state transitions shown in FIG. 45(*b*). The initial state of the finite state machine 4408 is the idle state. When valid data on the signal line 4212 is detected, the finite state machine 4408 transits from the idle state to the in-reception state. When a signal indicating completion of reception of a packet is received from the address generating circuit 4402 through the signal line 4410, the finite state machine 4408 transits from the in-reception state to the FCS1 state. When next data is received from the signal line 4212, the finite state machine 4408 transits from the FCS1 state to the FCS2 state. In the next cycle, the finite state machine 4408 transits from the FCS2 state to the packet waiting state. The finite state machine 4408 transits from the packet waiting state back to the idle state when a signal indicating the last packet in the consecutive reception is received from the signal line 4416. Otherwise, the finite state machine 4408 remains in the packet waiting state and transits back to the in-reception state at a point of time the next packet is received. However, the finite state machine 4408 transits from the packet waiting state back to the idle state when the packet waiting state has been lasting for 16 cycles during which no next packet is received.

Figure 48:
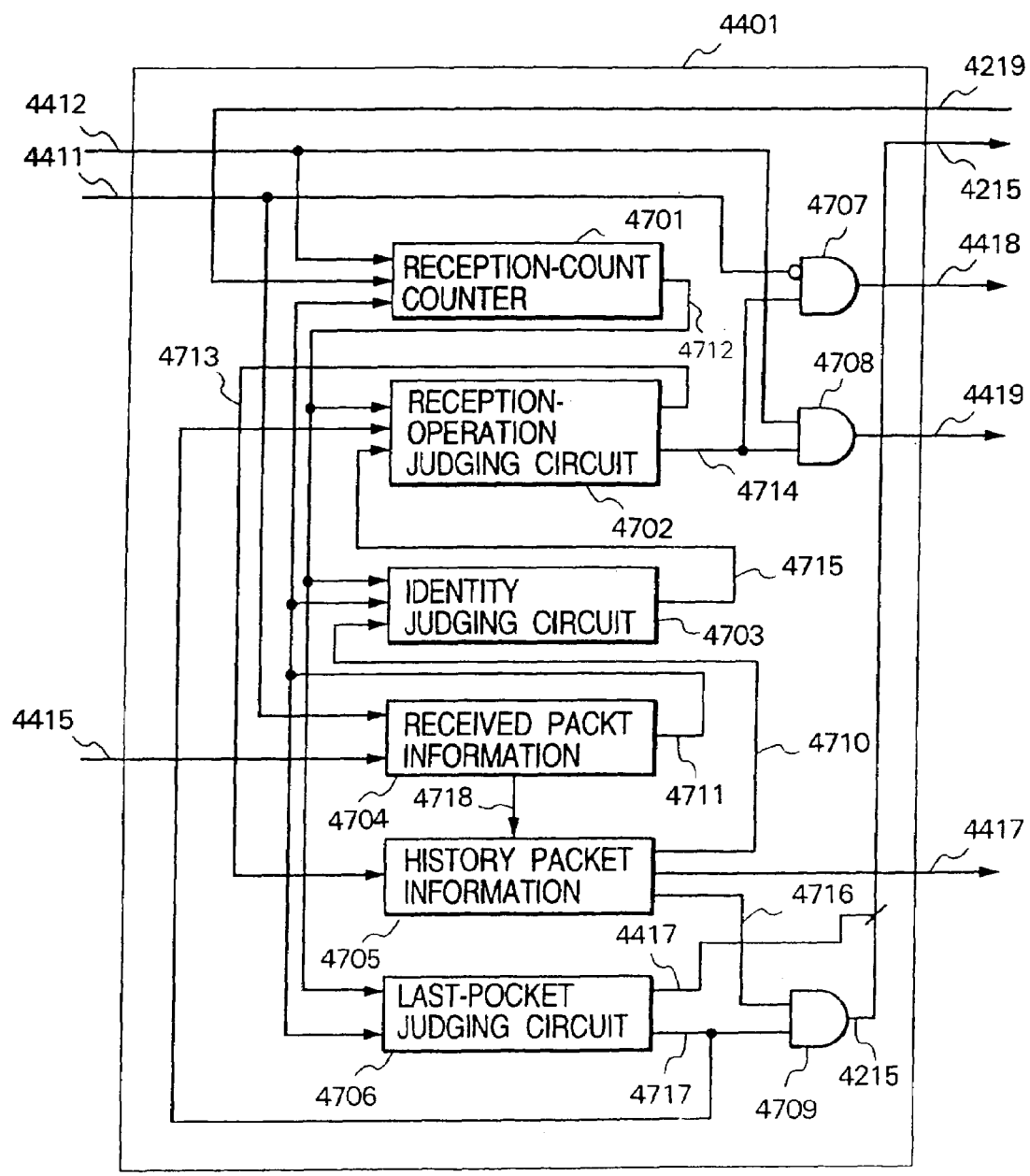
FIG. 48 is a block diagram showing a typical configuration of a history control circuit employed in the reception control circuit shown in FIG. 45.

Next, an example of the configuration of the history control circuit 4401 employed in the reception control circuit 4201 shown in FIG. 45 is explained by referring to FIG. 48.

In FIG. 48, reference numerals 4701 and 4702 denote a reception-count counter and a reception-operation judging circuit respectively. Reference numeral 4703 is an identity judging circuit and reference numeral 4704 denotes a received-packet-information register. Reference numerals 4705 and 4706 denote a history-packet-information circuit and a last-packet judging circuit respectively. Reference numerals 4707, 4708 and 4709 each denote an AND gate.

The reception-count counter 4701 receives the contents of a consecutive-reception-count setting register from a signal line 4219, receives information on a state from the finite state machine 4408 through a signal line 4412, receives information on the sequence number of the repeated transmission described in the first byte of a packet currently being received from a signal line 4711 and outputs the count value thereof to a signal line 4712. The reception-operation judging circuit 4702 receives the count value from the reception-count counter 4701 through the signal line 4712, receives a signal indicating the last reception from the last-packet judging circuit 4706 through a signal line 4717, receives packet-identity judging information from the identity judging circuit 4703 through a signal line 4715, outputs a history-update control signal to the history packet information register 4705 through a signal line 4713 and outputs a reception-operation-enable signal to a signal line 4714. The identity judging circuit 4703 receives the count value from the reception-count counter 4701 through the signal line 4712, receives the type of a packet currently being received and the sequence number of the repeated transmission described in the first byte of the packet from a signal line 4711 and receives information on the type of a history packet received in the past from a signal line 4710. The received-packet-information register 4704 receives information on an overrun error of received data from a signal line 4411, receives information on a CRC error from a signal line 4415, outputs information on an error detected in the type of a packet currently being received or the sequence number of the repeated transmission described in the first byte of the packet to the signal line 4711 and outputs information on an error and the type of the packet to a signal line 4718. The history-packet-information register 4705 receives a history-update control signal from the reception-operation judging circuit 4702 through the signal line 4713, outputs information on the type of a history packet to a signal line 4710, outputs error-log information to a signal line 4417 and outputs information indicating a successful reception history of an interrupt packet to a signal line 4716. The last-packet judging circuit 4706 receives the count value of the reception-count counter 4701 through the signal line 4712 and information on the sequence number of the repeated transmission described in the first byte of a packet currently being received from the signal line 4711. The AND gate 4707 outputs a write request based on inputs received from the signal lines 4411 and 4714 to the RAM unit 3803 through a signal line 4418. The AND gate 4708 outputs a signal to set the successful-reception flag 4404 based on inputs received from the signal lines 4412 and 4714 to a signal line 4414. The AND gate 4709 generates an interrupt signal based on inputs received from the signal lines 4716 and 4717, outputting a signal setting a signal line 4415 at the logic level "H" for a fixed period of time.

The reception-operation judging circuit 4702, the identity judging circuit 4703, the received-packet-information register 4704, the history-packet-information register 4705 and the last-packet judging register 4706 employed in the history control circuit 4401 shown in FIG. 48 are described more by referring to a descriptive summary shown in FIG. 51.

FIG. 51(*a*) describes conditions for the reception-operation judging circuit 4702 to output a request for a memory write, a request to set the successful-reception flag 4404, an error-log request and an interrupt signal to a signal line 4215.

FIG. 51(*b*) describes conditions for the identity judging circuit 4703 to judge a packet currently being received to be identical with a packet recorded in the history-packet-information register 4705.

FIG. 51(*c*) describes the configuration of the received-packet-information register 4704. If both a CRC error and a reception-buffer overrun error are detected during reception of a packet, the record of the CRC error is left in the received-packet-information register 4704.

FIG. 51(*d*) describes the configuration of the history-packet-information register 4705. Assume that the history-packet-information register 4705 receives information on an error from a signal line 4718. In this case, if information on a CRC error already exists in the history-packet-information register 4705 and the information on an error received from a signal line 4718 indicates an overrun error of received data, the history-packet-information register 4705 newly holds the information on the overrun error of received data. If a record of an overrun error of received data already exists, on the other hand, the history-packet-information register 4705 holds the record of the overrun error of received data as it is when the history-packet-information register 4705 receives information on a CRC error from a signal line 4718. The history-packet-information register 4705 is only 4 bits wide. In the conventional power-conversion control apparatus, on the other hand, a large memory area is required for recording the whole packet or a large portion of a packet including user data as history information. It is thus obvious that, by virtue of the present invention, control of history information can be implemented by using only a small amount of hardware.

FIG. 51(*e*) describes conditions for the last-packet judging circuit 4706 to judge a packet currently being received to be the last one.

Figure 49:
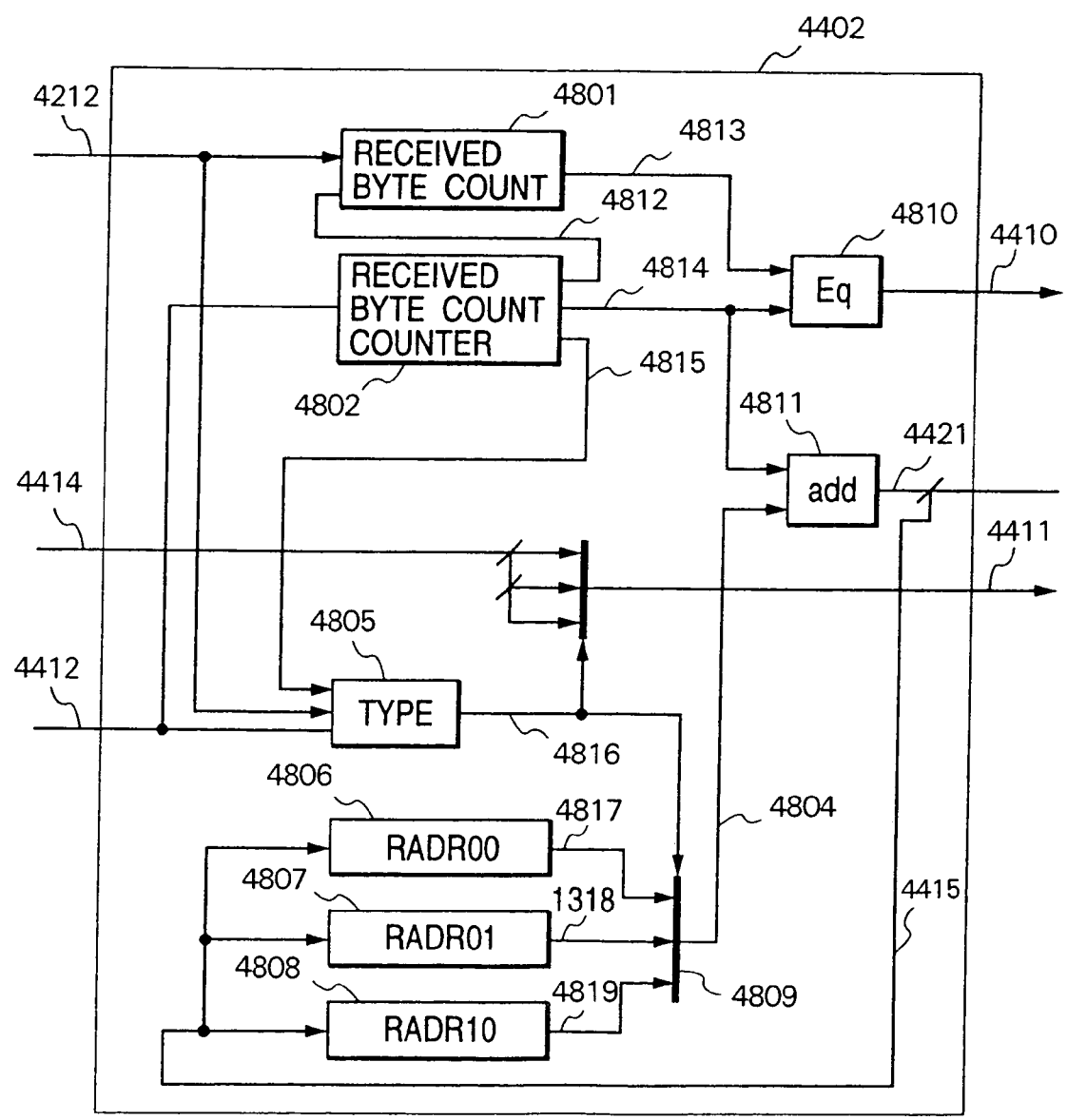
FIG. 49 is a block diagram showing a typical configuration of an address generating circuit employed in the reception control circuit shown in FIG. 45.

FIG. 49 is a block diagram showing an example of the configuration of the address generating circuit 4402 employed in the reception control circuit 4201 shown in FIG. 45(*a*).

In FIG. 49, reference numerals 4801 and 4802 denote a received-byte-count setting register and a received-byte-count counter respectively. Reference numeral 4803 is a selector and reference numeral 4810 denotes a comparator. Reference numeral 4805 is a type register used for storing the type of a packet currently being received and reference numerals 4806, 4807 and 4808 denote reception-address registers corresponding to types '00' '01' and '10' respectively. Data of a packet currently being received is written into the RAM unit 3803 at an address stored in one of the reception-address registers 4806 to 4808. Reference numeral 4811 is an adder.

The received-byte-count setting register 4801 is used for latching the size of a packet currently being received, that is, the number of bytes in the packet, as requested by a command given to the register 4801 through a signal line 4812. The size of a packet which is described in the second byte of the packet is received from a signal line 4212. The received-byte-count counter 4802 receives information indicating the in-reception state of the finite state machine 4408 from a signal line 4412, incrementing its count value during the in-reception state. When the finite state machine 4408 transits from the FCS2 state to the packet waiting state, the count value of the received-byte count counter 4802 is reset to 0. The selector 4803 receives 3 bits of the successful-reception flag 4404 from a signal line 4414, selecting one of the bits in accordance with a select signal received from a signal line 4816. The selected bit is passed on to a signal line 4411. An output of the selector 4803 set to a logic value of 1 indicates that the bit of the successful-reception flag 4404 corresponding to a packet received in the current reception has the logic value of 1, that is, a circumstance wherein, since the processing carried out by the microcomputer 3804 on data received in the immediately preceding reception has not been completed yet, if the packet received in the current reception is stored in the RAM unit 3803 right away, the data of the packet received in the immediately preceding reception will be lost. Such a circumstance is detected as an overrun error of received data and indicated by assertion of a signal on the signal line 4411.

The type register 4805 is used for latching data of the first byte of a packet received from a signal line 4212 and holding the type of the packet described in the byte as instructed by control signals received from signal lines 4412 and 4815. The type of the packet is output to the selectors 4803 and 4809 through a signal line 4816. The reception-addresses registers 4806, 4807 and 4808 are associated with types 00, 01 and 10 of a data packet respectively as described above. When a packet of a certain type is received, the selector 4809 selects one of the reception-addresses registers 4806, 4807 and 4808 that is associated with the type of the received packet in accordance with the type signal output by the type register 4805 through the signal line 4816, passing on a reception address stored in the selected reception-addresses register 4806, 4807 or 4808 to a signal line 4804. In addition, reception addresses stored in the reception-addresses registers 4806, 4807 and 4808 can be read out or changed by the microcomputer 3804 employed in the A/D converter 3701 shown in FIG. 38 through a signal line 4415. The comparator 4810 compares an input signal received from a signal line 4813 with an input signal received from a signal line 4814 and outputs a signal with the logic level "H" to a signal line 4410 if the input signals match each other, indicating that reception of 1 packet has been completed. The adder 4811 adds an input signal received from a signal line 4814 to an input signal received from a signal line 4804 and outputs a signal indicating an address, at which a byte of a packet being received is to be stored in the RAM unit 3803, to a signal line 4421.

Next, operations to receive a data packet and an interrupt packet are explained by referring to packet structures shown in FIGS. 50(*a*) and 50(*b*) respectively.

FIG. 50(*a*) is diagrams each showing the structure of a data packet. When the first byte of a data packet is received, the finite state machine 4408 enters an in-reception state in which the reception buffer 4405 holds the first byte, the FCS checker 4403 starts FCS processing, the address generating circuit 4402 selects one of the reception-addresses registers 4806, 4807 and 4808 that is associated with the type of the received packet described in the 2 most significant bits of the first byte and the byte is written into the RAM unit 3803 at the address stored in advance in the selected reception-addresses register 4806, 4807 or 4808. In the case of the example of the packet type with type '00' as shown in FIG. 50(*a*), the reception-addresses register 4806 associated with the type is selected. In addition, a value determined in advance is stored in the repeated-transmission-count setting register 4302 employed in the transmission control circuit 4205.

In the reception control circuit 4201, on the other hand, the received-byte-count setting register 4801 is used for latching the size of a packet currently being received, that is, the number of bytes in the packet. The size of the packet is described in the second byte of the packet. In the case of the example shown in FIG. 50(*a*), the size of the packet is 6 bytes. The address generating circuit 4402 generates an address at which the second byte of the packet is to be stored in the RAM unit 3803. Thereafter, after the third to sixth bytes of the packet have been received and stored into the RAM unit 3803 one byte after another, the finite state machine 4408 transits from the in-reception state to an FCS1 state, halting the operation carried out by the address generating circuit 4402 to write data into the RAM unit 3803. When a next byte, that is the seventh byte or the FCS1 byte of the packet, is received in the FCS1 state, the finite state machine 4408 transits from the FCS1 state to an FCS2 state. When a next byte, that is the eighth byte or the FCS2 byte of the packet, is received in the FCS2 state, the finite state machine 4408 transits from the FCS2 state to a packet waiting state in which the FCS checker 4403 terminates the FCS processing. A result of the FCS processing is output by the FCS checker 4403 to a signal line 4420. When an overrun error or a CRC error of the received data was detected prior to the current reception, information on the error was recorded in the received-packet-information register 4704 employed in the history control circuit 4401. When the finite state machine 4408 transits from the FCS2 state to the packet waiting state, the information on an error recorded in the received-packet-information register 4704 is used for updating information on an error stored in the history-packet-information register 4705. If the identity judging circuit 4703 judges the packet received in the current reception to have the same type as a packet received in the immediately preceding reception and the history-packet-information register 4705 indicates no error, however, the history-packet-information register 4705 is not updated. In the case of the first packet or the first transmission, there is no history information, making it necessary to always update the history-packet-information register 4705. If no error is detected in the received packet during this reception till the finite state machine 4408 transits from the FCS2 state to the packet waiting state, the finite state machine 4408 forcibly sets a value indicating the sequence number of the repeated transmission described in the first byte of the packet into the reception-count counter 4701 through a signal line 4711. If an error is detected, on the other hand, the reception-count counter 4701 increments its count value in accordance with pieces of information received from the signal lines 4711 and 4412. If the consecutive transmission of a packet is the last one, the reception-count counter 4701 clears its contents, putting the finite state machine 4408 in the idle state in which the history control circuit 4401 outputs error-log information to the error-log register 4407 by way of a signal line 4417.

An interrupt packet shown in FIG. 50(*b*) is received in the same way as the data packet shown in FIG. 50(*a*) except for the following 2 points. In the first place, since it is not necessary to store a received interrupt packet in the RAM unit 3803, a reception-address register is not selected and an operation to write the packet into the RAM unit 3803 is not carried out. In the second place, when an interrupt packet is received successfully, an interrupt signal is output from a signal line 4215. However, an interrupt signal is output from a signal line 4215 only if the last-packet judging circuit 4706 judges the received packet to be the last one. When the last interrupt packet is received, history information indicating type 11 for the interrupt packet and a no-error-detection record needs to be stored in the history-packet-information register 4705.

By accepting a packet only when the received packet is judged to be the last one as described above, it is possible to allow a more fatal error to be recorded and to prevent sampling timing from being shifted.

To put it more concretely, an error log is recorded in the error-log register (LSTR) 4407 only when packets including the last one are not received successfully at all. Thus, it is possible to keep the error-log register 4407 in an empty state for a period of time as long as possible. As a result, it is possible to allocate an area for recording a fatal error such an error generated in all consecutive transmissions of a packet of the same type and to record only such a fatal error.

In an operation to receive an interrupt packet, it is possible to prevent packet-period timing from being shifted. In the present embodiment, for example, an interrupt packet is used to inform the A/D converter 3701 of sampling timing. If sampling is not carried out at a fixed period in a control apparatus for periodically performing the same processing, it will be difficult to obtain a correct processing result. This is because an error of the sampling timing appears as an error of input data, that is, data to be sampled. A relation between the sampling timing and sample data is explained by referring to FIG. 52 as follows.

Figure 52:
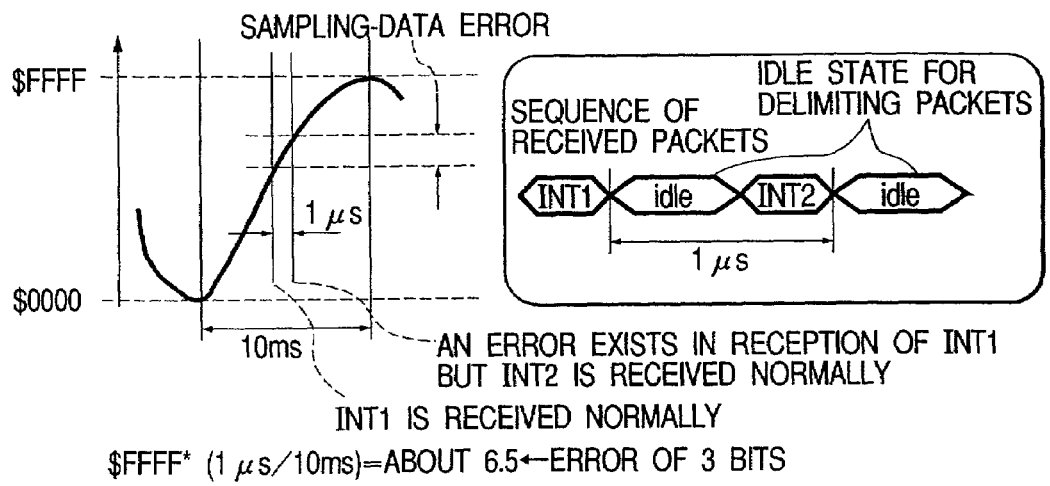
FIG. 52 is an explanatory diagram showing a timing discrepancy of detection of a position in transmission of a packet and a sampling error caused by the discrepancy.

When a waveform with a peak-to-peak distance of 10 ms shown in FIG. 52 is sampled by an A/D converter, an error of 1 microsecond occurring in timing to receive an interrupt packet appears as an error of the 3 least significant bits of 16-bit digital data obtained as a result of conversion. To put it more concretely, assume that previous sampling timing is detected as the first packet received in a repeated transmission and the current sampling timing is detected as the second packet received in a next transmission. In this case, the sampling interval is the sum of a transmission period of the packets and a period of time it takes to transmit a packet. The latter is the sum of an idle state and the length INT2 of the packet which prolongs the sampling interval, hence, resulting in a sampling shift.

The following is a description of processing using error-log information created as described above.

Error-log information is used for, among other purposes, determining whether an error is generated by a hard or soft failure and for forming a judgment as to whether an error is caused by a permanent or transient failure.

To put it concretely, for an analysis to determine whether an error is generated by a hard or soft failure, this embodiment detects 2 types of error, namely, a CRC error and a received-data overrun error. When a CRC error is generated, a failure occurring in hardware of the communication path is known to be the cause of the error. This is because a soft failure or a bug does not result in a CRC error. When a received-data overrun error is generated, on the other hand, a soft failure or a bug can be inferred as the cause of the error. This is because the overrun error is generated in spite of the fact that the packet itself is received normally.

As for the judgment as to whether an error is caused by a permanent or transient failure, typically, in an application executed by the microcomputer, an error log can be examined for each reception of a packet. If a result of the examination indicates that the same error is generated frequently, a permanent failure of hardware or a software bug can be determined to be the cause of the error. In this case, the error is handled by taking actions including a step to halt the system. If an error of a different type is generated, on the other hand, a transient failure such as introduction of noise into the communication path can be judged to be the cause of the error. In this case, the error is handled by taking actions including a step to restart the system.

In addition, errors are classified into some categories, each of which a priority level is assigned to. By doing so, more useful information can be recorded for use in analyses of causes of errors. In the case of this embodiment for example, information on errors caused by soft failures is recorded at a priority level higher than that assigned to information on errors caused by hard failures. To put it more concretely, if a CRC error is detected in a first reception and a received-data overrun error is detected in the second reception, for example, the received-data overrun error is left as a record in the error log.

By letting a soft failure take precedence of a failure occurring accidentally in the communication path according to such a policy to handle errors, work to fix a bug of software can be carried out effectively.

If information on errors detected in both the first and second receptions is to be recorded in error logs, 2 sets of registers are needed. In such a case, a higher degree of circuit complexity and a higher cost will be entailed in designing the control apparatus into a single chip. In this system, if the number of consecutive transmissions is set at 4, 4 sets of registers are required for error logging, increasing the amount of hardware and the complexity of the circuit to mention a few in comparison with the power-conversion control apparatus provided by the present invention.

As described above, by virtue of the present invention, it is no longer necessary to provide a memory for keeping the whole packet or user data received in the previous reception. As a result, the amount of hardware can be reduced.

In addition, repeated-transmission processing can be carried out without comparing the contents of a packet received in the previous reception with those of a packet currently being received. As a result, the amount of an overhead of the reception processing can be reduced.

Finally, the following is a description of a degradation control system capable of increasing the availability factor of a synchronous-multisystem control apparatus in the event of a synchronous-multisystem failure.

The description includes explanations of some preferred embodiments of the present invention with reference to accompanying diagrams.

The description begins with a fourth embodiment implementing a power converting apparatus with reference to FIGS. 53 to 60. In this embodiment, one of outputs of a synchronous-multisystem control apparatus is selected on the basis of information on operating states of control circuits composing the synchronous-multisystem controller and information on states of synchronization among the control circuits.

Figure 53:
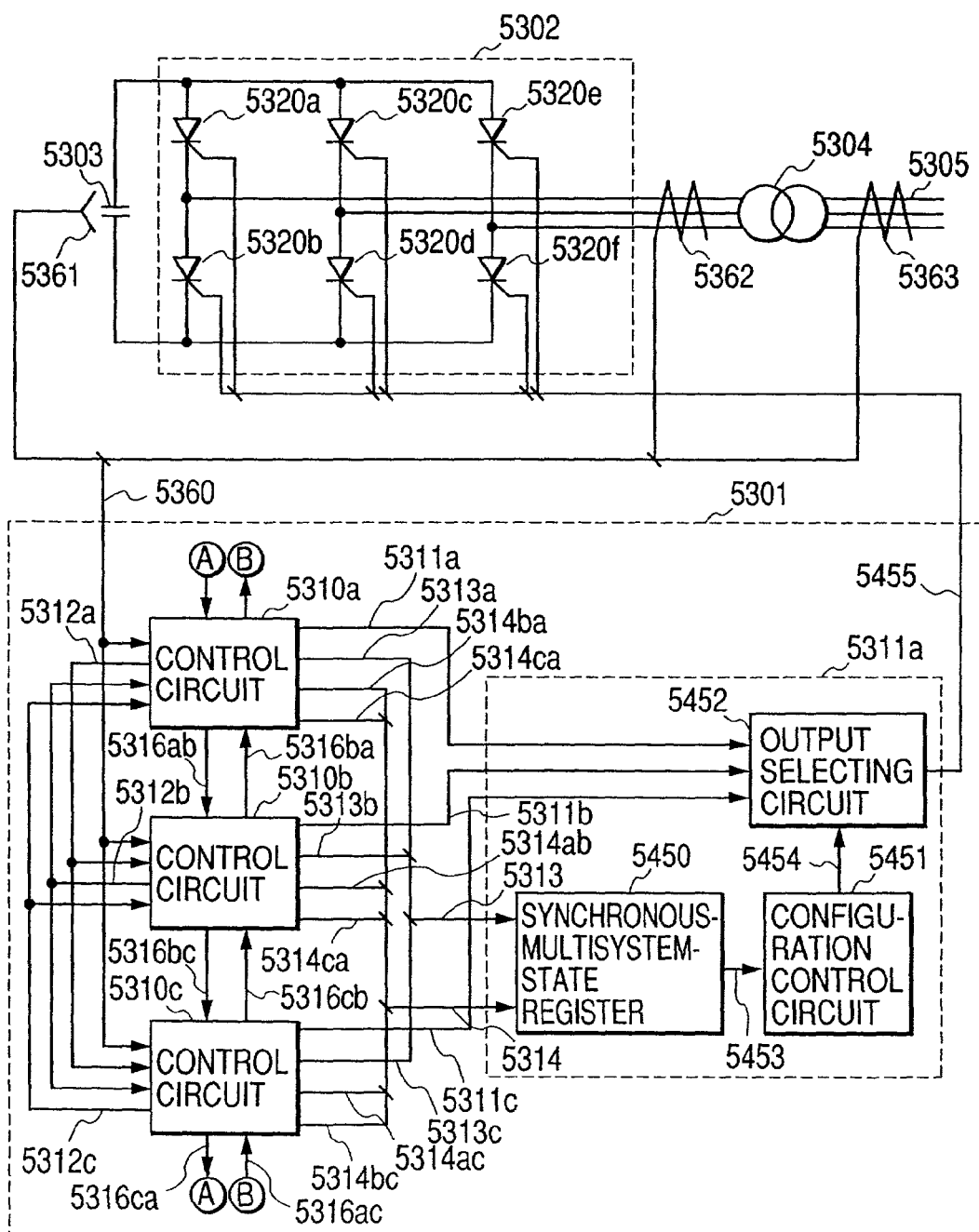
FIG. 53 is a block diagram showing a typical configuration of a power converting apparatus implemented by a fourth embodiment of the present invention.

The power converting apparatus shown in FIG. 53 comprises a direct-current power supply 5303 for supplying direct-current power, a power converter 5302 for converting the direct-current power into alternating-current power, a transformer 5304 for raising the voltage of the alternating-current power, a 3-phase 3-line power generating system 5305 for transmitting alternating-current power output by the transformer 5304, a sensor 5361 for detecting voltage and current values of the direct-current power supplied by the direct-current power supply 5303, a sensor 5362 for detecting voltage and current values of the alternating-current power output by the power converter 5302, a sensor 5363 for detecting voltage and current values of the alternating-current power supplied to the 3-phase 3-line power generating system 5305 and a synchronous-multisystem controller 5301 for controlling switching devices 5320a to 5320f employed in the power converter 5302.

The synchronous-multisystem controller 5301 comprises a plurality of systems implemented by control circuits 5310a, 5310b and 5310c for establishing synchronized control periods, and an output selector 5315 for selecting one of gate pulses output by the control circuits 5310a, 5310b and 5310c. The control circuits 5310a, 5310b and 5310c output period signals 5312a, 5312b and 5312c respectively which are exchanged among the control circuits 5310a, 5310b and 5310c in order to synchronize their identical operations to each other so as to allow the operations to be carried out for each control period determined in advance. The period signals 5312a, 5312b and 5312c indicate the start points of the control periods of the control circuits 5310a, 5310b and 5310c respectively. The control circuits 5310a, 5310b and 5310c also generate gate pulses 5311a, 5311b and 5311c respectively in each control period for turning the switching devices 5320a to 5320f employed in the power converter 5302. The generation of the gate pulses 5311a, 5311b and 5311c is based on information 60 on the power generating system including voltage and current values of the direct-current power of the direct-current power supply 5303 obtained from the sensor 5361, voltage and current values of the alternating-current power of the power converter 5302 obtained from the sensor 5362 and voltage and current values of the alternating-current power at the output of the transformer 5304 obtained from the sensor 5363. The control circuits 5310a, 5310b and 5310c are connected to each other by data transmission lines 5316ac, 5316ca, 5316ab, 5316ba, 5316bc and 5316cb.

The control circuits 5310a, 5310b and 5310c each exchange and compare data with each other in order to monitor operations of the other systems. The control circuits 5310a, 5310b and 5310c each monitor an internal data error and its own operating state on the basis of a result of the monitoring of an internal data error and a result of the comparison of data with those of the other systems. A result of the monitoring of its own operating state is output as an operating-state monitoring signal 5313. In addition, the control circuits 5310a, 5310b and 5310c each compare its own period signal with the period signals from the other systems in order to monitor a state of synchronization among the control circuits 5310a, 5310b and 5310c, outputting an intersystem-synchronization-state monitoring signal 5314.

The output selector 5315 comprises a synchronous-multisystem-state register 5450, a configuration control circuit 5451 and an output selecting circuit 5452.

The synchronous-multisystem-state register 5450 is used for storing values of the operating-state monitoring signal 5313 and the intersystem-synchronization-state monitoring signal 5314.

The configuration control circuit 5451 forms a judgment on the synchronous-multisystem configuration of the synchronous-multisystem controller 5301 based on information stored in the synchronous-multisystem-state register 5450.

The output selecting circuit 5452 selects one that is judged to be valid among the gate pulses 5311a, 5311b and 5311c output by the control circuits 5310a, 5310b and 5310c respectively in accordance with the result of the judgment formed by the configuration control circuit 5451 and outputs the selected one as a gate pulse 5455.

The power converter 5302 turns the switching devices 5320a to 5320f on or off according to the gate pulse 5455 output by the synchronous-multisystem controller 5301, converting the direct-current power supplied by the direct-current power supply 5303 into alternating-current power which is output to the 3-phase 3-line power generating system 5305 by way of the transformer 5304. As described above, the power converter 5302 comprises the switching devices 5320a to 5320f. The switching device 5320a is a switching device on the positive side of a U phase while the switching device 5320b is a switching device on the negative side of the U phase. On the other hand, the switching device 5320c is a switching device on the positive side of a V phase while the switching device 5320d is a switching device on the negative side of the V phase. Finally, the switching device 5320e is a switching device on the positive side of a W phase while the switching device 5320f is a switching device on the negative side of the W phase.

Figure 54:
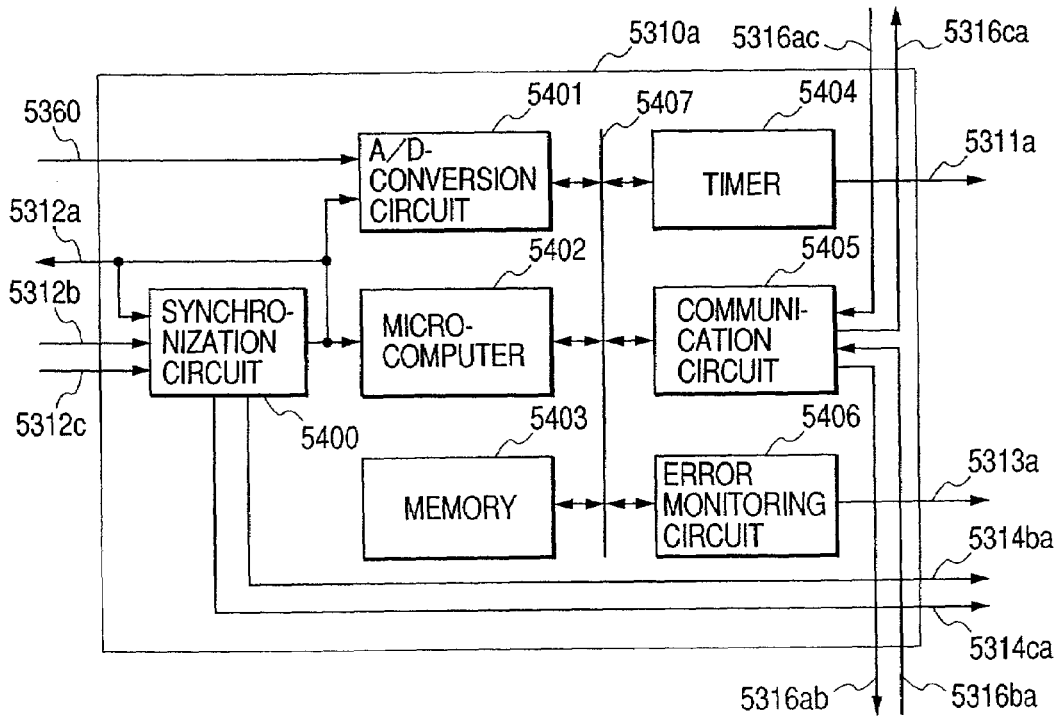
FIG. 54 is a block diagram showing a typical configuration of a control circuit employed in the power converting apparatus shown in FIG. 53.

The configuration of the control circuits 5310a, 5310b and 5310c is explained by referring to FIG. 54. While FIG. 54 shows the configuration of only the control circuit 5310a, the configurations of the control circuits 5310b and 5310c are the same as that of the control circuit 5310a.

As shown in FIG. 54, the control circuit 5310a comprises a synchronization circuit 5400, an A/D-conversion circuit 5401, a microcomputer 5402, a memory unit 5403, a timer 5404, a communication circuit 5405, an error monitoring circuit 5406 and a bus 5407. The synchronization circuit 5400 selects one of period signals 5312a, 5312b and 5312c as a control period signal. The A/D-conversion circuit 5401 samples the information 60 on the power generating system in each control period, converts the sampled analog value into digital data and transmits the data to a microcomputer 5402. The microcomputer 5402 determines on/off timing of a gate pulse 5311a on the basis of information on the power generating system at present obtained from the A/D-conversion circuit 5401 and information on the power generating system obtained in the past by execution of a control program. The memory unit 5403 is used for storing the control program and the information on the power generating system obtained in the past. The timer 5404 outputs the gate pulse 5311a with the on/off timing determined by the microcomputer 5402. The communication circuit 5405 exchanges data with the control circuits 5310b and 5310c. The error monitoring circuit 5406 detects an abnormality of the control circuits 5310a, 5310b and 5310c from data obtained from the communication circuit 5405 and internal data. The bus 5407 serves as a data transfer path connecting the A/D-conversion circuit 5401, the microcomputer 5402, the memory unit 5403, the timer 5404, the communication circuit 5405 and the error monitoring circuit 5406 to each other.

To put it in detail, the synchronization circuit 5400 compares the period signal 5312a of its own system with the period signals 5312b and 5312c output by the control circuits 5310b and 5310c respectively of the other systems in order to monitor a state of synchronization with the control circuits 5310b and 5310c of the other systems, outputting results of the comparison as intersystem-synchronization-state monitoring signals 5314ba and 5314ca.

The A/D-conversion circuit 5401 samples the power-supply information 60 when the period signal 5312a is received from the synchronization circuit 5400, that is, at the start point of a control period indicated by the period signal 5312a, converting the sampled analog value into digital data which is output to the microcomputer 5402.

When receiving the period signal 5312a, the microcomputer 5402 determines on/off timing of a gate pulse 5311a on the basis of current information on the power generating system obtained from the A/D-conversion circuit 5401 and previous information on the power generating system which is obtained in the past and stored in the memory unit 5403. Information on the on/off timing is then supplied to the timer 5404.

Receiving the information on the on/off timing from the microcomputer 5402, the timer 5404 changes the gate pulse 5311a from on to off or vice versa.

In addition, the microcomputer 5402 exchanges information on the power generating system and information on the on/off timing of the gate pulse 5311a with the control circuits 5310b and 5310c of the other systems through the communication circuit 5405 and compares the information with each other in order to monitor the operations of the other control circuits 5310b and 5310c. The error monitoring circuit 5406 detects an abnormality of the control circuits 5310a, 5310b and 5310c by monitoring results of comparison of data of the control circuit 5310a with those of the control circuits 5310b and 5310c of the other systems and monitoring the operation of its own control circuit 5310a, outputting a result of the monitoring as the operating-state monitoring signal 5313a.

Next, the synchronization circuit 5400 is explained in detail by referring to FIG. 55.

Figure 55A:
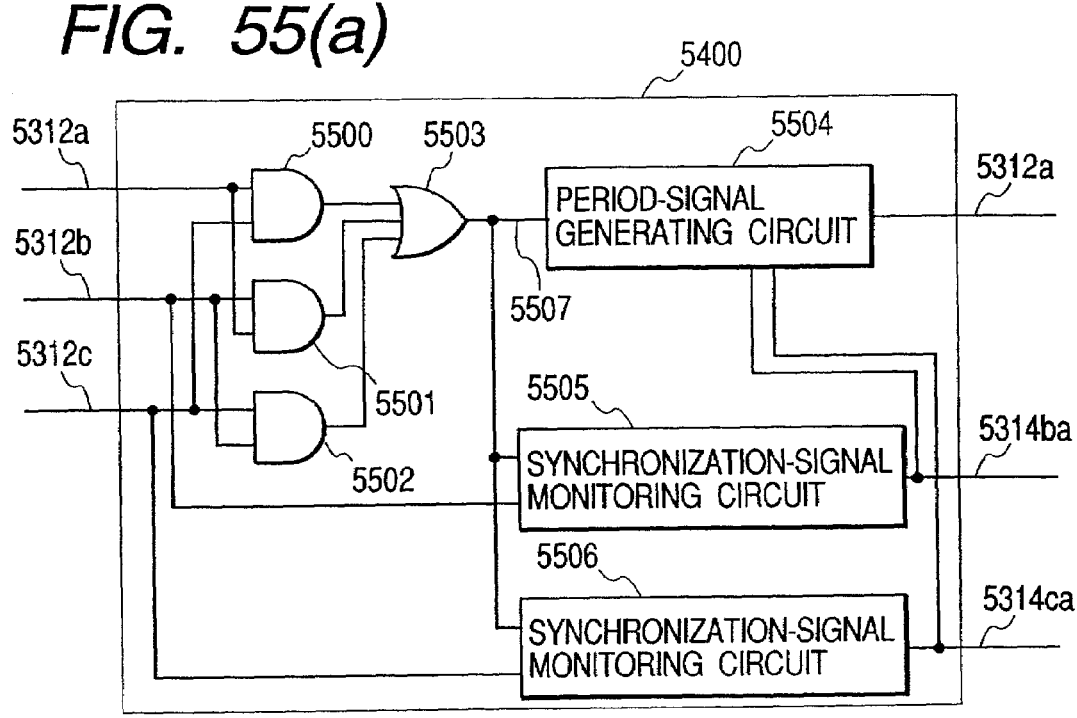

First of all, the configuration of the synchronization circuit 5400 is described by referring to FIG. 55(a).

As shown in FIG. 55(a), the synchronization circuit 5400 comprises AND gates 5500 to 5502, an OR gate 5503, a period-signal generating circuit 5504 and synchronization-signal monitoring circuits 5505 and 5506. The AND gates 5500 to 5502 and the OR gate 5503 form a majority-decision making circuit. The AND gate 5500 outputs a logic value of 1 only when both the period signals 5312a and 5312c have a logic value of 1. Similarly, the AND gate 5501 outputs a logic value of 1 only when both the period signals 5312a and 5312b have a logic value of 1. Likewise, the AND gate 5502 outputs a logic value of 1 only when both the period signals 5312b and 5312c have a logic value of 1. The OR gate 5503 outputs a logic value of 1 when at least one of the AND gates 5500 to 5502 outputs a logic value of 1, and outputs a logic value of 0 when all the AND gates 5500 to 5502 output a logic value of 0. In this way, the OR gate 5503 outputs a synchronization-reference signal 5507 selected among the period signals 5312a, 5312b and 5312c in accordance with a decision based on the majority of the period signals 5312a, 5312b and 5312c.

The period-signal generating circuit 5504 clears a counter employed therein and lets the counter start a counting-up operation on the falling edge of the synchronization-reference signal 5507. The counter itself is not shown in the figure though. As the contents of the counter reach a value determined in advance, the period signal 5312a is output. The synchronization-signal monitoring circuits 5505 and 5506 each clear a counter employed therein and let the counter start a counting-up operation on the falling edge of the synchronization-reference signal 5507. The counters themselves are not shown in the figure. If the synchronization-signal monitoring circuit 5505 does not detect the period signal 5312b even after the counting-up operation has been going on for a predetermined period of time, the intersystem synchronization state monitoring signal 5314ba is output to indicate a synchronization abnormality. Similarly, if the synchronization-signal monitoring circuit 5506 does not detect the period signal 5312c even after the counting-up operation has been going on for the predetermined period of time, the intersystem synchronization state monitoring signal 5314ca is output to indicate a synchronization abnormality. If both the intersystem synchronization state monitoring signals 5314ba and 5314ca are active, indicating synchronization abnormalities, the period-signal generating circuit 5504 generates the period signal 5312a internally without referring to the period signals 5312b and 5312c.

Next, the operation of the synchronization circuit 5400 is explained by referring to timing charts shown in FIG. 55(b). As shown in the timing charts of FIG. 55(b), a synchronization-reference signal 5507 is output in accordance with a decision based on a majority of the period signals 5312a, 5312b and 5312c even if there is a shift among the period signals 5312a, 5312b and 5312c. In addition, even if the period signal 5312c is not received, a synchronization-reference signal 5507 is output normally in accordance with a decision based on a majority. If the period signal 5312c is not received even after a fixed period of time (t2) has lapsed, the control circuit 5310c is regarded to be in state of being out of synchronization with the control circuit 5310a. In this case, this synchronization-state abnormality is reported as the intersystem synchronization state monitoring signal 5314ca. If both the period signals 5312b and 5312c are not received, a synchronization-reference signal 5507 based on a majority decision is not output. In this case, the period signal 5312a is output asynchronously with the other period signals 5312b and 5312c.

Figure 56:
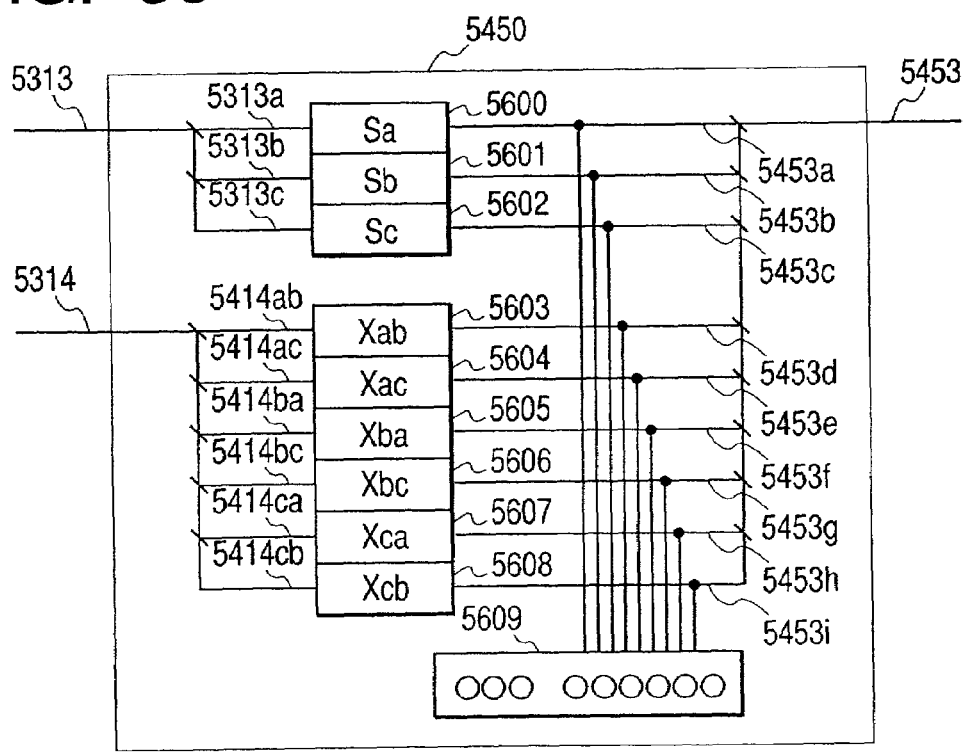
FIG. 56 is a block diagram showing a typical configuration of a synchronous-multisystem-state register employed in the power converting apparatus shown in FIG. 53.

Next, the synchronous-multisystem-state register 5450 employed in the output selector 5315 shown in FIG. 53 is explained by referring to FIG. 56.

As shown in FIG. 56, the synchronous-multisystem-state register 5450 has flip-flop circuits 5600 to 5608. The flip-flop circuits 5600 to 5602 are used for storing values Sa, Sb and Sc of the operating-state monitoring signals 5313a, 5313b and 5313c output by the control circuits 5310a, 5310b and 5310c respectively. On the other hand, the flip-flop circuits 5603 to 5608 are used for storing values Xab, Xac, Xba, Xbc, Xca and Xcb of the intersystem-synchronization-state signals 5314ab, 5314ac, 5314ba, 5314bc, 5314ca and 5314cb respectively output by the control circuits 5310a, 5310b and 5310c. A logic value of 1 stored in each of the flip-flop circuits 5600 to 5608 indicates a normal monitoring result. On the other hand, a logic value of 0 stored in each of the flip-flop circuits 5600 to 5608 indicates an abnormal monitoring result. A value stored in the synchronous-multisystem-state register 5450 is output as synchronous-multisystem-state information 5453.

As shown in FIG. 56, the synchronous-multisystem-state register 5450 employs an operating-state display unit 5609 comprising an array of light emitting diodes each associated with one of the flip-flop circuits 5600 to 5608. In this embodiment, a logic value of 1 stored in a flip-flop circuit to indicate a normal monitoring result turns on the light emitting diode associated with the flip-flop circuit. In this way, the location of a failure can be displayed to the person in charge, allowing recovery work to be carried out quickly.

Figure 57:
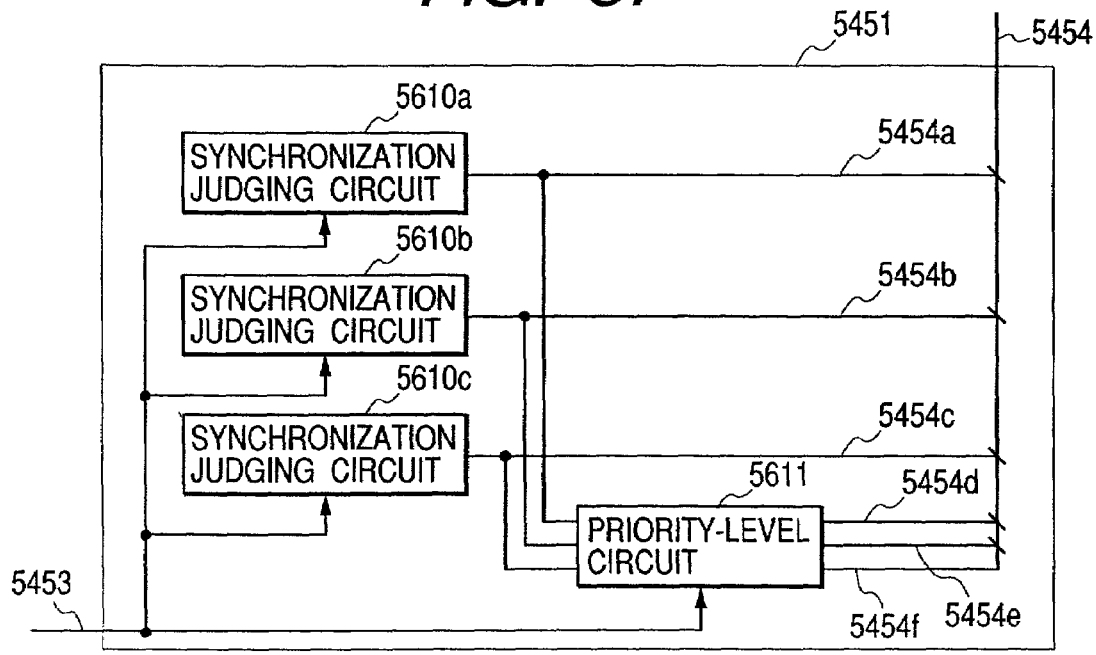
FIG. 57 is a block diagram showing a typical configuration of a configuration control circuit employed in the power converting apparatus shown in FIG. 53.

Next, the configuration control circuit 5451 employed in the output selector 5315 shown in FIG. 53 is explained in detail by referring to FIG. 57.

As shown in FIG. 57, the configuration control circuit 5451 comprises synchronization judging circuits 5610a, 5610b and 5610c and a priority-level circuit 5611. The synchronization judging circuits 5610a, 5610b and 5610c form judgments as to whether or not the control circuits 5310a, 5310b and 5310c respectively are each in an operating state synchronized with the control circuits of other systems. The judgments are based on the synchronous-multisystem-state information 5453 output by the synchronous-multisystem-state register 5450. The priority-level circuit 5611 determines priority levels of the control circuits 5310a, 5310b and 5310c in order to treat the output of one of the control circuits 5310a, 5310b and 5310c as a normal output and ignores the outputs of the rest in case the control circuits 5310a, 5310b and 5310c are all out of synchronization with each other.

The synchronization judging circuits 5610a, 5610b and 5610c form judgments on the synchronized-operation state of the control circuits 5310a, 5310b and 5310c respectively, outputting output select signals 5454a, 5454b and 5454c respectively to the priority-level circuit 5611 so that the output of one of the control circuits 5310a, 5310b and 5310c in an operation synchronized with the other systems can be selected.

In case the output select signals 5454a, 5454b and 5454c output by the synchronization judging circuits 5610a, 5610b and 5610c as results of the judgments indicate that the control circuits 5310a, 5310b and 5310c are all out of synchronization with each other, the priority-level circuit 5611 generates output select signals 5454d, 5454e and 5454f so that the output of a specific one of the control circuits 5310a, 5310b and 5310c is judged to be normal and the outputs of the rest are ignored. The specific control circuit 5310a, 5310b or 5310c is one that was in a synchronized state as well as regarded as normal prior to the judgments according to the synchronous-multisystem-state information 5453 and has the highest priority level.

FIG. 58(a) is a diagram showing an equation of operating logic adopted in the synchronization judging circuit 5610a employed in the configuration control circuit 5451 shown in FIG. 57. It should be noted that the synchronization judging circuits 5610b and 5610c have the same configuration as the synchronization judging circuit 5610a. Criteria for determining a synchronized state are explained by referring to states of synchronization shown in FIGS. 58(b) to 58(f) in which Systems a, b and c represent the control circuits 4310a, 5310b and 5310c respectively.

The synchronization judging circuit 5610a computes the value of an expression shown in FIG. 58(a) from the synchronous-multisystem-state-register information 5453 received from the synchronous-multisystem-state register 5450 in order to form a judgment as to whether or not the control circuit 5310a (hereinafter referred to as System a) is in a state of synchronization with the control circuit 5310b (hereinafter referred to as System b) or the control circuit 5310c (hereinafter referred to as System c). In the expression, the symbols Sa, Sb, Sc, Xab, Xac, Xba, Xbc, Xca and Xcb are values of the synchronous-multisystem-state-register information 5453 stored in the synchronous-multisystem-state register 5450. The result of the computation Sta, that is, the computed value of the expression, is output as the output select signal 5454a. As a sufficient condition for System a to be in a state of synchronization with the other systems, that is, Systems b and c, one of the following 4 conditions is required to hold true.

Condition 1: The state of mutual synchronization between System a in a normal operating state and one of the other systems, that is, System b or c, also in a normal operating state, is normal as shown in FIGS. 58(b) and 58(c).

Condition 2: All the three systems are in a normal operating state and the state of mutual synchronization between Systems b and c is normal and the states of synchronization of System a with the other systems, that is, Systems b and c, are normal as shown in FIG. 58(d).

Condition 3: All the three systems are in a normal operating state and the state of synchronization of System a with System c is normal and the state of synchronization of System b with System a is normal and the state of synchronization of System c with System b is normal as shown in FIG. 58(e).

Condition 4: All the three systems are in a normal operating state and the state of synchronization of System a with System b is normal and the state of synchronization of System b with System c is normal and the state of synchronization of System c with System a is normal as shown in FIG. 58(f).

If one of the above 4 conditions holds true for System a, System a is judged to be in a state of operation synchronized with the other systems. In this case, the output select signal 5454a is output at a logic value of 1 to indicate that the output of System a is selected. If none of the above 4 conditions holds true for System a, on the other hand, System a is judged to be in a state of operation unsynchronized with the other systems. In this case, the output select signal 5454a is output at a logic value of 0 to indicate that the output of System a is invalid.

Figure 59:
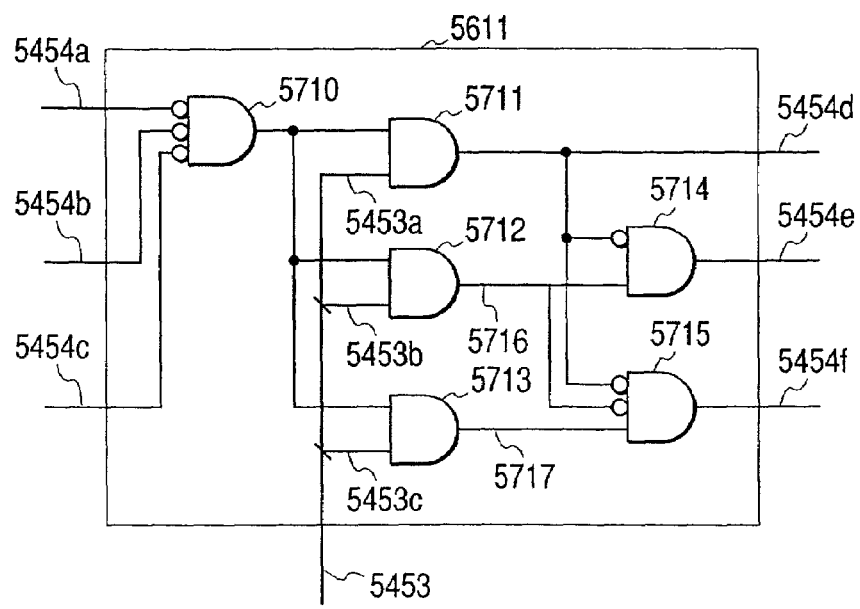
FIG. 59 is a block diagram showing a typical configuration of a priority-level circuit employed in the configuration control circuit shown in FIG. 57.

Next, the priority-level circuit 5611 employed in the configuration control circuit 5451 shown in FIG. 57 is explained in detail by referring to FIG. 59.

As shown in FIG. 59, the priority-level circuit 5611 comprises AND gates 5710 to 5715.

The AND gate 5710 outputs a logic value of 1 when the synchronization judging circuits 5610a, 5610b and 5610c judge that the control circuits 5310a, 5310b and 5310c are not in an operating state of mutual synchronization with each other, that is, all the output select signals 5454a, 5454b and 5454c have a logic value of 0.

The AND gate 5711 inputs the output of the AND gate 5710 and the operating-state information 5453a of the control circuit 5310a, generating an output select signal 5454d at a logic value of 1 for the control circuit 5310a which is considered to be normal but not in a state of a synchronized operation. Similarly, the AND gate 5712 inputs the output of the AND gate 5710 and the operating-state information 5453b of the control circuit 5310b, generating an output select signal 5716 at a logic value of 1 for the control circuit 5310b which is considered to be normal but not in a state of a synchronized operation. Likewise, the AND gate 5713 inputs the output of the AND gate 5710 and the operating-state information 5453c of the control circuit 5310c, generating an output select signal 5717 at a logic value of 1 for the control circuit 5310c which is considered to be normal but not in a state of a synchronized operation.

The AND gates 5714 and 5715 form logic for assigning priority levels to the output select signals 5454d, 5716 and 5717. In the case of the priority-level circuit 5611 shown in FIG. 59, the highest priority level is assigned to the output select signal 5454d, the intermediate priority level to the output select signal 5716 and the lowest priority level to the output select signal 5717. That is to say, priority levels are set in the following order: the control circuit 5310a, then 5310b and then 5310c. With some of the output select signals 5454d, 5716 and 5717 set at a logic value of 1, one of the output select signals 5454d, 5454e and 5454f selected on the basis of the priority order is set at a logic value of 1.

Figure 60:
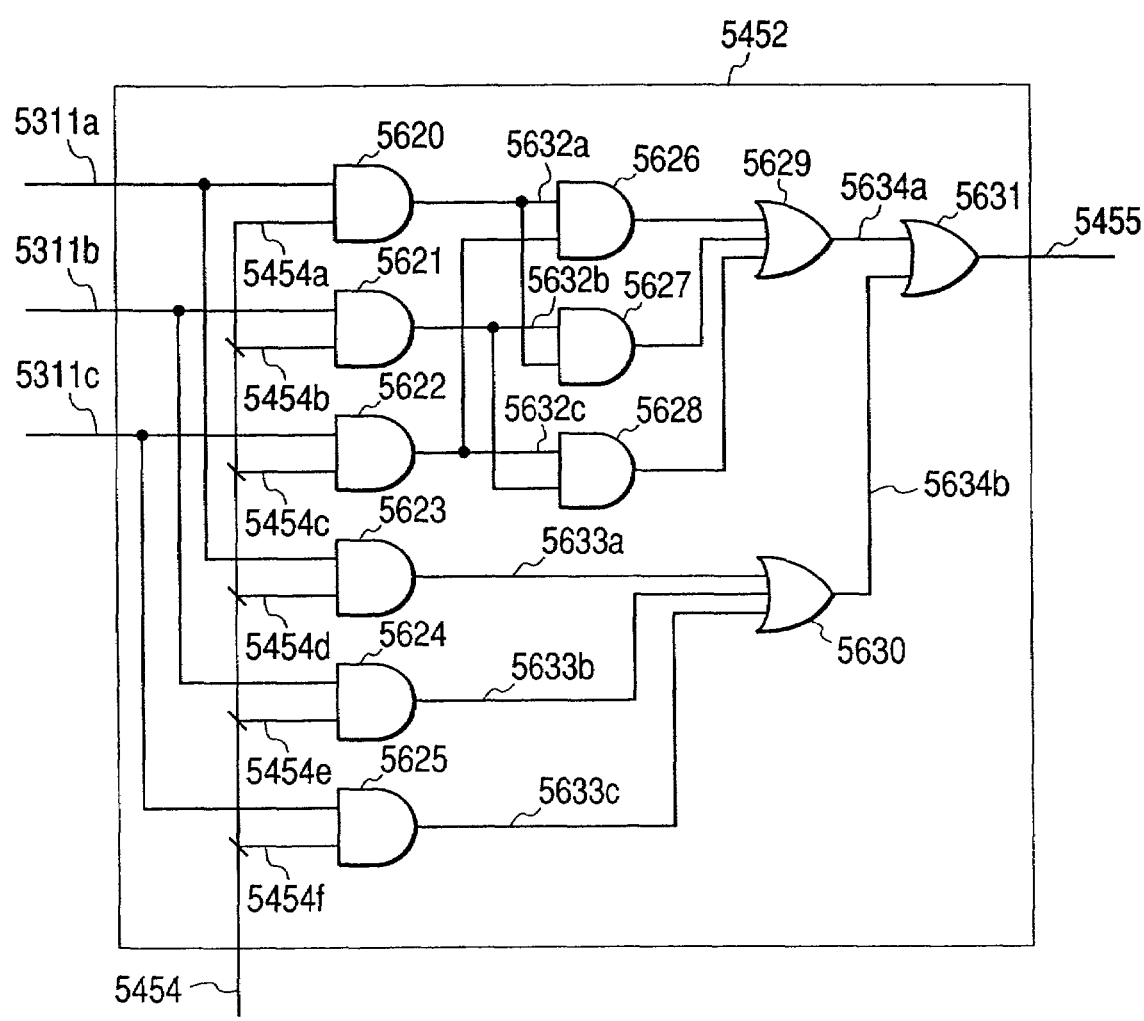
FIG. 60 is a block diagram showing a typical configuration of an output selecting circuit employed in the power converting apparatus shown in FIG. 53.

Next, the output selecting circuit 5452 employed in the output selector 5315 shown in FIG. 53 is explained in detail by referring to FIG. 60.

As shown in FIG. 60, the output selecting circuit 5452 comprises AND gates 5620 to 5628 and OR gates 5629 to 5631. The AND gates 5620 to 5625 input the output select signals 5454a to 5454f respectively and pass on some of the gate pulses 5311a, 5311b and 5311c that are judged to be correct, blocking the rest judged to be abnormal. With the synchronous-multisystem controller 5301 operating as a three-system controller or a two-system controller, the outputs of all the AND gates 5620 to 5622 or 2 of them are valid and the outputs of the AND gates 5623 to 5625 are all suppressed. With the synchronous-multisystem controller 5301 operating as a degraded one-system controller, on the other hand, the output of one of the AND gates 5623 to 5625 are valid and the outputs of the AND gates 5620 to 5622 are all suppressed.

The AND gates 5626 to 5628 and the OR gate 5629 form a majority-decision making circuit. With the synchronous-multisystem controller 5301 operating as a three-system controller, an output is determined from the gate pulses 5632a to 5632c judged to be valid and the OR gate 5629 outputs a gate pulse 5634a. With the synchronous-multisystem controller 5301 operating as a degraded two-system controller, a result obtained as a logical product of 2 of the gate pulses 5632a to 5632c judged to be valid is output.

With the synchronous-multisystem controller 5301 operating as a degraded one-system controller, one of the gate pulses 5633a to 5633c is judged to be valid and the OR gate 5630 outputs a gate pulse 5634b. Since the gate pulses 5634a and 5634b are never output at the same time, the OR gate 5631 outputs either the gate pulse 5634a or 5634b as a gate pulse 5455.

Next, a fifth embodiment of the present invention is explained by referring to FIGS. 61 to 64. This fifth embodiment is another implementation of a degradation control method adopted by a power converting apparatus.

Figure 61:
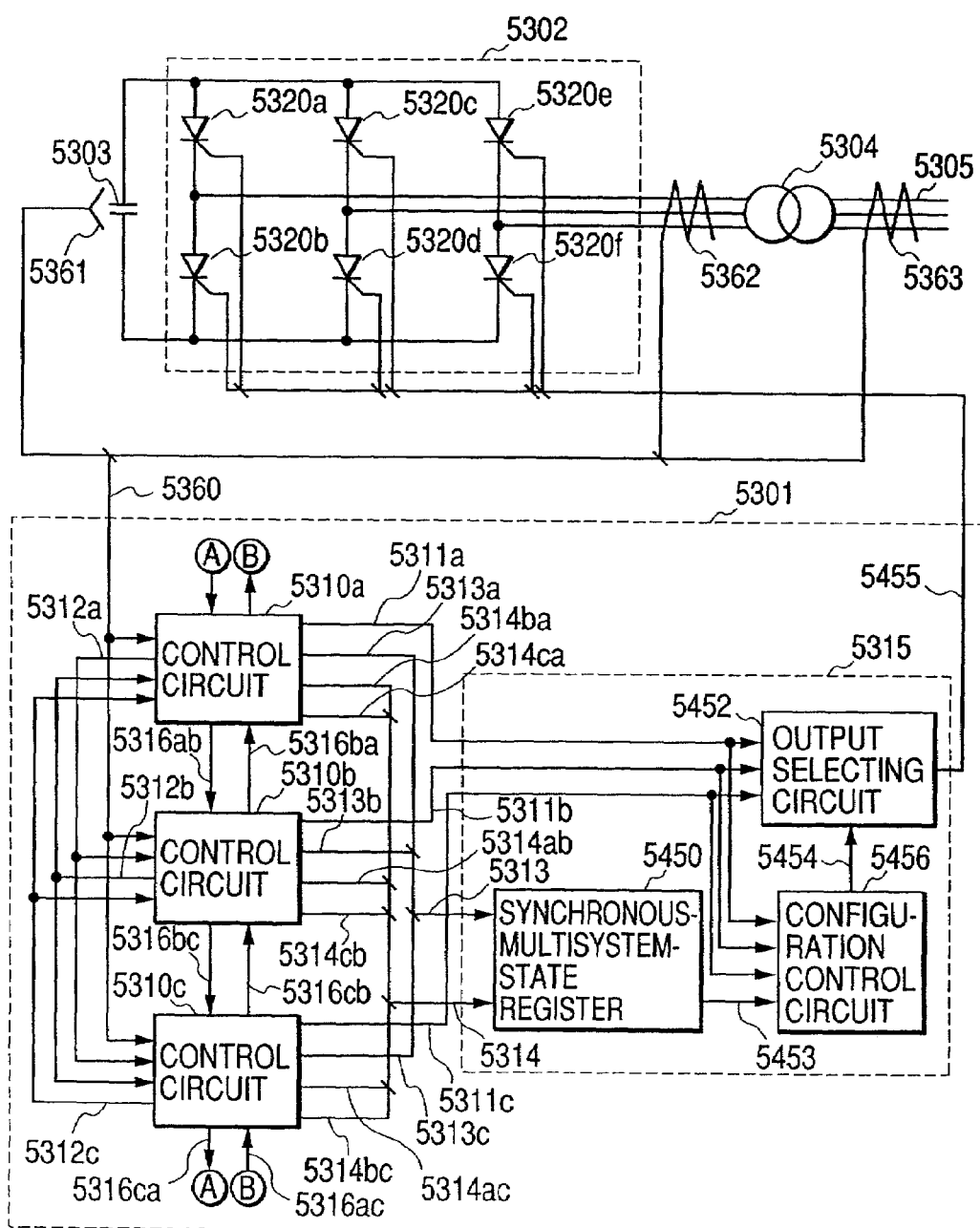
FIG. 61 is a block diagram showing a typical configuration of a power converting apparatus implemented by a fifth embodiment of the present invention.

A power converting apparatus shown in FIG. 61 is different from the power converting apparatus shown in FIG. 53 in that the former has a configuration control circuit 5456 which inputs the synchronous-multisystem-state-register information 5453 output by the synchronous-multisystem-state register 5450 and the gate pulses 5311a, 5311b and 5311c output by the control circuits 5310a, 5310b and 5310c respectively and outputs the output select signal 5454.

Figure 62:
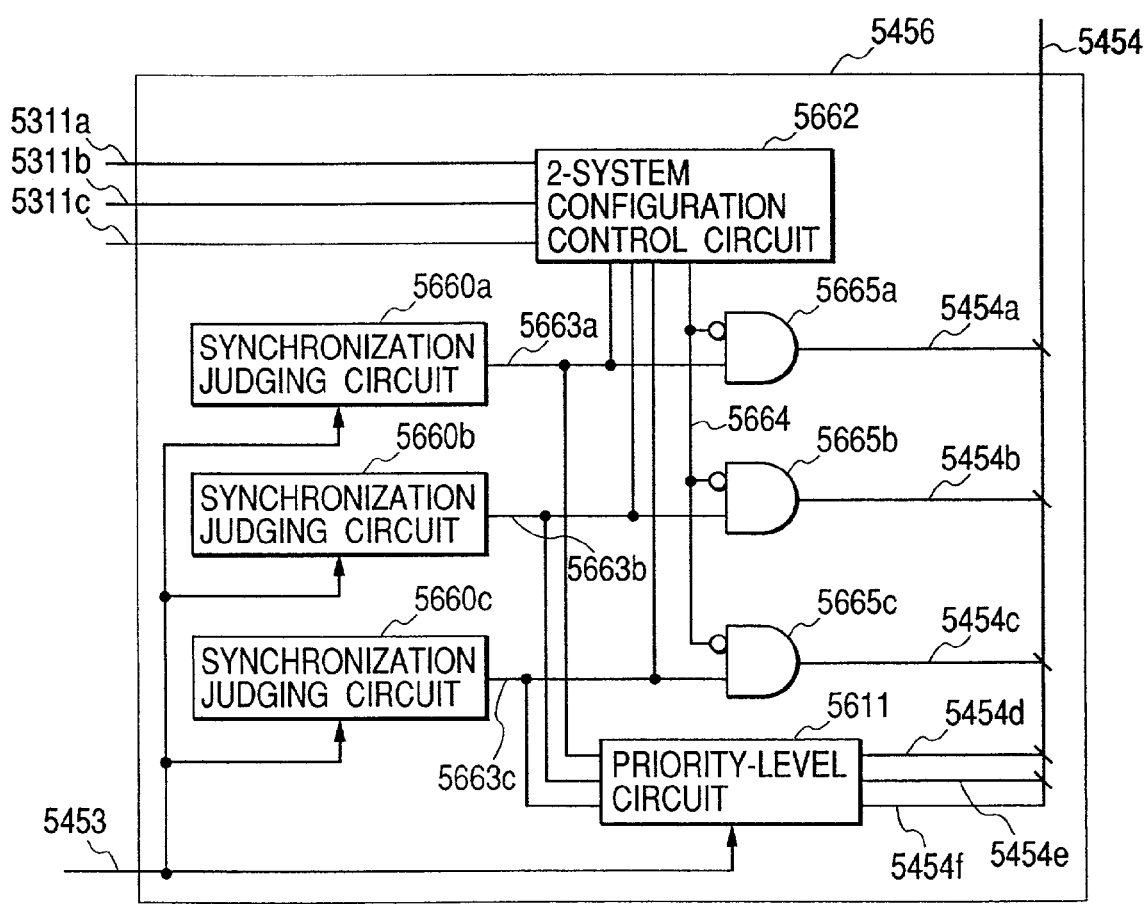
FIG. 62 is a block diagram showing a typical configuration of a configuration control circuit employed in the power converting apparatus shown in FIG. 61.

The configuration control circuit 5456 employed in the power converting apparatus shown in FIG. 61 is explained in detail by referring to FIG. 62.

The configuration control circuit 5456 is different from the configuration control circuit 5451 described earlier in that a two-system configuration control circuit 5662 and AND gates 5665a to 5665c are added to the former. The configurations of synchronization judging circuits 5660a, 5660b and 5660c and a priority-level circuit 5661 are the same as those of the synchronization judging circuits 5610a, 5610b and 5610c and a priority-level circuit 5611 employed in the configuration control circuit 5451 shown in FIG. 57.

With the synchronous-multisystem controller 5301 operating in a degraded two-system operation, the two-system configuration control circuit 5662 compares 2 gate pulses output by the 2 control circuits in a normal operating state with each other. If the 2 gate pulses do not coincide with each other, the two-system configuration control circuit 5662 outputs an output suppressing signal 5664 that causes output select signals 5454a, 5454b and 5454c to invalidate the gate pulses output by the 2 control circuits. In addition, with the synchronous-multisystem controller 5301 operating in a degraded two-system operation, when the synchronization of the 2 control circuits in a normal operating state is regarded as abnormal, an output is selected to switch the operation to a degraded single-system operation by one of the control circuits selected on a priority basis as is the case with the fourth embodiment described earlier.

Figure 63A:
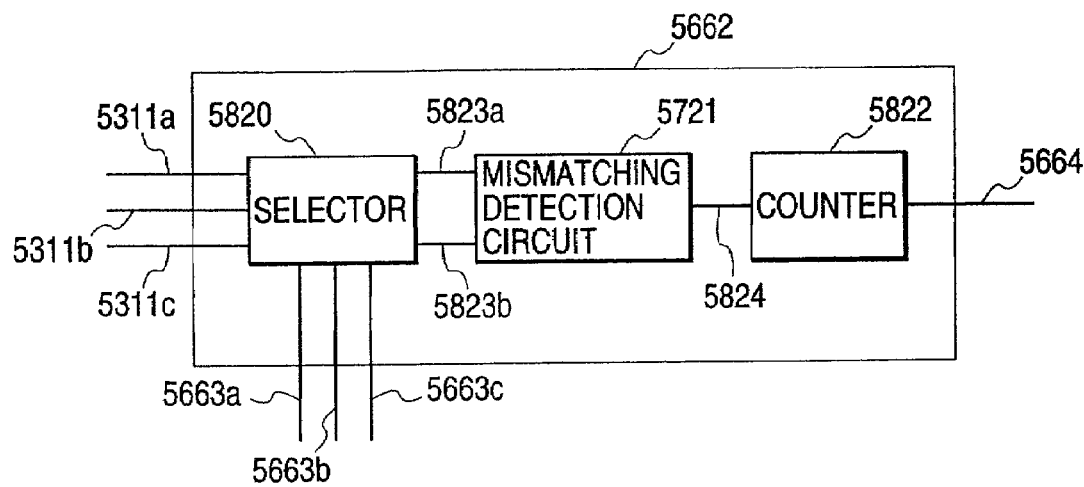
FIGS. 63(a) and 63(b) are a block diagram showing a typical configuration of a two-system-configuration control circuit employed in the configuration control circuit shown in FIG. 62 and timing charts of the two-system-configuration control circuit, respectively.

The two-system configuration control circuit 5662 employed in the configuration control circuit 5456 shown in FIG. 62 is explained in detail by referring to FIG. 63(a).

As shown in FIG. 63(a), the two-system configuration control circuit 5662 comprises a selector 5820, a mismatching detection circuit 5821 and a counter 5822. With the synchronous-multisystem controller 5301 operating in a degraded two-system operation as evidenced by the values of the output select signals 5663a, 5663b and 5663c, 2 of the gate pulses 5311a, 5311b and 5311c output by 2 control circuits in a synchronized operation are selected by the selector 5820 and output as gate pulses 5823a and 5823b. The mismatching detection circuit 5821 compares the selected gate pulses 5823a and 5823b with each other, outputting a mismatching detection signal 5824 with a logic value of 1 or 0 to indicate that the gate pulse 5823a does not match or match the gate pulse 5823b respectively. In general, the gate pulses 5311a to 5311c are shifted from each other due to variations in processing time of the control circuits 5310a to 5310c. Thus, the gate pulse 5823a does not perfectly coincide with the gate pulse 5823b in many cases. For this reason, the counter 5822 measures the length of the period of time during which the mismatching detection signal 5824 is continuously set at a logic value of 1. Only if the length of the period of time exceeds a predetermined value is the gate pulse 5823*a* judged to indeed mismatch the gate pulse 5823*b* in which case the output suppression signal 5664 is activated.

Figure 63B:
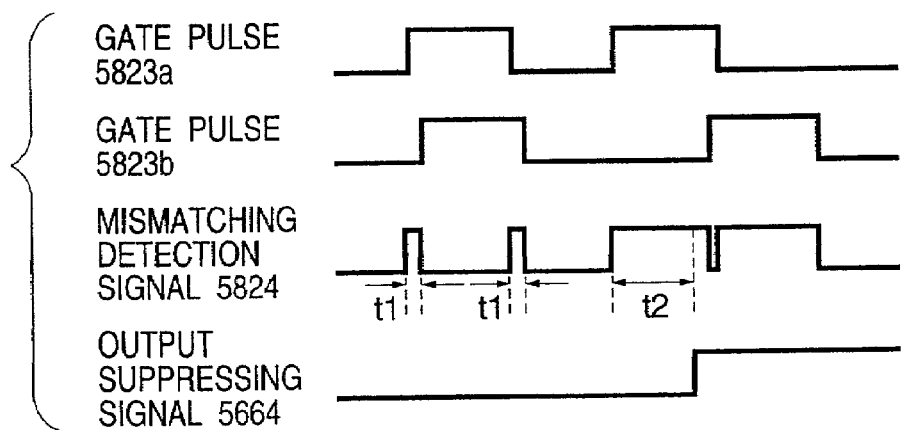

Another typical operation of the two-system configuration control circuit 5662 employed in the configuration control circuit 5456 shown in FIG. 62 is explained by referring to timing charts shown FIG. 63(*b*). If only the logic of the selector 5820 and the mismatching detection circuit 5821 are used, a small shift between the gate pulses 5823*a* and 5823*b* will be recognized as a mismatching phenomenon. In the case of the fifth embodiment, the counter 5822 is used so that the gate pulse 5823*a* is judged to indeed mismatch the gate pulse 5823*b* only if the length of the period of time during which the mismatching detection signal 5824 is continuously set at a logic value of 1 exceeds a predetermined value. The counter 5822 is used to measure the length of the period of time during which the mismatching detection signal 5824 is continuously set at a logic value of 1. Only if the result of the measurement indicates that the length of the period of time exceeds a predetermined value is the gate pulse 5823*a* judged to indeed mismatch the gate pulse 5823*b* in which case the output suppression signal 5664 is activated. The above operation of the two-system configuration control circuit 5662 is explained in detail by referring to the timing charts shown FIG. 63(*b*).

As shown in the timing charts of FIG. 63(*b*), a small time shift t1 between the gate pulses 5823*a* and 5823*b* exists. In this case, 2 of the gate pulses 5311*a*, 5311*b* and 5311*c* output by 2 control circuits in a synchronized operation are still considered to coincide with each other, keeping the output suppression signal 5664 at a logic value of 0. If the gate pulses 5823*a* and 5823*b* do not coincide with each other for a period of time t2 where t2>t1, the output suppression signal 5664 is output at a logic value of 1.

In the operation described above, a shift between the gate pulses 5823*a* and 5823*b* not exceeding a predetermined time duration, that is, t1 in this embodiment, is tolerated in formation of a judgment as to whether or not 2 of the gate pulses 5311*a*, 5311*b* and 5311*c* output by 2 control circuits in a synchronized operation coincide with each other. Thus, even if the gate pulses 5311*a* to 5311*c* do not perfectly coincide with each other due to variations in processing time of the control circuits 5310*a* to 5310*c*, they can be considered to match each other.

Next, the selector 5820 employed in the two-system configuration control circuit 5662 shown in FIG. 63(*a*) is explained by referring to a truth table shown in FIG. 64(*a*). According to the truth table shown in FIG. 64(*a*), if a pair of any output select signals 5663*a*, 5663*b* and 5663*c* have a logic value of 1, 2 of the gate pulses 5311*a*, 5311*b* and 5311*c* output by 2 control circuits in a synchronized operation corresponding to the pair are output as the gate pulses 5823*a* and 5823*b* at a logic value of 1. In other cases, the gate pulses 5823*a* and 5823*b* are both set at a logic value of 0.

Next, the mismatching detection circuit 5821 employed in the two-system configuration control circuit 5662 shown in FIG. 63(*a*) is explained by referring to a truth table shown in FIG. 64(*b*). According to the truth table shown in FIG. 64(*b*), if one of the gate pulses 5823*a* and 5823*b* has a logic value of 1 and the other has a logic value of 0, a mismatching state is assumed in which case the mismatching detection signal 5824 is set at a logic value of 1. If both of the gate pulses 5823*a* and 5823*b* have a logic value of 1 or 0, on the other hand, a matching state is assumed in which case the mismatching detection signal 5824 is set at a logic value of 0.

Figure 65:
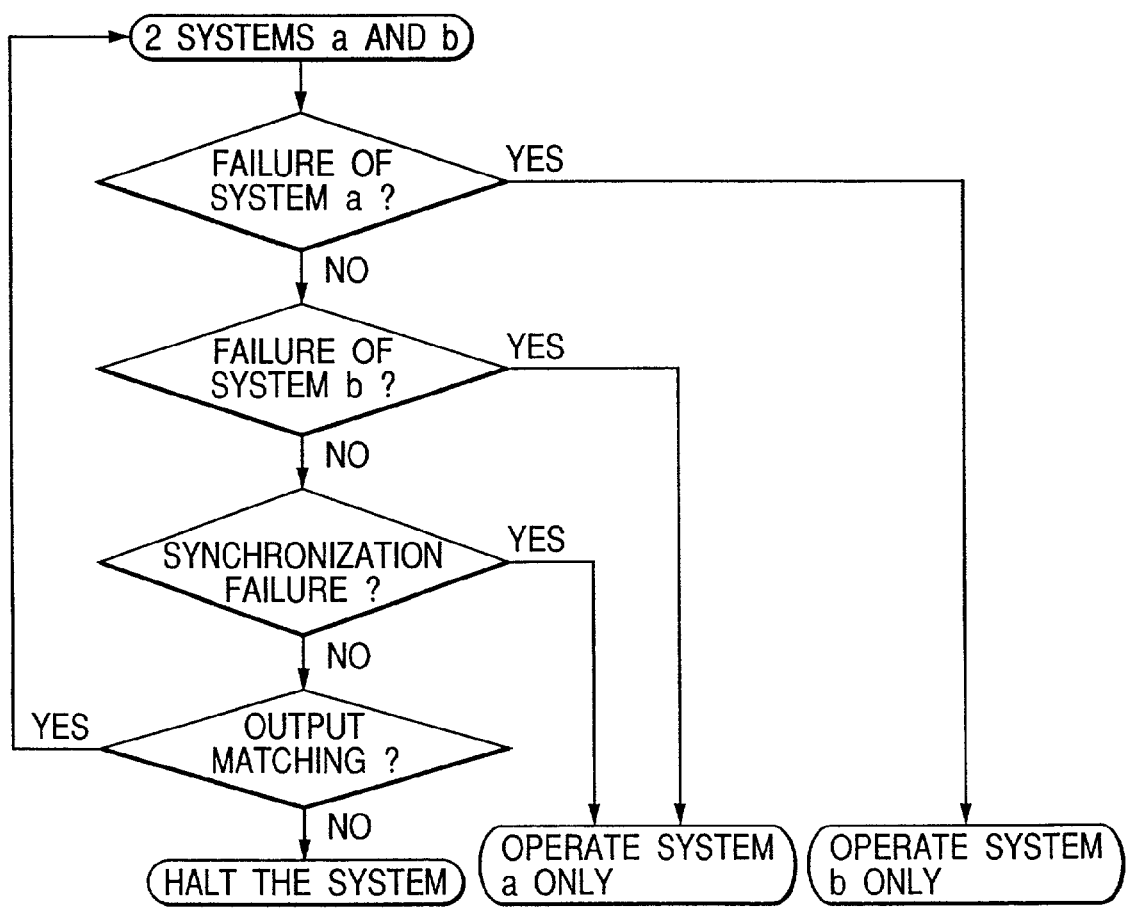
FIG. 65 shows a flowchart of degradation control of the two-system-configuration control circuit of FIG. 63 executed in the event of a detected failure.

Next, the procedure of degradation control in a two-system operating state of Systems a and b is explained by referring to a flowchart shown in FIG. 65.

In the procedure of a two-system operating state of Systems a and b, System a is assumed to have a priority higher than System b. If either of the control circuits 5310*a* and 5310*b* of Systems a and b respectively fails, the synchronous-multisystem controller 5301 degrades the control system to a single-system operation of System a or b that does not fail. In addition, if neither System a nor b fails but the state of synchronization between the two systems is considered to be abnormal, the synchronous-multisystem controller 5301 also degrades the control system to a single-system operation of System a which has a higher priority. Furthermore, even with no abnormality detected in the operating states of the two systems and the state of synchronization between the two systems, if the outputs of Systems a and b do not coincide with each other, it is impossible to identify which of Systems a and b generates a correct output. In such a case, the outputs of the two systems are suppressed and control is discontinued. As a result, it is possible to implement a control system at a high degree of safety and at a high availability factor.

According to the present invention, information on operating states of systems of a synchronous-multisystem controller and information on a state of synchronization between the systems are made available as a basis for controlling degeneration of the synchronous-multisystem controller and selecting an output of a control circuit, allowing the availability factor of the system to be increased in the event of a synchronous-multisystem failure.

What is claimed is:

1. A communication control apparatus for exchanging information in a packet format, said apparatus comprising:
  a transmission control unit having a repeated-transmission function for consecutively transmitting a plurality of packets each including the same user information, a sequence number of transmission in which said packet is transmitted and a frame check sequence for examination of an error; and
  a reception control unit having a frame-check-sequence examining means for detecting an error, a packet-identity judging means and a reception-history control means provided with a reception-count counter for counting the number of times said packets have been received for detecting said sequence number of transmission of a packet currently being received,
  wherein said reception control unit carries out reception processing only if at least one of said packets transmitted consecutively is received successfully, and wherein information on an error is recorded only if all said packets transmitted consecutively are received unsuccessfully.

2. A communication control apparatus according to claim 1 wherein:
  said information on an error includes information indicating a type of said error; and
  said reception-history control means has an error-information generating means for selecting and outputting information on an error in accordance with a priority order set in advance in case errors with types different from packet to packet are detected during reception of packets transmitted consecutively.

3. A communication control apparatus according to claim 1 wherein:

said transmission control unit adds information indicating a type of a packet to be transmitted to said packet; and only when said reception-history control means detects a last one of packets with the same type transmitted consecutively does said reception control unit carry out reception processing.

4. A communication control apparatus according to claim 1 wherein said reception-history control means sets said sequence number of transmission included in a received packet into said reception-count counter if no error is detected in said received packet.

5. A communication control apparatus according to claim 1 wherein said reception-history control means increments a count value of said reception-count counter if an error is detected in a received packet by said frame-check-sequence examining means.

6. A communication control apparatus according to claim 1 wherein, if a next packet is not received even after a predetermined period of time has lapsed since said reception control means receives a packet with a sequence number of transmission indicating that said packet is not the last one among packets consecutively transmitted to said reception control means, said reception-history control means regards said received packet as a last one.

7. A communication control apparatus according to claim 3 wherein, if a packet with a type different from that of a packet received in an immediately preceding reception is received, said reception-history control means regards said packet received in said immediately preceding reception as a last one.

* * * * *